(12) United States Patent
Kurokawa et al.

(10) Patent No.: US 6,198,555 B1
(45) Date of Patent: *Mar. 6, 2001

(54) MANUFACTURING METHOD FOR A HOLOGRAM AND A RELATED EXPOSURE APPARATUS

(75) Inventors: Kazumasa Kurokawa, Kariya; Tomoyuki Kanda, Mie-Ken; Atsuo Ishizuka, Nagoya; Masahiro Shiozawa, Oobu, all of (JP)

(73) Assignees: Denso Corporation, Kariya; Nippon Soken, Inc., Nishio, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/823,484

(22) Filed: Mar. 25, 1997

(30) Foreign Application Priority Data

Mar. 25, 1996 (JP) .................................... 8-096051
Mar. 26, 1996 (JP) .................................... 8-097646
Mar. 27, 1996 (JP) .................................... 8-099155

(51) Int. Cl.$^7$ .............................. G03H 1/08; G03H 1/02
(52) U.S. Cl. .................................. 359/28; 359/9
(58) Field of Search ................. 359/15, 20, 28, 359/19

(56) References Cited

U.S. PATENT DOCUMENTS 3,526,505 * 9/1970 Kroemer ...................... 359/28
3,602,570 * 8/1971 Greenaway ................... 359/28
3,891,975 * 6/1975 Deml et al. ................... 340/173
5,151,799  9/1992 Ansley .

FOREIGN PATENT DOCUMENTS

| 1282716 | * | 7/1972 | (GB) | ...................... 359/19 |
| 4-298710 | | 10/1992 | (JP) . | |
| 4-335626 | | 11/1992 | (JP) . | |
| 5-005953 | | 1/1993 | (JP) . | |
| 5-232854 | | 9/1993 | (JP) . | |
| 5-085910 | | 12/1993 | (JP) . | |
| 5-333435 | | 12/1993 | (JP) . | |

* cited by examiner

Primary Examiner—Cassandra Spyrou
Assistant Examiner—Jared Treas
(74) Attorney, Agent, or Firm—Pillsbury Madison & Sutro LLP

(57) ABSTRACT

A coherent beam is converted into a light flux having an expanded width at a predetermined position closer to a photosensitive element. Part of the expanded light flux is irradiated directly on the photosensitive element as a reference beam. The remainder of the expanded light flux is diffused, and its optical direction is changed. Thus, the remainder of the expanded light flux not irradiated directly to the photosensitive element is converted into a scattered beam advancing as an object beam toward the photosensitive element. Interference fringes are formed on the photosensitive element by using the reference beam and the object beam.

20 Claims, 38 Drawing Sheets

MANUFACTURING METHOD FOR A HOLOGRAM AND A RELATED EXPOSURE APPARATUS

BACKGROUND OF THE INVENTION

1. Field of the Invention

The present invention relates to a hologram manufacturing method for forming sharp interference fringes and a related exposure apparatus.

2. Related Art

Overhead projectors and slide projectors are commonly used for displaying images for numerous viewers gathering at the same place. These projectors mandatorily require screens. The screens preferably used for these projectors are generally the ones having the capability of displaying images brightly as well as reflecting particular light efficiently. To satisfy these requirements, some holographic screens have been proposed, for example, in Japanese Patent No. 5-85910, Unexamined Japanese Patent Application No. 5-333435, and Unexamined Japanese Patent Application No. 5-5953. According to these prior arts, a light diffusing member is recorded on a hologram by utilizing the selectivity of wavelength of the hologram.

FIG. 50 discloses a conventional exposure apparatus for Fresnel's hologram screens. A coherent (laser) beam 30 is emitted from a light source 91 and then separated into two beams by a half mirror 911. One of the two beams, i.e., a beam reflected by the half mirror 911, is converted into a reference beam 31 with an expanded width by a divergent lens 913. The other of the two beams, i.e., a beam penetrating the half mirror 911, is reflected by a reflection mirror 912 and then diverged by a divergent lens 914. Then, the diverged beam passes through a diffusion member 92 and is converted into a scattered beam serving as an object beam 32. Thus, interference fringes are formed on a photosensitive element 81.

However, according to the arrangement of this conventional exposure apparatus, each beam advances a relatively long optical path after being separated by the half mirror 911. This is disadvantageous in that there is a possibility of causing a significant phase difference between two beams 31 and 32 due to fluctuations of the intervening medium (i.e., air) residing along the optical paths. Such fluctuations of intervening medium possibly disturb the interference fringes formed on the photosensitive element 81. As a result, the sharpness of interference fringes will be deteriorated, and the diffraction efficiency of the hologram is lowered.

FIG. 51 discloses another conventional exposure apparatus for Fresnel's hologram screens. This conventional exposure apparatus is characterized by the photosensitive element 81 and the diffusion member 92 connected hermetically with refractive-index-adjusting liquid, such as silicon oil, kept between them. The coherent beam 30 is not separated by using a separating means such as a half mirror. The reference beam 31 is first irradiated to the diffusion member 92. Diffused beams are then introduced into the photosensitive element 81. According to this arrangement, reference beam 31 and object beam 32 cannot be discriminated clearly. This is disadvantageous in that a resultant holographic screen cannot have an intended directionality, and the transparency of the hologram is not satisfactory. Furthermore, the interference fringes formed on the photosensitive element may be disturbed due to leak of the refractive-index-adjusting liquid.

Unexamined Japanese Patent Application No. 5-232854 discloses an exposure apparatus similar to FIG. 51 but different in that the diffusion member 92 is replaced by a master hologram recording a diffusion member. In this case, there is a problem that, if noises are involved in the master hologram, the same noises are recorded in the holographic screen.

SUMMARY OF THE INVENTION

Accordingly, in view of the above-described problems encountered in the related art, a principal object of the present invention is to provide a hologram manufacturing method capable of preventing interference fringes formed on a photosensitive element from being disturbed by the fluctuations of intervening medium residing along the optical path, and efficiently forming holograms with sharp interference fringes, and a related exposure apparatus.

Another object of the present invention is to reduce the length of the separated optical paths after the beam is separated, to reduce the phase difference between the reference beam and the object beam, and to realize a holographic screen free from the fluctuation of intervening medium residing along the optical path.

Still another object of the present invention is to flexibly change the incident direction of the object beam advancing to the photosensitive element to adjust the view region of the holographic screen.

Yet another object of the present invention is to stabilize the formation of interference fringes during an exposure operation, and to increase the transparency of a resultant holographic screen.

Moreover, another object of the present invention is to form a holographic screen along an entire surface of a large-scale photosensitive element, and to form interference fringes at different local spots of the photosensitive element by a single exposure operation.

And further, another object of the present invention is to form the interference fringes successively along the photosensitive element to manufacture a large-scale holographic screen.

In order to accomplish the above and other related objects, a first aspect of the present invention provides a manufacturing method for Fresnel's holographic screens comprising the following steps. First, a coherent beam is converted into a light flux having an expanded width at a predetermined position to a photosensitive element. Next, part of the expanded light flux, as a reference beam, is irradiated directly on the photosensitive element. While, the remainder of the expanded light flux is diffused and its optical direction is changed, thereby converting the remainder of the expanded light flux not irradiated directly to the photosensitive element into a scattered beam advancing as an object beam toward the photosensitive element. Then, interference fringes are formed on the photosensitive element by using the reference beam and the object beam.

According to the features of preferred embodiments of the first aspect invention, the expanded light flux is irradiated through a prism disposed on an optical path of the expanded light flux. This prism has a first surface brought into contact with the photosensitive element, a second surface receiving the expanded light flux, and a third surface brought into contact with a reflecting member reflecting the expanded light flux. The expanded light flux passes a solid transparent member disposed on an optical path extending from a split point of the reference beam and the object beam to the photosensitive element. The interference fringes are formed at local spots on the photosensitive element by using a plurality of optical sets each consisting of a diffusing member and a directional-changing member. The interference fringes are formed successively by changing a positional relationship between the plurality of optical sets and the photosensitive element.

A second aspect of the present invention provides a manufacturing method for Fresnel's holographic screens comprising the following steps. A coherent beam is converted into a light flux having an expanded width at a predetermined position to a photosensitive element. Part of the expanded light flux is converted into a scattered beam which is directly irradiated on the photosensitive element as an object beam. The optical direction of the remainder of the expanded light flux is changed to convert the remainder of the expanded light flux into a reference beam advancing toward the photosensitive element. And, interference fringes are formed on the photosensitive element by using the reference beam and the object beam.

According to the features of preferred embodiments of the second aspect invention, the expanded light flux passes a solid transparent member disposed on an optical path extending from a split point of the reference beam and the object beam to the photosensitive element. The interference fringes are formed at local spots on the photosensitive element by using a plurality of optical sets each consisting of a diffusing member and a directional-changing member. The interference fringes are formed successively by changing a positional relationship between the plurality of optical sets and the photosensitive element.

A third aspect of the present invention provides a manufacturing method for Fresnel's holographic screens comprising the following steps. A coherent beam is converted into a light flux having an expanded width at a predetermined position to a photosensitive element. Part of the expanded light flux is irradiated directly on the photosensitive element as a reference beam. The remainder of the expanded light flux is diverged and its optical direction is changed, thereby converting the remainder of the expanded light flux not irradiated directly to the photosensitive element into an object beam advancing toward the photosensitive element. And, interference fringes are formed on the photosensitive element by using the reference beam and the object beam.

A fourth aspect of the present invention provides an exposure apparatus for Fresnel's holographic screens characterized by the following features. A light source emits a coherent beam. A holder supports a photosensitive element on which a hologram is formed. Expand and irradiating means converts the coherent beam emitted from the light source into a light flux having an expanded width, and irradiates part of the expanded light flux directly on the photosensitive element as a reference beam. And, directional-change and diffusing means diffuses the remainder of the expanded light flux and changes an optical direction thereof, thereby converting the remainder of the expanded light flux not irradiated directly to the photosensitive element into a scattered beam advancing as an object beam toward the photosensitive element. Thus, interference fringes of the hologram are formed on the photosensitive element by using the reference beam and the object beam.

According to the features of preferred embodiments of the fourth aspect invention, the directional-change and diffusing means is a single component integrating a diffusing member and a directional-changing member, or a combination of a diffusing member and a directional-changing member provided independently. A prism is disposed on an optical path of the expanded light flux. This prism has a first surface brought into contact with the photosensitive element, a second surface receiving the expanded light flux, and a third surface brought into contact with a directional-changing member serving as part of the directional-change and diffusing means. The prism is a combination of a first prism having no ability of diffusing transmitted light and a second prism having a capability of diffusing transmitted light. In this case, the first surface is defined by the first prism, and the third surface is defined by the second prism. The prism comprises a diffusing section provided on an optical path of the object beam for diffusing transmitted light. A solid transparent member is disposed on an optical path of the reference beam or object beam extending to the photosensitive element.

A fifth aspect of the present invention provides an exposure apparatus for Fresnel's holographic screens characterized by the following features. A light source emits a coherent beam. A holder supports a photosensitive element on which a hologram is formed. Expand and irradiating means converts the coherent beam emitted from the light source into a light flux having an expanded width, and irradiates part of the expanded light flux directly on the photosensitive element as a reference beam. A plurality of optical sets, each consisting of a diffusing member and a directional-changing member, are provided to form interference fringes at local spots on the photosensitive element. The diffusing member diffuses the remainder of the expanded light flux while the directional-changing member changes its optical direction, thereby converting the remainder of the expanded light flux not irradiated directly to the photosensitive element into an object beam advancing toward the photosensitive element. This, the interference fringes of the hologram are formed on the photosensitive element by using the reference beam and the object beam.

It is preferable that a positional relationship between the plurality of optical sets and the photosensitive element is changed to form the interference fringes successively.

A sixth aspect of the present invention provides an exposure apparatus for Fresnel's characterized by the following features. A light source emits a coherent beam. A holder supports a photosensitive element on which a hologram is formed. Expanding means converts the coherent beam emitted from the light source into a light flux having an expanded width. Diffusing means converts part of the expanded light flux into an object beam, and irradiates the object beam directly on the photosensitive element. And, directional-changing means changes an optical direction of the remainder of the expanded light flux to convert the remainder of the expanded light flux into a reference beam advancing toward the photosensitive element. Thus, interference fringes of the hologram are formed on the photosensitive element by using the reference beam and the object beam.

According to the features of preferred embodiments of the sixth aspect invention, a solid transparent member is disposed on an optical path extending from a split point of the reference beam and the object beam to the photosensitive element. A plurality of optical sets, each consisting of a diffusing member and a directional-changing member, are provided to form the interference fringes at local spots on the photosensitive element. There is a shifting means for changing a positional relationship between the optical sets and the photosensitive element.

A seventh aspect of the present invention provides an exposure apparatus for Fresnel's characterized by the following features. A light source emits a coherent beam. A holder supports a photosensitive element on which a hologram is formed. Expanding means converts the coherent beam emitted from the light source into a light flux having an expanded width. Scattering means converts part of the expanded light flux into an object beam and irradiating the object beam directly on the photosensitive element. And, directional-changing means changes an optical direction of the remainder of the expanded light flux to convert the remainder of the expanded light flux into a reference beam advancing toward the photosensitive element. Thus, interference fringes of the hologram are formed on the photosensitive element by using the reference beam and the object beam.

According to the features of preferred embodiments of the seventh aspect invention, a plurality of optical sets, each consisting of a scattering member and a directional-changing member, are provided to form the interference fringes at local spots on the photosensitive element. A shifting means is provided to change a positional relationship between the optical sets and the photosensitive element.

An eighth aspect of the present invention provides an exposure apparatus for Fresnel's characterized by the following features. A light source emits a coherent beam. A holder supports a photosensitive element on which a hologram is formed. Expand and irradiating means converts the coherent beam emitted from the light source into a light flux having an expanded width, and irradiates part of the expanded light flux directly on the photosensitive element as a reference beam. And, directional-change and diverging means diverges the remainder of the expanded light flux and changes its optical direction, thereby converting the remainder of the expanded light flux not irradiated directly to the photosensitive element into an object beam advancing toward the photosensitive element. Thus, interference fringes of the hologram are formed on the photosensitive element by using the reference beam and the object beam.

Furthermore, an object of the present invention is to adjust the optical length of either the reference beam or the object beam before it reaches the photosensitive element to obtain an optimum hologram with accurate interference fringes.

Still further, another object of the present invention is to feedback control the formation of the hologram by monitoring the interference fringes formed on the photosensitive element, to obtain stabilized holographic screens having excellent transparency.

Yet further, another object of the present invention is to adjust the physical quantities of the optical components of the exposure apparatus for holographic screens by controlling the values of electric currents, voltages, electric fields, magnetic fields or the like, to optimize the optical length of the reference beam or the object beam.

Still further, another object of the present invention is to adjust a positional relationship between the photosensitive element and a recording object by using an actuator to adequately control the formation of interference fringes of the hologram formed on the photosensitive element.

Moreover, another object of the present invention is to positively suppress the formation of Lippmann's hologram obstructive to the formation of Fresnel's hologram.

In order to accomplish the above and other related objects, a ninth aspect of the present invention provides a hologram manufacturing method based on a single light flux exposure operation, comprising the following steps. A recording object is disposed at one side of a photosensitive element. Part of a light flux, as a reference beam, is irradiated to the other side of the photosensitive element. Another part of the light flux, penetrating the photosensitive element and then reflected by the recording object, is converted into an object beam advancing toward the photosensitive element. An optical length of at least one of the reference beam and the object beam is adjusted to form desired interference fringes on the photosensitive element by using the reference beam and the object beam.

According to the preferred embodiments of the present invention, it is preferable that the optical length of at least one of the reference beam and the object beam is adjusted in response to a monitoring result of interference fringes formed on the photosensitive element.

A tenth aspect of the present invention provides a hologram exposure apparatus based on a single light flux exposure operation, characterized by the following features. A light source emits a coherent beam. A first holder supports a photosensitive element on which a hologram is formed. An optical system is disposed at one side of the photosensitive element for irradiating part of the coherent beam emitted from the light source directly on the photosensitive element as a reference beam. A second holder supports a recording object, disposed at the other side of the photosensitive element, so that another part of the coherent beam penetrating the photosensitive element is reflected by the recording object and converted into an object beam advancing toward the photosensitive element. And, an optical length adjusting means adjusts an optical length of at least one of the reference beam and the object beam in response to a control signal, so that desired interference fringes are formed on the photosensitive element by using the reference beam and the object beam.

According to the features of the preferred embodiments, a control means controls the optical length adjusting means in response to an output of the monitoring means detecting the interference fringes formed on the photosensitive element.

An eleventh aspect of the present invention provides a hologram manufacturing method based on a single light flux exposure operation, comprising the following steps. A recording object is disposed at one side of a photosensitive element. Part of a light flux, as a reference beam, is irradiated to the other side of the photosensitive element. Another part of the light flux, penetrating the photosensitive element and then reflected by the recording object, is converted into an object beam advancing toward the photosensitive element. A positional relationship between the photosensitive element and the recording object is adjusted to form desired interference fringes on the photosensitive element by using the reference beam and the object beam.

According to the preferred embodiments of the present invention, it is preferable that the positional relationship between the photosensitive element and the recording object is adjusted in response to a monitoring result of interference fringes formed on the photosensitive element.

A twelfth aspect of the present invention provides a hologram exposure apparatus based on a single light flux exposure operation, characterized by the following features. A light source emits a coherent beam. A first holder supports a photosensitive element on which a hologram is formed. An optical system is disposed at one side of the photosensitive element for irradiating part of the coherent beam emitted from the light source directly on the photosensitive element as a reference beam. A second holder supports a recording object, disposed at the other side of the photosensitive element, so that another part of the coherent beam penetrating the photosensitive element is reflected by the recording object and converted into an object beam advancing toward the photosensitive element. And, a position adjusting means adjusts a positional relationship between the photosensitive element and the recording object in response to a control signal, so that desired interference fringes are formed on the photosensitive element by using the reference beam and the object beam.

According to the features of the preferred embodiments, a control means controls the position adjusting means in response to an output of a monitoring means detecting the interference fringes formed on the photosensitive element.

A thirteenth aspect of the present invention provides a manufacturing method for Fresnel's holographic screens based on a single light flux exposure operation, comprising the following steps. A half mirror is disposed at one side of a photosensitive element, so that part of a light flux penetrating the half mirror, serving as a reference beam, is irradiated directly to the photosensitive element. A recording object is disposed at the other side of the photosensitive element, so that another part of the light flux, penetrating both of the half mirror and the photosensitive element and then reflected by the recording object and further reflected by the half mirror, is converted into an object beam advancing toward the photosensitive element. An optical length of at least one of the reference beam and the object beam is adjusted, so as to suppress a formation of Lippmann's hologram formed by the reference beam and a beam reflected by the recording object and then directly entering the photosensitive element. And, a Fresnel's hologram is formed on the photosensitive element by using the reference beam and the object beam.

According to the features of the preferred embodiments, the optical length of at least one of the reference beam and the object beam is adjusted during an exposure operation in such a manner that the position of interference fringes of the Lippmann's hologram formed on the photosensitive element is shifted by an amount equivalent to a half of a gap of the interference fringes.

A fourteenth aspect of the present invention provides an exposure apparatus for Fresnel's holographic screens, characterized by the following features. A light source emits a coherent beam. A first holder supports a photosensitive element on which a hologram is formed. An optical system is disposed at one side of the photosensitive element. A half mirror is disposed between the optical system and the photosensitive element, so that part of the coherent beam emitted from the light source and penetrating the half mirror is irradiated directly on the photosensitive element as a reference beam. A second holder supports a recording object, disposed at the other side of the photosensitive element, so that another part of the coherent beam penetrating both of the half mirror and the photosensitive element is reflected by the recording object. Then, the beam reflected by the recording object is further reflected by the half mirror as an object beam advancing toward the photosensitive element. An optical length adjusting means adjusts an optical length of at least one of the reference beam and the object beam in response to a control signal, so that a Fresnel's hologram is formed on the photosensitive element by using the reference beam and the object beam.

According to the features of the preferred embodiments, a control means controls the optical length adjusting means to suppress a formation of Lippmann's hologram formed by the reference beam and a beam reflected by the recording object and then directly entering the photosensitive element. In this case, the optical length adjusting means adjusts the optical length of at least one of the reference beam and the object beam during an exposure operation in such a manner that the position of interference fringes of the Lippmann's hologram formed on the photosensitive element is shifted by an amount equivalent to a half of a gap of the interference fringes.

A fifteenth aspect of the present invention provides a manufacturing method for Fresnel's holographic screens based on a single light flux exposure operation, comprising the following steps. A half mirror is disposed at one side of a photosensitive element, so that part of a light flux penetrating the half mirror, serving as a reference beam, is irradiated directly to the photosensitive element. A recording object is disposed at the other side of the photosensitive element, so that another part of the light flux penetrating both of the half mirror and the photosensitive element and then reflected by the recording object and further reflected by the half mirror is converted into an object beam advancing toward the photosensitive element. A positional relationship between the photosensitive element and the recording object is adjusted so as to suppress a formation of Lippmann's hologram formed by the reference beam and a beam reflected by the recording object and then directly entering the photosensitive element. And, a Fresnel's hologram is formed on the photosensitive element by using the reference beam and the object beam.

According to the features of the preferred embodiment, the positional relationship between the photosensitive element and the recording object is adjusted during an exposure operation in such a manner that the position of interference fringes of the Lippmann's hologram formed on the photosensitive element is shifted by an amount equivalent to a half of a gap of the interference fringes.

A sixteenth aspect of the present invention provides an exposure apparatus for Fresnel's holographic screens, characterized by the following features. A light source emits a coherent beam. A first holder supports a photosensitive element on which a hologram is formed. An optical system is disposed at one side of the photosensitive element. A half mirror is disposed between the optical system and the photosensitive element, so that part of the coherent beam emitted from the light source and penetrating the half mirror is irradiated directly on the photosensitive element as a reference beam. A second holder supports a recording object, disposed at the other side of the photosensitive element, so that another part of the coherent beam penetrating both of the half mirror and the photosensitive element is reflected by the recording object. Then, the beam reflected by the recording object is further reflected by the half mirror as an object beam advancing toward the photosensitive element. A position adjusting means adjusts a positional relationship between the photosensitive element and the recording object in response to a control signal, so that a Fresnel's hologram is formed on the photosensitive element by using the reference beam and the object beam.

According to the features of the preferred embodiments, a control means controls the position adjusting means to suppress a formation of Lippmann's hologram formed by the reference beam and a beam reflected by the recording object and then directly entering the photosensitive element. In this case, the position adjusting means adjusts the positional relationship between the photosensitive element and the recording object during an exposure operation in such a manner that the position of interference fringes of the Lippmann's hologram formed on the photosensitive element is shifted by an amount equivalent to a half of a gap of the interference fringes.

Furthermore, an object of the present invention is to provide a hologram manufacturing method and a related exposure apparatus capable of optimizing the intensity of object beam entering the photosensitive element, and providing holographic screens having uniform and preferable directionality.

Another object of the present invention is to randomize an incident beam by using a spherical reaction container to obtain an optimum object beam.

Still further, another object of the present invention is to control the ratio of beam intensities of the reference beam and the object beam to obtain an excellent hologram.

Yet further, another object of the present invention is to eliminate the deviation in the distribution of object beam intensities along the photosensitive element.

Moreover, another object of the present invention is to increase the efficiency in the use of beam energy emitted from a light source.

In order to accomplish the above and other related objects, a seventeenth aspect of the present invention provides a manufacturing method or holographic screens comprising the following steps. A photosensitive element is supported at an opening of a reaction container which has a spherical inner wall surface formed by a diffusing and reflecting member. A light flux with an expanded width is irradiated as a reference beam advancing from an outside to the photosensitive element. Part of the reference beam, entering in the reaction container through the opening after passing through the photosensitive element, is converted by the inner wall surface into a scattered beam serving as an object beam returning to the photosensitive element. Thus, interference fringes are formed on the photosensitive element by using the reference beam and the object beam.

An eighteenth aspect of the present invention provides a manufacturing method for holographic screens comprising the following steps. A photosensitive element is supported at an opening of a reaction container which has a spherical inner wall surface formed by a diffusing and reflecting member and an incident window other than the opening. A light flux with an expanded width is irradiated as a reference beam advancing from an outside to the photosensitive element. An incident beam introduced from the incident window and part of the reference bean, entering in the reaction container through the opening after passing through the photosensitive element, are converted by the inner wall surface into a scattered beam serving as an object beam returning to the photosensitive element. Thus, interference fringes are formed on the photosensitive element by using the reference beam and the object beam.

A nineteenth aspect of the present invention provides a manufacturing method for holographic screens comprising the following steps. A photosensitive element is supported at an opening of a reaction container which has a spherical inner wall surface formed by a diffusing and reflecting member and an incident window other than the opening. A beam is introduced into the reaction container from the incident window. Part of the introduced beam is introduced into a reference beam directly entering the photosensitive element after a single reflection at a predetermined light-receiving point on the inner wall surface of the reaction container. The remainder of the introduced beam is converted into an object beam entering the photosensitive element through a plurality of reflections at the inner wall surface of the reaction container. Thus, interference fringes are formed on the photosensitive element by using the reference beam and the object beam.

A twentieth aspect of the present invention provides a manufacturing method for holographic screens comprising the following steps. A photosensitive element is supported at an opening of a reaction container which has a spherical inner wall surface formed by a diffusing and reflecting member and an incident window other than the opening, A beam is introduced into the reaction container from the incident window. The introduced beam is irradiated to a beam converting member, so that part of the introduced beam directly enters the photosensitive element as a reference beam, while the remainder of the introduced beam is converted into an object beam entering the photosensitive element through at least one reflection at the inner wall surface of the reaction container. Thus, interference fringes are formed on the photosensitive element by using the reference beam and the object beam.

A twenty-first aspect of the present invention provides a manufacturing method for holographic screens comprising the following steps. A photosensitive element is supported at an opening of a reaction container which has a spherical inner wall surface formed by a diffusing and reflecting member and an incident window other than the opening. A light flux with an expanded width is introduced into the reaction container from the incident window. The introduced beam is used as a reference beam directly entering the photosensitive element without a reflection at the inner wall surface of the reaction container. The remainder of the introduced beam is used as an object beam entering the photosensitive element through at least one reflection at the inner wall surface of the reaction container. Thus, interference fringes are formed on the photosensitive element by using the reference beam and the object beam.

A twenty-second aspect of the present invention provides an exposure apparatus for holographic screens, characterized by the following features. A reaction container has a spherical inner wall surface formed by a diffusing and reflecting member, and an opening for supporting a photosensitive element. An optical system irradiates a light flux with an expanded width, as a reference beam, advancing from an outside to the photosensitive element supported by the opening of the reaction container. Part of the reference beam enters in the reaction container through the opening after passing through the photosensitive element and is converted by the inner wall surface into a scattered beam serving as an object beam returning to the photosensitive element, thereby forming interference fringes on the photosensitive element by using the reference beam and the object beam.

A twenty-third aspect of the present invention provides an exposure apparatus for holographic screens, characterized by the following features. A reaction container has a spherical inner wall surface formed by a diffusing and reflecting member, an opening for supporting a photosensitive element, and an incident window other than the opening. An optical system irradiates a light flux with an expanded width, as a reference beam, advancing from an outside to the photosensitive element supported by the opening of the reaction container and further supplying another beam introduced from the incident window. Part of the reference beam enters in the reaction container through the opening after passing through the photosensitive element and is converted by the inner wall surface into a scattered beam serving as an object beam returning to the photosensitive element, while the another beam introduced from the incident window is also converted by the inner wall surface into the object beam returning to the photosensitive element, thereby forming interference fringes on the photosensitive element by using the reference beam and the object beam.

Preferably, a light-shielding member is provided in the vicinity of a light-receiving point of the inner wall surface where the another beam entering through the incident window is directly irradiated, so as to prevent the another beam from immediately reaching the photosensitive element after a single reflection at the light-receiving point.

A twenty-fourth aspect of the present invention provides an exposure apparatus for holographic screens, characterized by the following features. A reaction container has a spherical inner wall surface formed by a diffusing and reflecting member, an opening for supporting a photosensitive element, and an incident window other than the opening. An optical system introduces a beam into the reaction container from the incident window. Part of the introduced beam is converted into a reference beam directly entering the photosensitive element after a single reflection at a predetermined light-receiving point on the inner wall surface of the reaction container, while the remainder of the introduced beam is converted into an object beam entering the photosensitive element through a plurality of reflections at the inner wall surface of the reaction container, thereby forming interference fringes on the photosensitive element by using the reference beam and the object beam.

A twenty-fifth aspect of the present invention provides an exposure apparatus for holographic screens, characterized by the following features. A reaction container has a spherical inner wall surface formed by a diffusing and reflecting member, an opening for supporting a photosensitive element, and an incident window other than the opening. An optical system introduces a beam into the reaction container from the incident window. A beam converting member converts part of the introduced beam into a reference beam directly entering the photosensitive element, and converts the remainder of the introduced beam into an object beam entering the photosensitive element through at least one reflection at the inner wall surface of the reaction container, thereby forming interference fringes on the photosensitive element by using the reference beam and the object beam.

A twenty-sixth aspect of the present invention provides an exposure apparatus for holographic screens, characterized by the following features. A reaction container has a spherical inner wall surface formed by a diffusing and reflecting member, an opening for supporting a photosensitive element, and an incident window other than the opening. An optical system introduces a light flux with an expanded width into the reaction container from the incident window. Part of the introduced beam is used as a reference beam directly entering the photosensitive element without a reflection at the inner wall surface of the reaction container, while the remainder of the introduced beam is used as an object beam entering the photosensitive element through at least one reflection at the inner wall surface of the reaction container, thereby forming interference fringes on the photosensitive element by using the reference beam and the object beam.

In this case, it is preferable that another incident window is provided to introduce another beam into the reaction container so that all of the another beam is reflected by the inner wall surface and converted into the object beam.

Furthermore, it is possible to provide a plurality of reaction containers at different portions on the photosensitive element so that a plurality of interference fringes are formed at a single exposure operation, and the optical system irradiates the light flux to each opening of the plurality of reaction containers. Preferably, a positional relationship between the reaction container and the photosensitive element is changeable to form interference fringes successively at different portions on the photosensitive element. Moreover, an inside space of the reaction container may be filled with solid transparent member.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
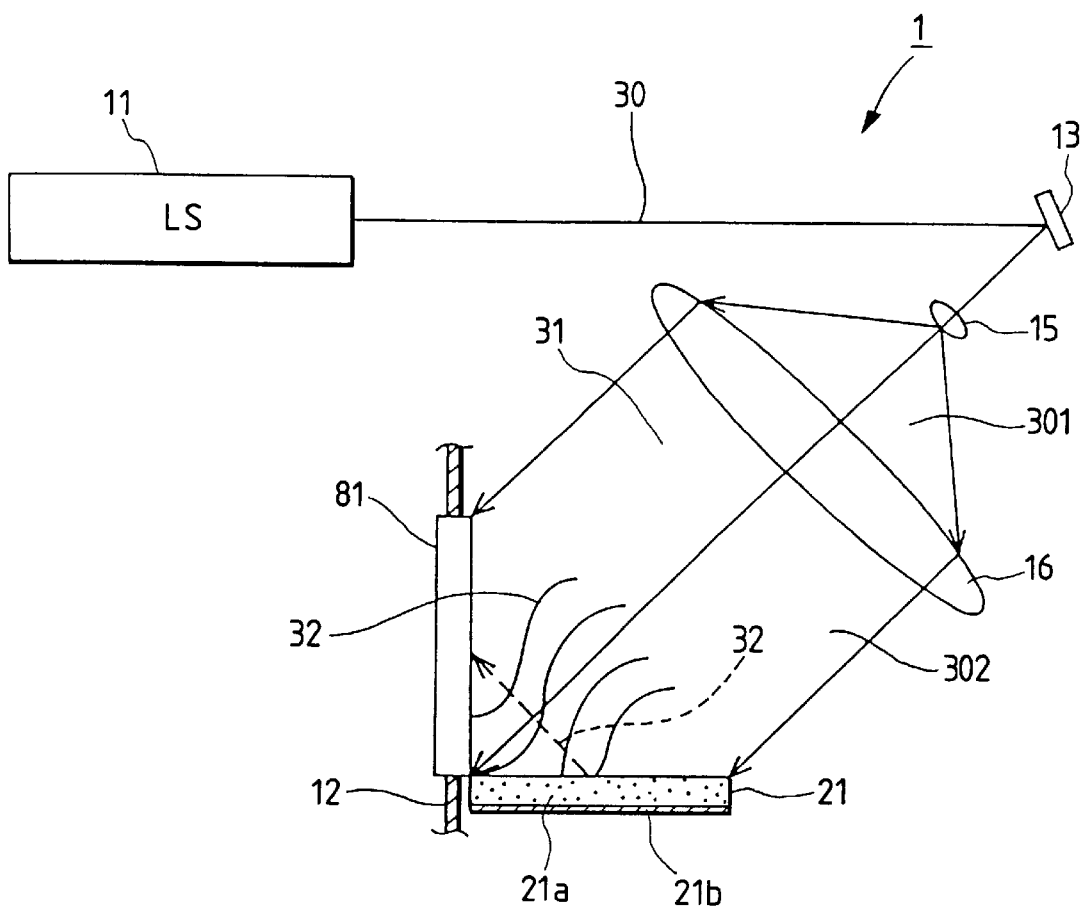
FIG. 1 is a schematic view showing an arrangement of a hologram exposure apparatus in accordance with a first embodiment of the present invention.

Preferred embodiments of the present invention will be explained hereinafter with reference to accompanied drawings. Identical parts are denoted by the same reference numerals throughout the drawings.

First embodiment

FIG. 1 shows an exposure apparatus 1 for Fresnel's holographic screens in accordance with a first embodiment of the present invention. This exposure apparatus 1 comprises a light source 11 emitting a coherent beam 30, and a holder 12 holding a photosensitive element 81 at a predetermined position. An expand/irradiation device, such as a combination of a divergent lens 15 and a collimator lens 16, is disposed in the vicinity of the holder 12. The expand and irradiation device converts the coherent beam 30, emitted from light source 11, into light fluxes 301 and 302 having widths expanded. Part of the expanded light flux 302 is directly irradiated to the photosensitive element 81 as a reference beam 31. A directional-change and diffusion member 21 converts the remainder of the expanded light flux 302 into a scattered beam serving as an object beam 32 and changes the direction of the same toward the photosensitive element 81. Thus, the object beam 32 is irradiated to the photosensitive element 81. With the above-described irradiations of two-directional beams (i.e., reference beam 31 and object beam 32), the photosensitive element 81 is formed into a hologram with interference fringes formed thereon.

The directional-change and diffusion member 21, disclosed in this embodiment, is an integrated component having both functions of changing the direction of the beam and diffusing the beam.

A mirror 13 receives the coherent beam 30 emitted from light source 11 and reflects it toward divergent lens 15. The coherent beam 30 is then converted into a divergent pencil of light flux 301 by the divergent lens 15. Then, the divergent light flux 301 is converted into the parallel light flux 302 by the collimator lens 16.

According to this embodiment, the optical length from light source 11 to photosensitive element 81 is shorter than a coherent distance for each of the reference beam 31 and object beam 32.

The coherent beam 30 used in this embodiment is, for example, a laser beam having a wavelength of 514.5 nm. The photosensitive element 81 is, for example, photosensitive polymer.

Furthermore, the directional-change and diffusion member 21 is an integration of a diffusion member 21a, such as ground glass or opal glass, having a capability of diffusing transmitted light and a reflection member 21b, such as an aluminum film, attached on a reverse surface of the diffusion member 21a.

According to the hologram manufacturing method using the above-described exposure apparatus 1, the coherent beam 30 is converted into parallel light flux 302 having the expanded width in the vicinity of the photosensitive element 81. Part of the expanded light flux 302 is irradiated directly to the photosensitive element 81 as reference beam 31. Accordingly, the reference beam 31, after the beam 30 is split into object beam 32 and reference beam 31, has a relatively short optical path to reach the photosensitive element 81. This is advantageous to suppress the adverse effect of the fluctuation of intervening medium (i.e., air) between the split point and the photosensitive element 81.

On the other hand, the remainder of the expanded light flux 302 is converted into a scattered beam and reflected by the directional-change and diffusion member 21 in front of the photosensitive element 81.

With this arrangement, the incident angle of object beam 32 to the photosensitive element 81 can be adequately adjusted by changing the angle of the directional-change and diffusion member 21 to the photosensitive element 81. Furthermore, the reflection beam going toward the photosensitive element 81 can easily expand or diverge. The optical distance of object beam 32 required to reach the photosensitive element 81, after the beam 30 is split into object beam 32 and reference beam 31, can be shortened.

As described above, according to the exposure apparatus 1 of the first embodiment, it becomes possible to shorten both of the optical distances of reference beam 31 and object beam 32, after the coherent beam 30 is converted into the parallel light flux 302. This is effective to suppress the adverse effect of disturbances, such as the fluctuation of intervening medium (i.e., air) between the split point and the photosensitive element 81. Accordingly, the interference fringes are accurately formed on the surface of photosensitive element 81. Thus, the first embodiment of the present invention provides a manufacturing method for Fresnel's hologram screens capable of stabilizing the formation of interference fringes during the exposure operation as well as realizing excellent transparency.

As apparent from the foregoing description, the first embodiment of the present invention provides an exposure apparatus for Fresnel's holographic screens, which comprises a light source (11) for emitting a coherent beam (30); a holder (12) for supporting a photosensitive element (81) on which a hologram is formed; expand and irradiating means (15, 16) for converting the coherent beam (30) emitted from the light source (11) into a light flux (301, 302) having an expanded width and for irradiating part of the expanded light flux (302) directly on the photosensitive element (81) as a reference beam (31); and directional-change and diffusing means (21) for diffusing the remainder of the expanded light flux (302) and changing an optical direction thereof, thereby converting the remainder of the expanded light flux (302) not irradiated directly to the photosensitive element (81) into a scattered beam advancing as an object beam (32) toward said photosensitive element (81). Thus, the interference fringes of the hologram are formed on the photosensitive element (81) by using these reference beam (31) and object beam (32).

Furthermore, the first embodiment of the present invention provides a manufacturing method for Fresnel's holographic screens comprising the steps of: converting a coherent beam (30) into a light flux (301, 302) having an expanded width at a predetermined position to a photosensitive element (81); irradiating part of the expanded light flux (302) directly on the photosensitive element (81) as a reference beam (31); diffusing the remainder of the expanded light flux (302) and changing an optical direction thereof, thereby converting the remainder of the expanded light flux (302) not irradiated directly to the photosensitive element (81) into a scattered beam advancing as an object beam (32) toward the photosensitive element (81); and forming interference fringes on the photosensitive element (81) by using the reference beam (31) and the object beam (32).

According to the first embodiment, it is preferable that the directional-change and diffusing means (21) is a single component.

Second embodiment

Figure 2:
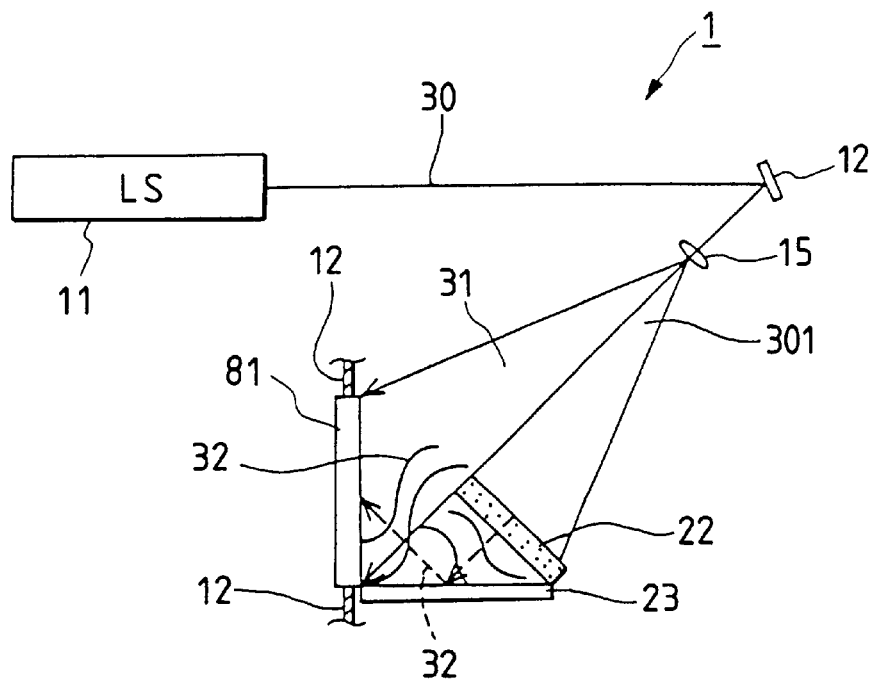
FIG. 2 is a schematic view showing an arrangement of a hologram exposure apparatus in accordance with a second embodiment of the present invention.

A second embodiment of the present invention, as shown in FIG. 2, discloses a modified exposure apparatus 1 for Fresnel's holographic screens. The second embodiment is different from the first embodiment in that the divergent light flux 301 is directly split into reference beam 31 and object beam 32 rather than being once converted into parallel light flux 302. And, a diffusion member 22 is provided independently of a plane mirror 23 serving as a directional-change member. Thus, the second embodiment does not require the collimator lens 16 shown in FIG. 1.

This arrangement is advantageous in that the optical length between diffusion member 22 and the photosensitive element 81 can be enlarged. Furthermore, the view region of the holographic screen can be adjusted by changing the incident angle of object beam 32 by using the plane mirror 23. Other arrangements are substantially the same as those disclosed in the first embodiment.

As apparent from the foregoing description, the second embodiment of the present invention provides an exposure apparatus and a manufacturing method for Fresnel's holographic screens comparable to those explained in the first embodiment.

Furthermore, according to the second embodiment, the directional-change and diffusing means is a combination of a diffusing member (22) and a directional-changing member (23) provided independently.

Third embodiment

Figure 3:
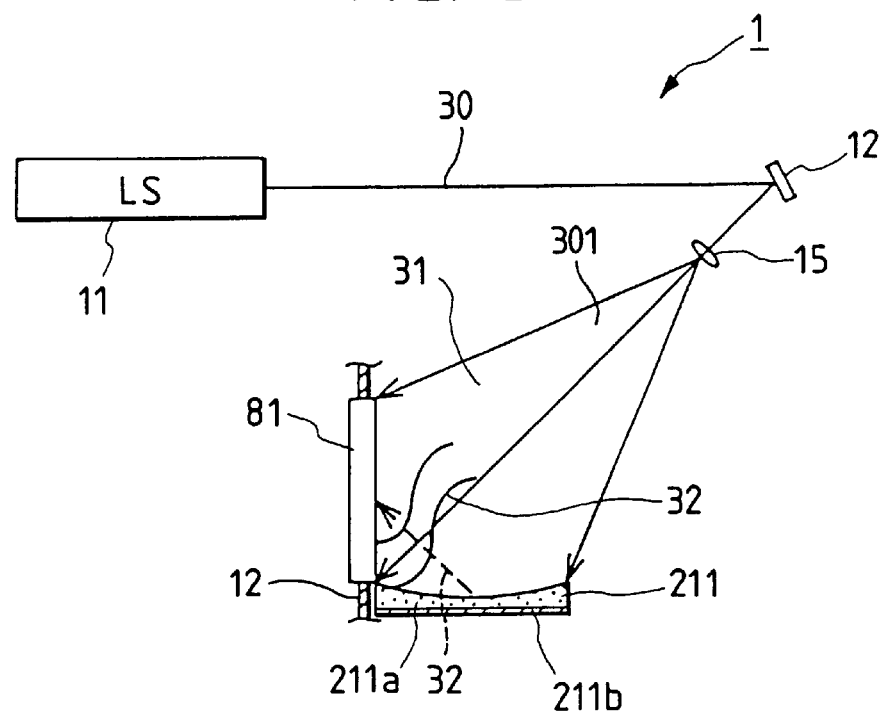
FIG. 3 is a schematic view showing an arrangement of a hologram exposure apparatus in accordance with a third embodiment of the present invention.

A third embodiment of the present invention, as shown in FIG. 3, discloses a modified exposure apparatus 1 for Fresnel's holographic screens. The third embodiment is different from the first embodiment in that the divergent light flux 301 is directly split into reference beam 31 and object beam 32 rather than being once converted into parallel light flux 302. And, a directional-change and diffusion member 211, possessing the reflection characteristics of a concave mirror, is provided closely to the photosensitive element 81. The directional-change and diffusion member 211 consists of a diffusion member 211*a*, such as ground glass or opal glass, having a capability of diffusing transmitted light and a reflection member 211*b*, such as an aluminum film, attached on a reverse surface of the diffusion member 211*a*.

According to the arrangement of the third embodiment, only the central part of the light flux 302 reflected from the directional-change and diffusion member 211 is irradiated to the photosensitive element 81. In general, light positioned at a center of the divergent light flux has smaller color dispersion. Irradiating such less-color-dispersion light to the photosensitive element 81 is effective to obtain holographic screens having less color dispersion. Thus, the third embodiment of the present invention provides holographic screens excellent in reproducibility.

As apparent from the foregoing description, the third embodiment of the present invention provides an exposure apparatus and a manufacturing method for Fresnel's holographic screens comparable to those explained in the first embodiment.

Furthermore, according to the third embodiment, the directional-change and diffusing means is a concave mirror-like single component (211) integrating a diffusing member and a directional-changing member.

Fourth embodiment

Figure 4:
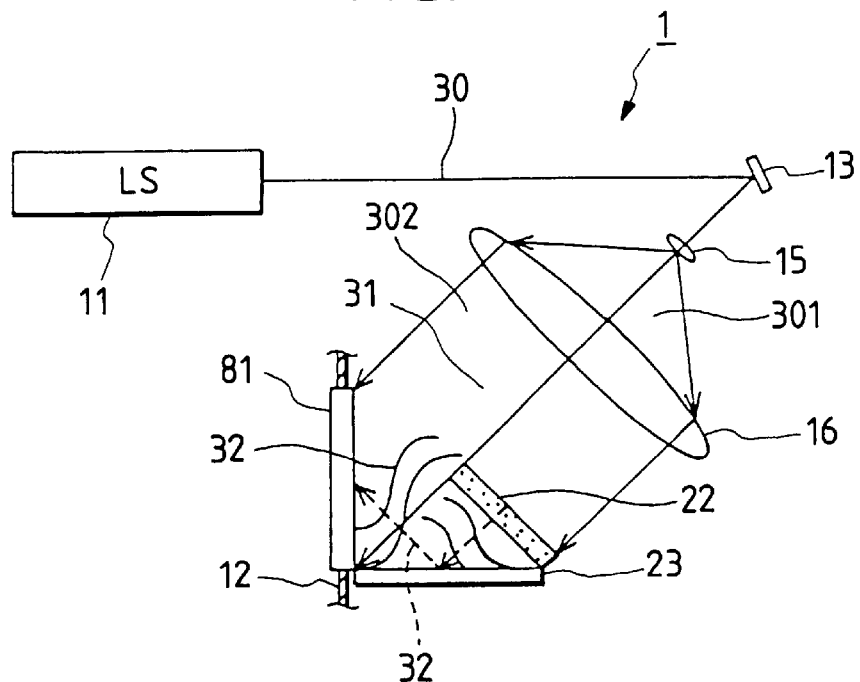
FIG. 4 is a schematic view showing an arrangement of a hologram exposure apparatus in accordance with a fourth embodiment of the present invention.

A fourth embodiment of the present invention, as shown in FIG. 4, discloses a modified exposure apparatus 1 for Fresnel's holographic screens. The fourth embodiment is different from the second embodiment in that the divergent light flux 301 is first converted into parallel light flux 302 by collimator lens 16, and then split into reference beam 31 and object beam 32. Other arrangements are substantially the same as those disclosed in the second embodiment.

Accordingly, the fourth embodiment of the present invention provides an exposure apparatus and a manufacturing method for Fresnel's holographic screens comparable to those explained in the first or second embodiment.

Fifth embodiment

Figure 5:
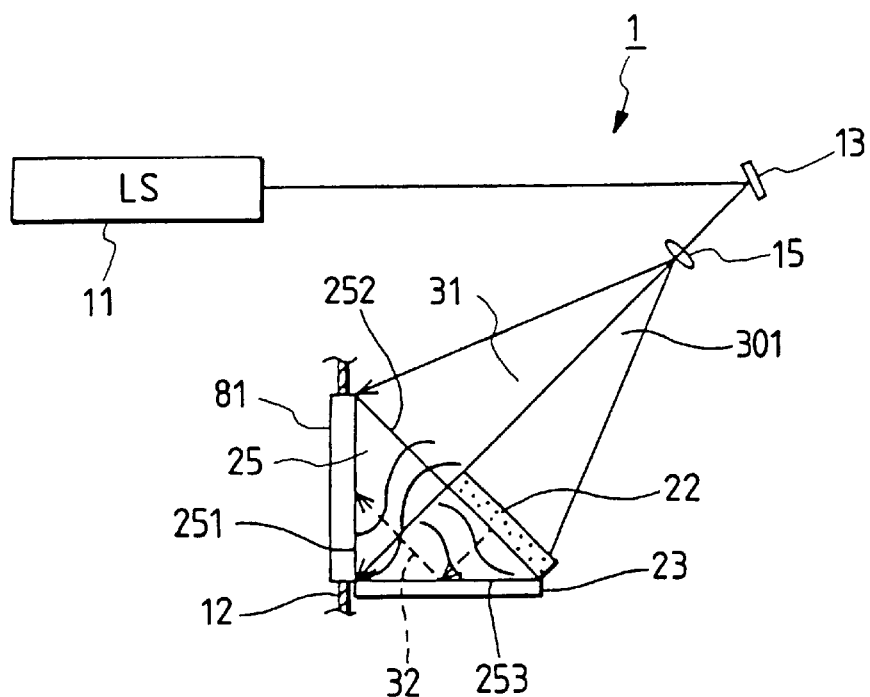
FIG. 5 is a schematic view showing an arrangement of a hologram exposure apparatus in accordance with a fifth embodiment of the present invention.

A fifth embodiment of the present invention, as shown in FIG. 5, discloses a modified exposure apparatus 1 for Fresnel's holographic screens. The fifth embodiment is different from the second embodiment in that a triangular prism 25, having a first surface 251, a second surface 252 and a third surface 253, is disposed on the optical pass of the divergent light flux 301. More specifically, the first surface 251 of prism 25 is brought into hermetical contact with the surface of photosensitive element 81. The divergent light flux 301, after passing through the divergent lens 15, enters in the prism 25 from the second surface 252. The third surface 253 of prism 25 is brought into hermetical contact with the surface of plane mirror 23. The diffusion member 22 is placed on the second surface 252 in the same position as that disclosed in the second embodiment.

According to the arrangement of the fifth embodiment, optical paths of reference beam 31 and object beam 32 advance across the prism 25 which is a transparent solid member free from the fluctuation of medium. Thus, the formation of interference fringes on the photosensitive element 81 can be further stabilized. Other arrangements are substantially the same as those disclosed in the second embodiment.

As apparent from the foregoing description, the fifth embodiment of the present invention provides an exposure apparatus and a manufacturing method for Fresnel's holographic screens comparable to those explained in the first or second embodiment.

Furthermore, according to the fifth embodiment, it is preferable that a prism (25) is disposed on an optical path of the divergent light flux (301). And, a first surface (251) of this prism (25) is brought into contact with the photosensitive element (81). A second surface (253) receives the divergent light flux (301). And, a third surface (253) is brought into contact with a directional-changing member (23) serving as part of the directional-change and diffusing means.

Sixth embodiment

Figure 6:
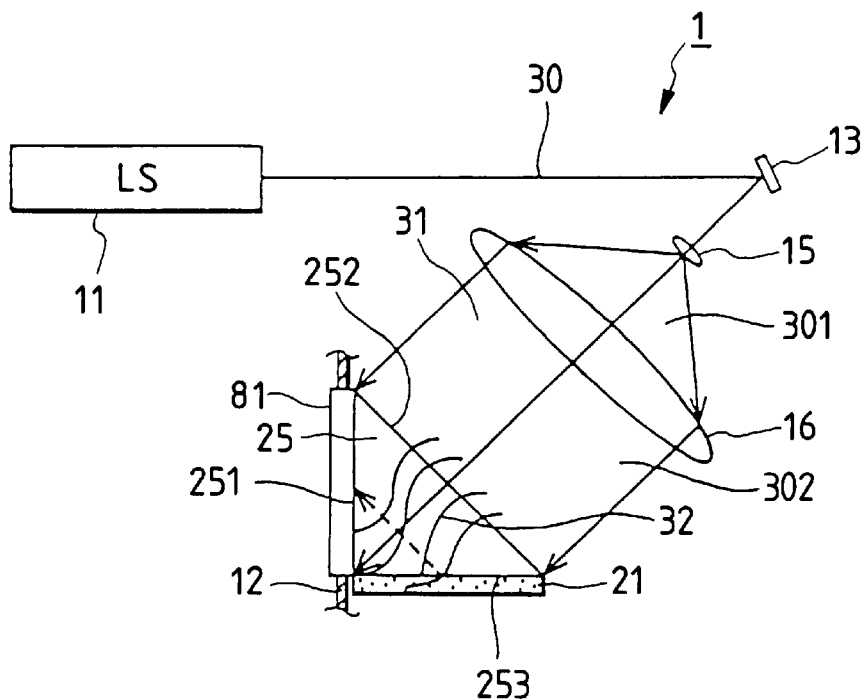
FIG. 6 is a schematic view showing an arrangement of a hologram exposure apparatus in accordance with a sixth embodiment of the present invention.

A sixth embodiment of the present invention, as shown in FIG. 6, discloses a modified exposure apparatus 1 for Fresnel's holographic screens. The sixth embodiment is different from the first embodiment in that the triangular prism 25, having first surface 251, second surface 252 and third surface 253, is disposed on the optical pass of the parallel light flux 302. More specifically, the first surface 251 of prism 25 is brought into hermetical contact with the surface of photosensitive element 81. The parallel light flux 302, after passing through the collimator 16, enters in the prism 25 from the second surface 252. The third surface 253 of prism 25 is brought into hermetical contact with the surface of the directional-change and diffusion member 21.

According to the arrangement of the sixth embodiment, optical paths of reference beam 31 and object beam 32 advance across the prism 25 which is a transparent solid member free from the fluctuation of medium. Thus, the formation of interference fringes on the photosensitive element 81 can be further stabilized. Other arrangements are substantially the same as those disclosed in the second embodiment.

As apparent from the foregoing description, the sixth embodiment of the present invention provides an exposure apparatus and a manufacturing method for Fresnel's holographic screens comparable to those explained in the first or second embodiment.

Furthermore, according to the sixth embodiment, it is preferable that a prism (25) is disposed on an optical path of the parallel light flux (302). A first surface (251) of this prism (25) is brought into contact with the photosensitive element (81). A second surface (253) receives the parallel light flux (301). And, a third surface (253) is brought into contact with a directional-change and diffusing means (21).

Seventh embodiment

Figure 7:
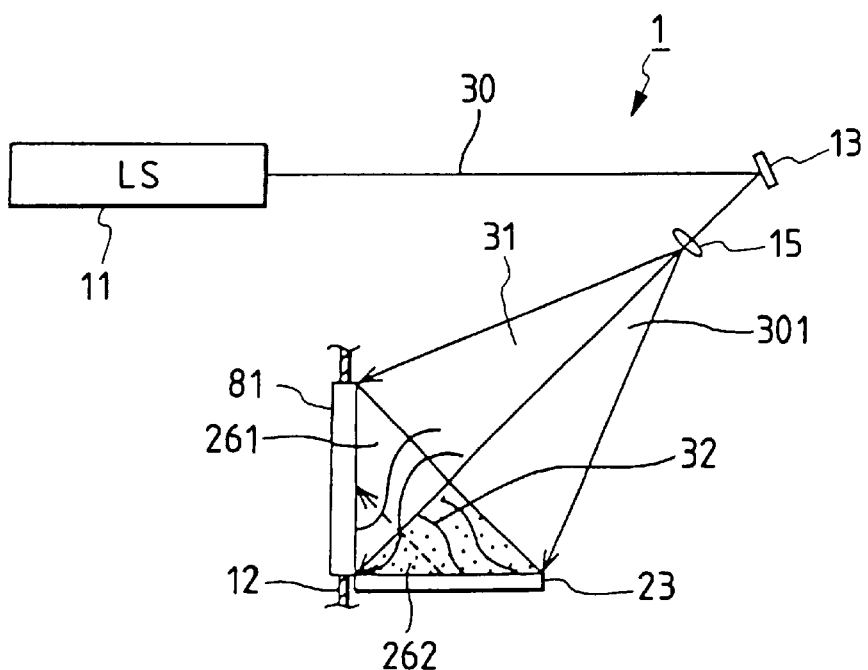
FIG. 7 is a schematic view showing an arrangement of a hologram exposure apparatus in accordance with a seventh embodiment of the present invention.

A seventh embodiment of the present invention, as shown in FIG. 7, discloses a modified exposure apparatus 1 for Fresnel's holographic screens. The seventh embodiment is different from the fifth embodiment in that the triangular prism 25 is replaced by a combination of a first prism 261 and a second prism 262. The first prism 261 has no ability of diffusing transmitted light, while the second prism 262, acting as the diffusion member, has the capability of diffusing the transmitted light.

With this arrangement, part of light flux 301 is transmitted through the first prism 261 and irradiated to the photosensitive element 81 without any reflection or diffusion. The remainder of light flux 301 is transmitted through the second prism 262 and diffused and reflected by the directional-change and diffusion member 21. Other arrangements are substantially the same as those disclosed in the fifth embodiment.

As apparent from the foregoing description, the seventh embodiment of the present invention provides an exposure apparatus and a manufacturing method for Fresnel's holographic screens comparable to those explained in the first or second embodiment.

Furthermore, according to the seventh embodiment, it is preferable that the prism is a combination of a first prism (261) having no ability of diffusing transmitted light and a second prism (262) having a capability of diffusing transmitted light. A first surface, to be brought into contact with the photosensitive element (81), is defined by said first prism (261). A second surface, receiving expanded light flux (301), is cooperatively defined by the first prism (261) and the second prism (262). And, a third surface, to be brought into contact with a directional-change member, is defined by the second prism (262).

Eighth embodiment

Figure 8:
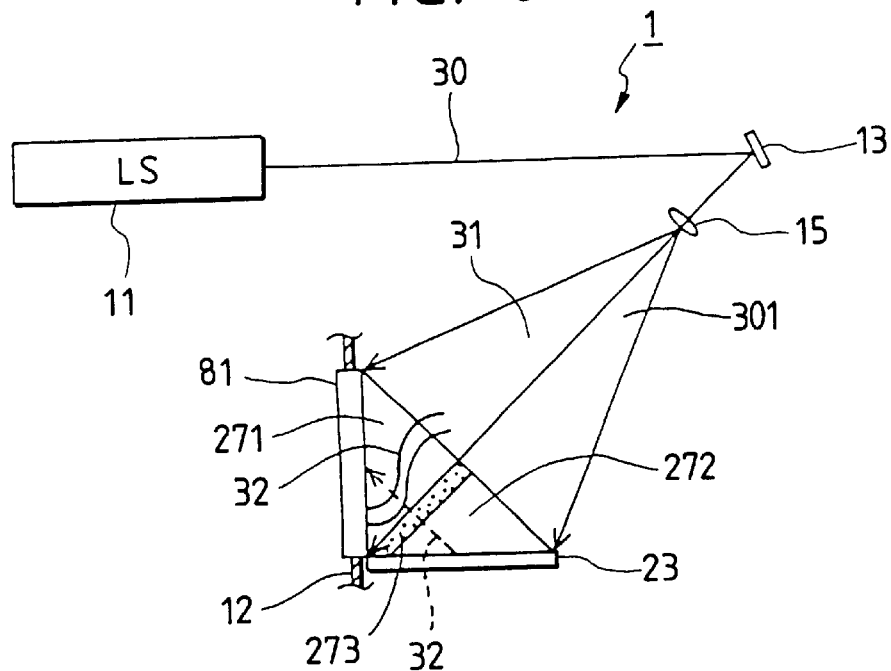
FIG. 8 is a schematic view showing an arrangement of a hologram exposure apparatus in accordance with an eighth embodiment of the present invention.

An eighth embodiment of the present invention, as shown in FIG. 8, discloses a modified exposure apparatus 1 for Fresnel's holographic screens. The eighth embodiment is different from the seventh embodiment in that two prisms 271 and 272 placed between photosensitive element 81 and plane mirror 23 are both transparent prism. Instead, a diffusion member 273, having capability of diffusing transmitted light, is interposed along the boundary of these prisms 271 and 272.

The arrangement of the eighth embodiment is advantageous in that the thickness of diffusion member 273 can be reduced. Thus, it becomes possible to obtain a holographic screen having a view region limited. Other arrangements are substantially the same as those disclosed in the seventh embodiment.

As apparent from the foregoing description, the eighth embodiment of the present invention provides an exposure apparatus and a manufacturing method for Fresnel's holographic screens comparable to those explained in the first or second embodiment.

Furthermore, according to the eighth embodiment, the prism comprises a diffusing section (273) provided on an optical path of the object beam (32) for diffusing transmitted light. Preferably, the diffusion section (273) is interposed between two prisms (271, 273).

Ninth embodiment

Figure 9:
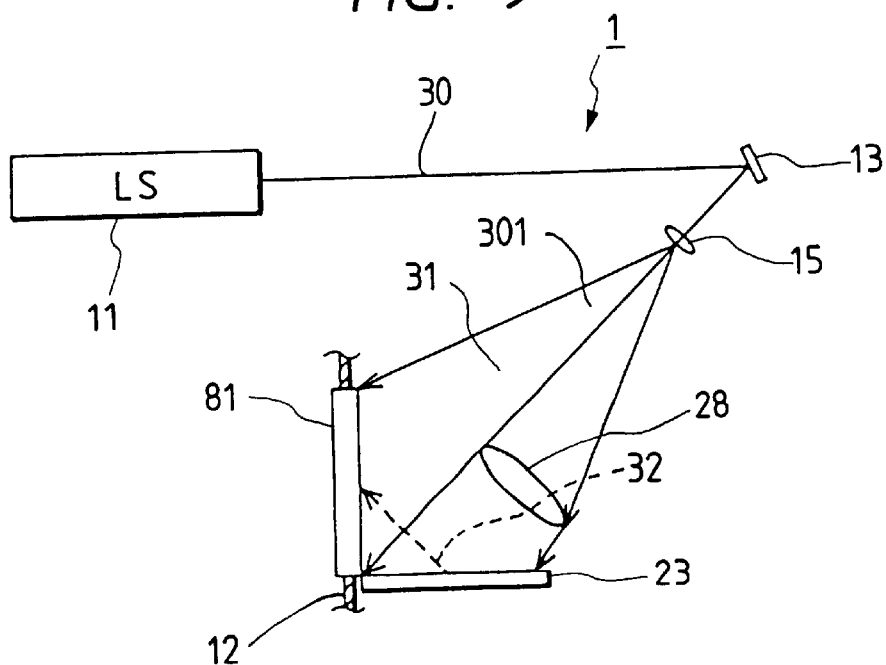
FIG. 9 is a schematic view showing an arrangement of a hologram exposure apparatus in accordance with a ninth embodiment of the present invention.

A ninth embodiment of the present invention, as shown in FIG. 9, discloses a modified exposure apparatus 1 for Fresnel's holographic screens. The ninth embodiment is different from the second embodiment in that the diffusion member 22 is replaced by a transmissive optical element (lens 28). Namely, the lens 28 is placed on the optical path of object beam 32, so that the object beam 32 passing through the lens 28 is reflected by plane mirror 23 and then irradiated on the photosensitive element 81. Other arrangements are substantially the same as those disclosed in the second embodiment.

Accordingly, the ninth embodiment of the present invention provides an exposure apparatus for Fresnel's holographic screens, which comprises a light source (11) for emitting a coherent beam (39); a holder (12) for supporting a photosensitive element (81) on which a hologram is formed; expand and irradiating means (15) for converting the coherent beam (30) emitted from the light source (11) into a light flux (301) having an expanded width and for irradiating part of the expanded light flux (301) directly on the photosensitive element (81) as a reference beam (31); and directional-change and diverging means (28) for diverging the remainder of the expanded light flux (301) and changing an optical direction thereof, thereby converting the remainder of the expanded light flux (301) not irradiated directly to the photosensitive element (81) into an object beam (32) advancing toward the photosensitive element (81), so that interference fringes of the hologram are formed on the photosensitive element (81) by using these reference beam (31) and object beam (32).

Furthermore, the ninth embodiment provides a manufacturing method for Fresnel's holographic screens comprising the steps of: converting a coherent beam (30) into a light flux (301) having an expanded width at a predetermined position to a photosensitive element (81); irradiating part of the expanded light flux (301) directly on the photosensitive element (81) as a reference beam (31); diverging the remainder of the expanded light flux (301) and changing an optical direction thereof, thereby converting the remainder of the expanded light flux (301) not irradiated directly to the photosensitive element (81) into an object beam (32) advancing toward the photosensitive element (81); and forming interference fringes on the photosensitive element (81) by using these reference beam (31) and object beam (32).

Tenth embodiment

Figure 10:
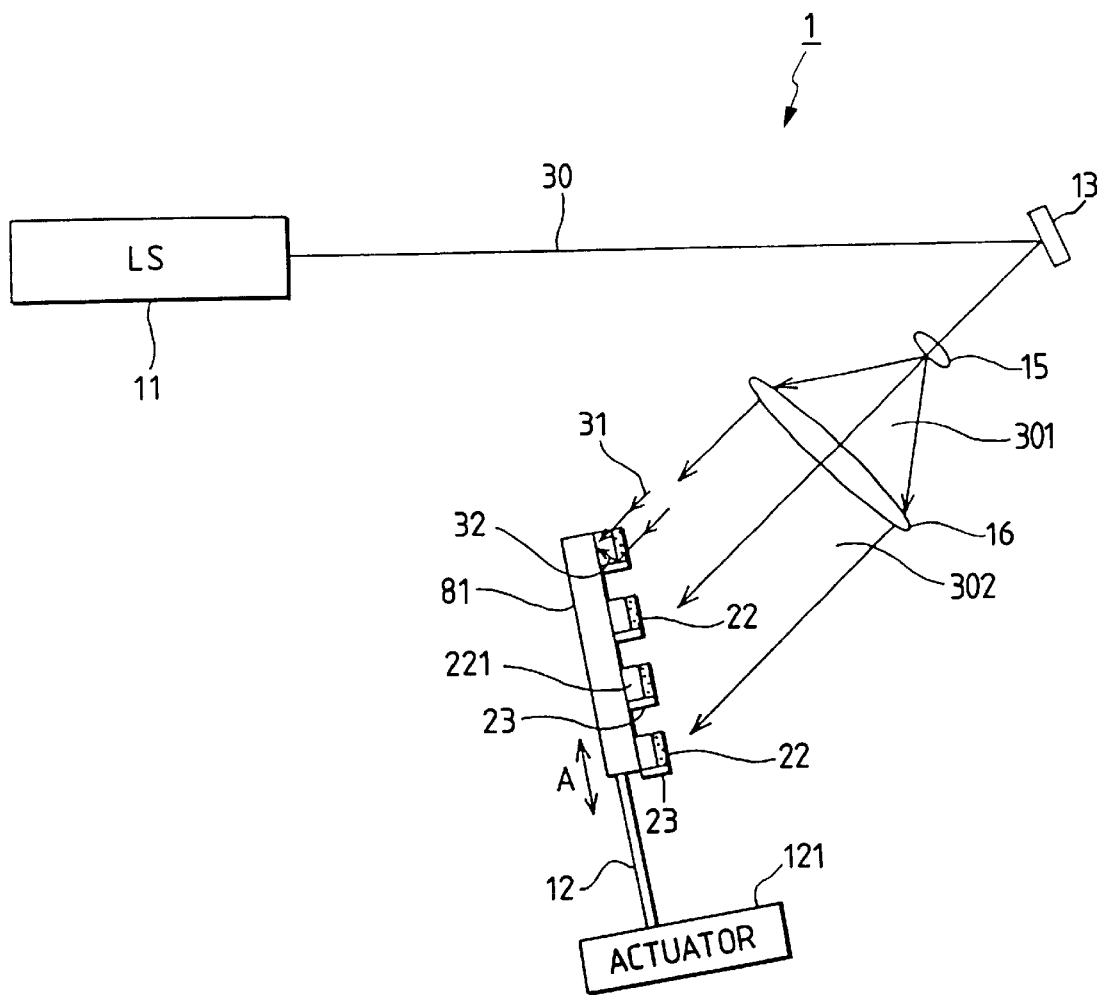
FIG. 10 is a schematic view showing an arrangement of a hologram exposure apparatus in accordance with a tenth embodiment of the present invention.
Figure 11:
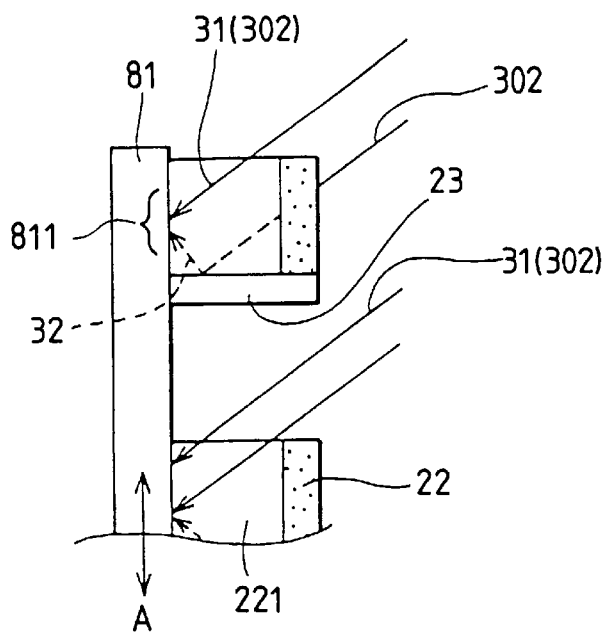
FIG. 11 is an enlarged view showing a relationship between a diffusing member and a reflection member shown in FIG. 10.

A tenth embodiment of the present invention, as shown in FIGS. 10 and 11, disclose a modified exposure apparatus 1 for Fresnel's holographic screens. The tenth embodiment is different from the first embodiment in that the object beam 32 is irradiated to a plurality of local spots 811 of photosensitive element 81. Diffusion members 22 and reflection members (plane mirrors) 23, relatively small in size, are provided for local spots 811. More specifically, the diffusion members 22 and reflection members 23 are identical with the local spots 811 in the total number. A combination of diffusion member 22 and reflection member (plane mirror) 23 is disposed in the vicinity of each local spot 811. An actuator 121 is provided to shift the photosensitive element 81 in a direction of an arrow "A".

The above-described exposing apparatus allows a plurality of exposures performed by repeating the shifting operation of the photosensitive element 81, so that interference fringes are successively formed at different local spots 811 on the photosensitive element 81. A transparent member 221, having no diffusion ability, is interposed between diffusion member 22 and photosensitive element 81. The bottom of transparent member 221 is placed on the reflection member 23.

More specifically, as shown in FIG. 11, a plurality of sets of diffusion members 22 and reflection members 23 are disposed on the surface of the photosensitive element 81 at predetermined intervals. Reference beam 31, which is part of light flux 302, is irradiated directly on the local spot 811 of photosensitive element 81. Object beam 32, which is the remainder of light flux 302, penetrates the diffusion member 33 and reflected by reflection member 23 toward the local spot 811. With the above-described two-directional irradiations of reference beam 31 and object beam 32, interference fringes are formed on the local spot 811.

Once the intended interference fringes are formed on one local spot 811, the photosensitive element 81 is shifted by the actuator 121 to the next local spot to form interference fringes in the same manner. By repeating this exposure operation successively along the surface of photosensitive element 81, a holographic screen is formed so as to extend entirely on the surface of photosensitive element 81.

Thus, the tenth embodiment makes it possible to fabricate a large-size holographic screen by executing the successive exposure operations as described above. Other arrangements are substantially the same as those disclosed in the first embodiment of the present invention.

As apparent from the foregoing description, the tenth embodiment of the present invention provides an exposure apparatus for Fresnel's holographic screens, which comprises a light source (11) for emitting a coherent beam (30); a holder (12) for supporting a photosensitive element (81) on which a hologram is formed; expand and irradiating means (15, 16) for converting the coherent beam (30) emitted from the light source (11) into a light flux (301, 302) having an expanded width and for irradiating part of the expanded light flux (302) directly on the photosensitive element (81) as a reference beam (31); and a plurality of optical sets, each consisting of a diffusion member (22) and a directional-changing member (23), provided to form interference fringes at local spots (811) on the photosensitive element (81). The diffusion member (22) diffuses the remainder of the expanded light flux (302) while the directional-changing member (23) changes an optical direction of the diffused light flux (302). Thus, the remainder of the expanded light flux (302) not irradiated directly to the photosensitive element (18) is converted into an object beam (32) advancing toward the photosensitive element (81). Thus, the interference fringes of the hologram are formed on the photosensitive element (81) by using these reference beam (31) and the object beam (32).

Furthermore, according to the tenth embodiment, it is preferable that a positional relationship between the plural optical sets (22 & 23) and the photosensitive element (81) is changed to form the interference fringes successively on the photosensitive element (81).

Still further, it is preferable that the expanded light flux (302) passes a solid transparent member (221) disposed on an optical path extending from a split point (15) of the reference beam (31) and the object beam (32) to the photosensitive element (81).

Eleventh embodiment

Figure 12:
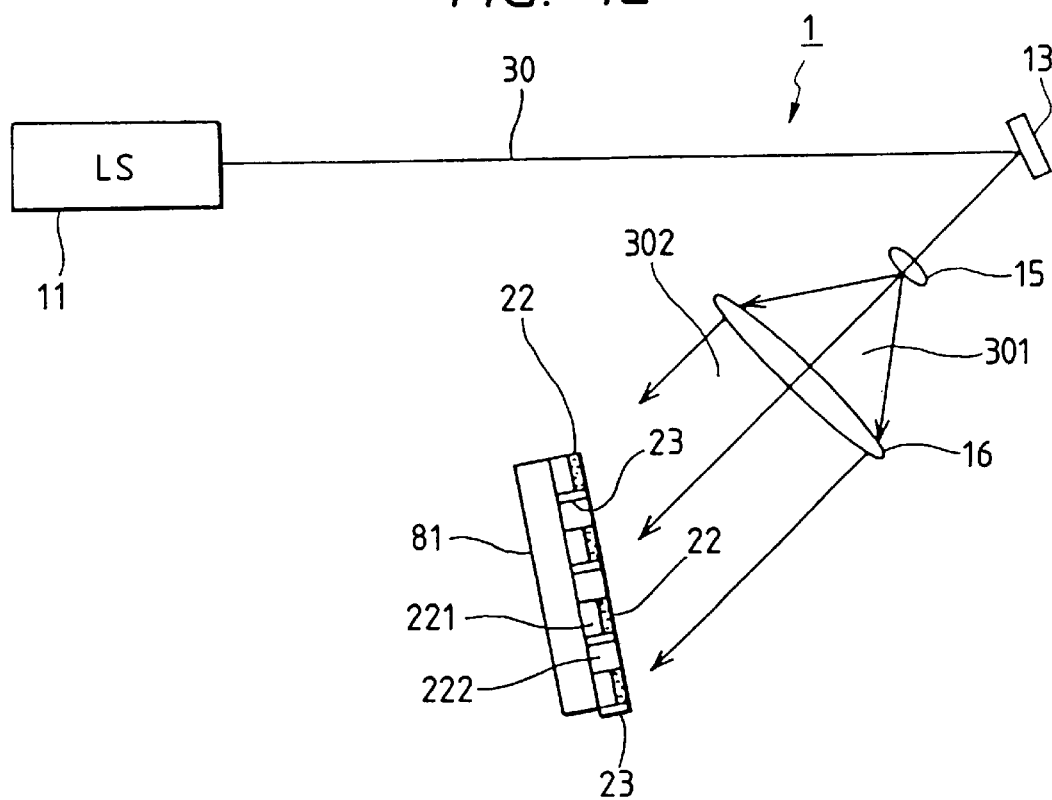
FIG. 12 is a schematic view showing an arrangement of a hologram exposure apparatus in accordance with an eleventh embodiment of the present invention.

An eleventh embodiment of the present invention, as shown in FIG. 12, discloses a modified exposure apparatus 1 for Fresnel's holographic screens. The eleventh embodiment is different from the tenth embodiment in that a plurality of transparent members 222 are further provided between diffusion members 22 and reflection members 23. Each transparent member 222 is interposed between diffusion member 22 and reflection member 23, so as to fill the clearance between diffusion member 22 and reflection member 23 with this transparent member 222. The surfaces of diffusion members 22 are connected by transparent members 222 to form a flush surface equivalent in size and parallel to the photosensitive element 81.

This arrangement is robust against noises because no space allowing entry of noises remains after the diffusion members 22 and the reflection members 23 are hermetically brought into contact with the surface of photosensitive element 81. Other arrangements are substantially the same as those disclosed in the tenth embodiment.

Accordingly, the eleventh embodiment of the present invention provides an exposure apparatus and a manufacturing method for Fresnel's holographic screens comparable to those explained in the tenth embodiment.

Twelfth embodiment

Figure 13:
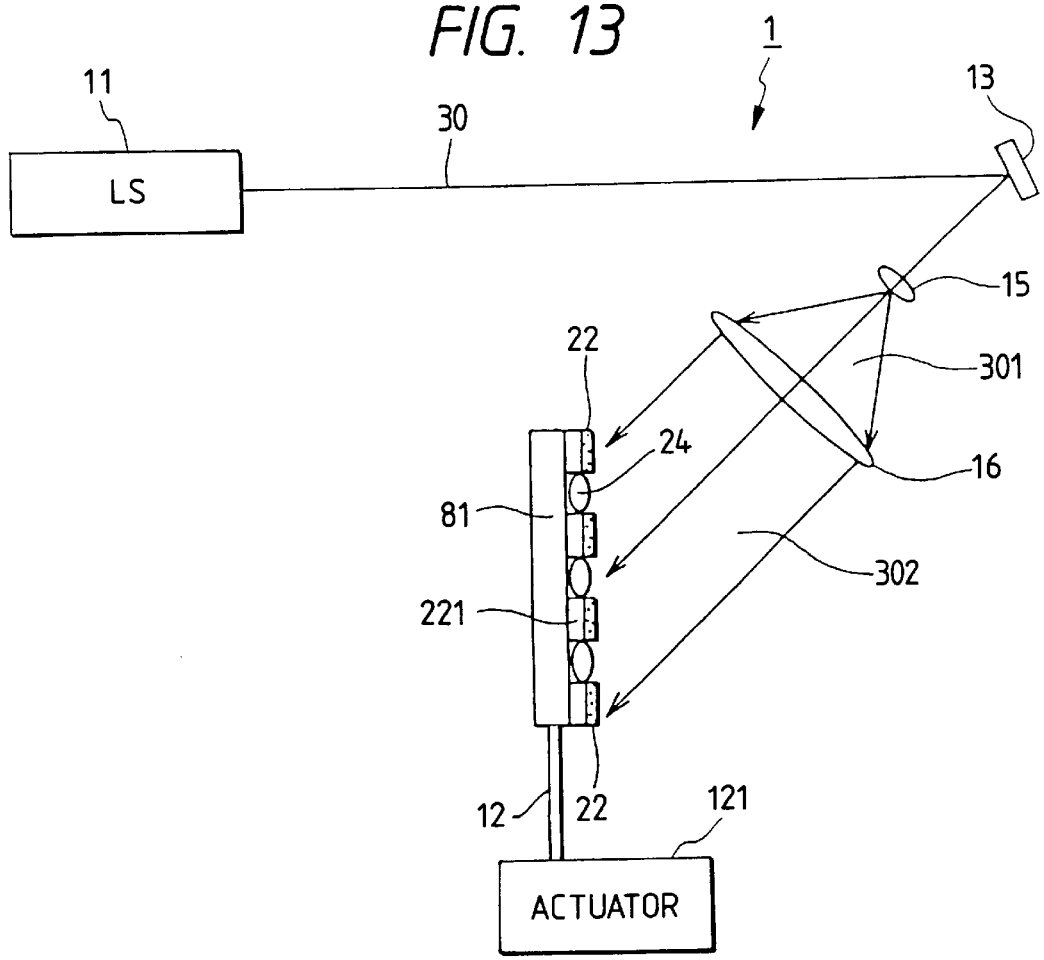
FIG. 13 is a schematic view showing an arrangement of a hologram exposure apparatus in accordance with a twelfth embodiment of the present invention.

A twelfth embodiment of the present invention, as shown in FIG. 13, discloses a modified exposure apparatus 1 for Fresnel's holographic screens. The twelfth embodiment is different from the tenth embodiment in that reflection members 23 are removed and, instead, a plurality of lenses 24 are provided between reflection members 23. Each lens 24, serving as a divergent member, has the capability of diverging the reference beam 31.

Figure 14:
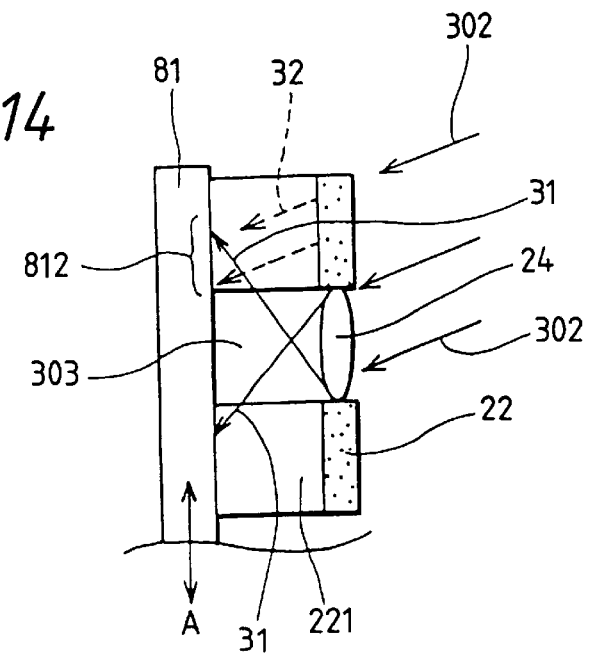
FIG. 14 is an enlarged view showing a relationship between a diffusing member and a reflection member shown in FIG. 13.

More specifically, as shown in FIG. 14, part of the expanded parallel light flux 302 is converted into a scattered beam, serving as object beam 32, after passing through the diffusion member 22, and then advances straight and enters a local spot 812 of photosensitive element 81. On the other hand, another part of the parallel light flux 302 is converted into a divergent light flux 303, after passing through the diffusion lens 24. Some of the divergent light flux 303, as reference beam 31, enters the local spot 812 in the same manner. Thus, interference fringes are formed on the intended local spot 812.

After the desired interference fringes are formed on the local spot 812 of photosensitive element 81 by using the reference beam 31 and the object beam 32, the photosensitive element 81 is shifted by actuator 121 along the arrow "A" (refer to FIG. 14) to form interference fringes for the next local spot 812. In this manner, by repeating the exposure operations successively, a holographic screen is formed entirely along the surface of photosensitive element 81.

Other arrangements are substantially the same as those disclosed in the tenth embodiment.

As described above, the twelfth embodiment discloses an exposure apparatus for Fresnel's holographic screens, which comprises a light source (11) for emitting a coherent beam (30); a holder (12) for supporting a photosensitive element (81) on which a hologram is formed; expanding means (15, 16) for converting the coherent beam (30) emitted from the light source (11) into a light flux (301, 302) having an expanded width; diffusing means (22) for converting part of the expanded light flux (302) into an object beam (32) and irradiating this object beam (32) directly on the photosensitive element (81); and directional-changing means (24) for changing an optical direction of the remainder of the expanded light flux (302) to convert the remainder of the expanded light flux (302) into a reference beam (31) advancing toward the photosensitive element (81). Thus, interference fringes of the hologram are formed on the photosensitive element (81) by using these reference beam (31) and the object beam (32).

Furthermore, the twelfth embodiment provides a manufacturing method for Fresnel's holographic screens comprising the steps of: converting a coherent beam (30) into a light flux (301, 302) having an expanded width at a predetermined position to a photosensitive element (81); converting part of the expanded light flux (302) into a scattered beam which is directly irradiated on the photosensitive element (81) as an object beam (32); changing an optical direction of the remainder of the expanded light flux (302) to convert it into a reference beam (31) advancing toward the photosensitive element (81); and forming interference fringes on the photosensitive element (81) by using these reference beam (31) and the object beam (31).

According to the twelfth embodiment, it is preferable that the expanded light flux (302) passes a solid transparent member (221) disposed on an optical path extending from a split point (15) of the reference beam (31) and the object beam (32) to the photosensitive element (81).

Furthermore, the interference fringes are formed at local spots (812) on the photosensitive element (81) by using a plurality of optical sets each consisting of a diffusing member (22) and a directional-changing member (24).

Still further, the interference fringes are formed successively by changing a positional relationship between the plurality of optical sets (22 & 24) and the photosensitive element (81) by using an actuator (121).

Thirteenth embodiment

Figure 15:
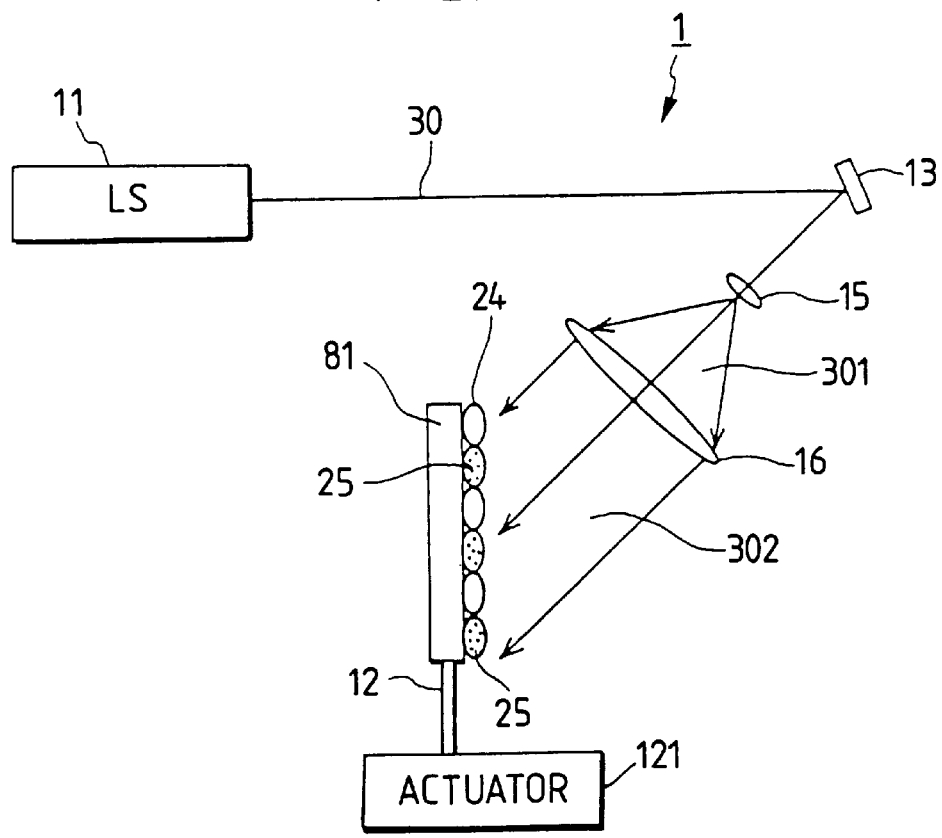
FIG. 15 is a schematic view showing an arrangement of a hologram exposure apparatus in accordance with a thirteenth embodiment of the present invention.

A thirteenth embodiment of the present invention, as shown in FIG. 15, discloses a modified exposure apparatus 1 for Fresnel's holographic screens. The thirteenth embodiment is different from the twelfth embodiment in that diffusion members 22 and transparent members 221 are replaced by transmissive scattering lenses 25. More specifically, transparent divergent lenses 24 and transmissive scattering lenses 25 are alternately arranged along the surface of photosensitive element 81 in a predetermined matrix pattern.

This arrangement is advantageous in that the area of local spot 812 can be enlarged. Thus, the interference fringes can be formed effectively in a wider area per exposure operation.

Other arrangements are substantially the same as those disclosed in the twelfth embodiment.

In short, the thirteenth embodiment discloses an exposure apparatus for Fresnel's holographic screens, which comprises a light source (11) for emitting a coherent beam (30); a holder (12) for supporting a photosensitive element (81) on which a hologram is formed; expanding means (15, 16) for converting the coherent beam (30) emitted from the light source (11) into a light flux (301, 302) having an expanded width; scattering means (25) for converting part of the expanded light flux (302) into an object beam (32) and irradiating this object beam (32) directly on the photosensitive element (81); and directional-changing means (24) for changing an optical direction of the remainder of the expanded light flux (302) to convert the remainder of the expanded light flux (302) into a reference beam (31) advancing toward the photosensitive element (81). Thus, interference fringes of the hologram are formed on the photosensitive element (81) by using these reference beam (31) and the object beam (32).

The interference fringes are formed at local spots (812) on the photosensitive element (81) by using a plurality of optical sets each consisting of a scattering means (25) and a directional-changing member (24).

Still further, the interference fringes are formed successively by changing a positional relationship between the plurality of optical sets (24 & 25) and the photosensitive element (81) by using an actuator (121).

Fourteenth embodiment

Figure 16:
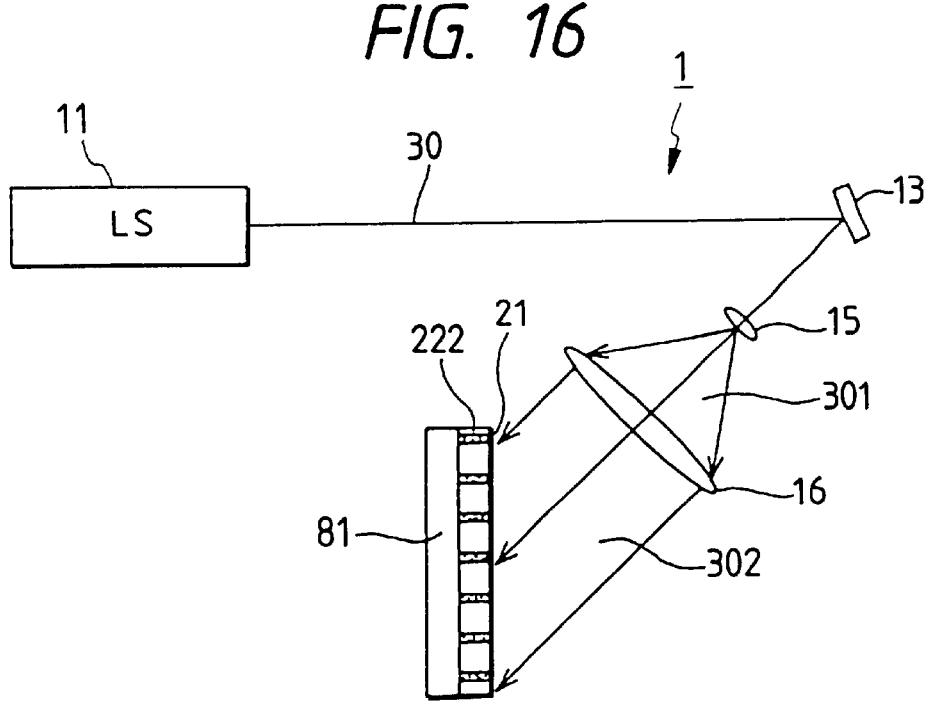
FIG. 16 is a schematic view showing an arrangement of a hologram exposure apparatus in accordance with a fourteenth embodiment of the present invention.

A fourteenth embodiment of the present invention, as shown in FIG. 16, discloses a modified exposure apparatus 1 for Fresnel's holographic screens. The fourteenth embodiment is different from the eleventh embodiment in that diffusion members 22 are removed and, instead, a plurality of directional-change and diffusion members 21 (disclosed in FIG. 1) are disposed with transparent members 222 sandwiched therebetween.

Other arrangements are substantially the same as those disclosed in the eleventh embodiment. Accordingly, the fourteenth embodiment of the present invention provides an exposure apparatus and a manufacturing method for Fresnel's holographic screens comparable to those explained in the tenth embodiment.

Fifteenth embodiment

Figure 17:
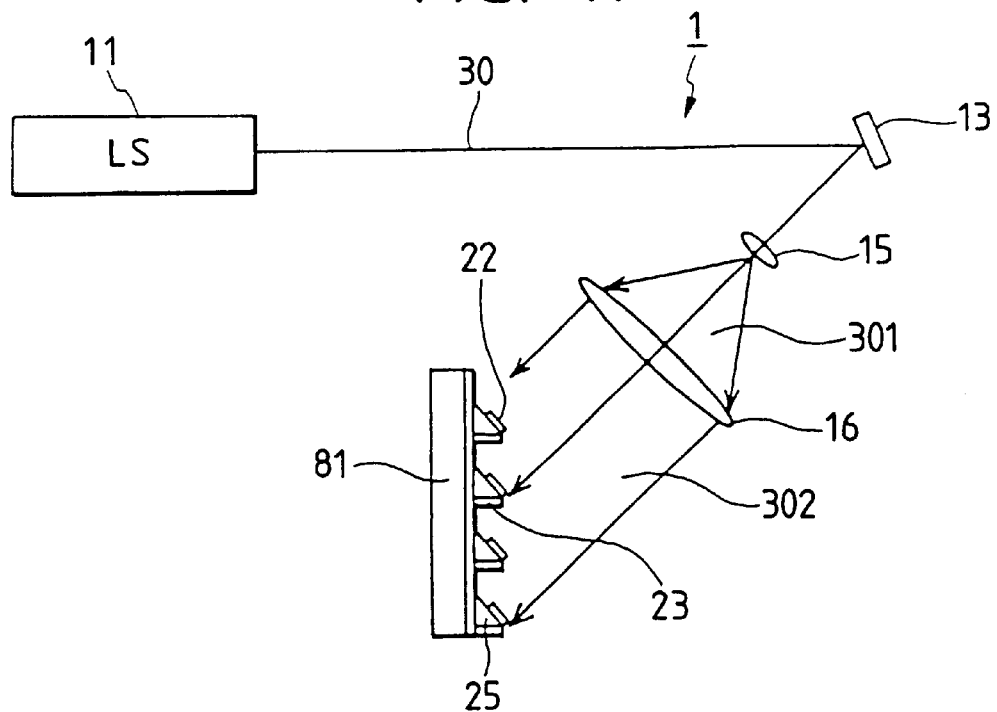
FIG. 17 is a schematic view showing an arrangement of a hologram exposure apparatus in accordance with a fifteenth embodiment of the present invention.

A fifteenth embodiment of the present invention, as shown in FIG. 17, discloses a modified exposure apparatus 1 for Fresnel's holographic screens. The fifteenth embodiment is different from the tenth embodiment in that each set provided on the photosensitive element 81 is replaced by the prism arrangement shown in the fifth embodiment.

Namely, in each of a plurality of optical units provided on the photosensitive element 81, diffusion member 22 is attached on the second surface of prism 25 and reflection member 23 is placed on the third surface of prism 25. This arrangement is effective to suppress the fluctuation of the intervening medium.

Other arrangements are substantially the same as those disclosed in the tenth embodiment. Accordingly, the fifteenth embodiment of the present invention provides an exposure apparatus and a manufacturing method for Fresnel's holographic screens comparable to those explained in the tenth embodiment.

Sixteenth embodiment

Figure 18:
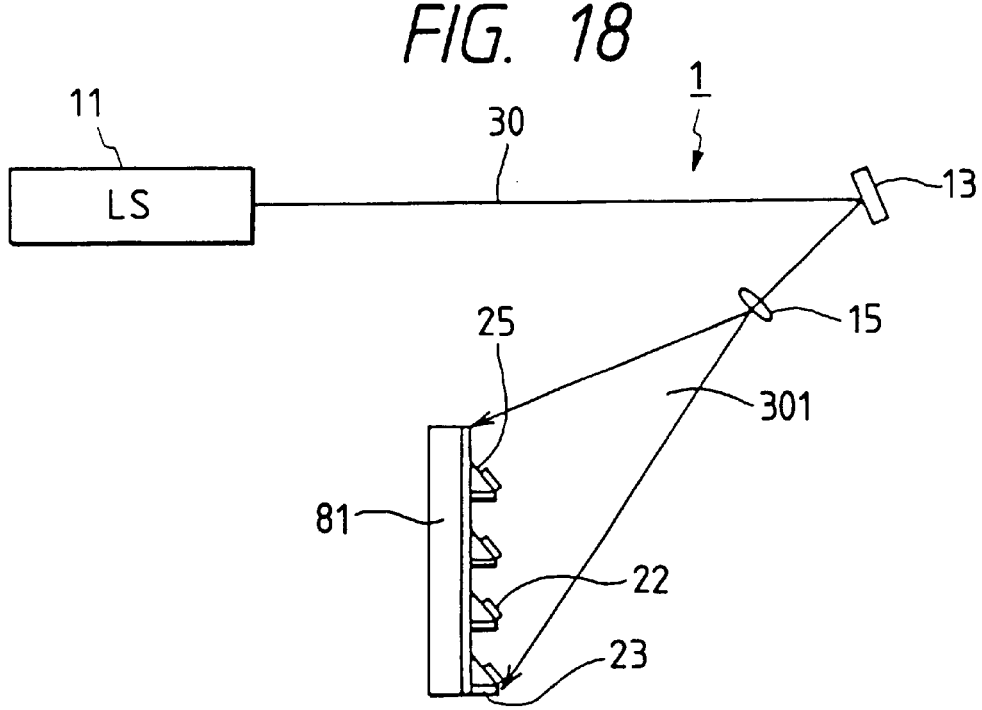
FIG. 18 is a schematic view showing an arrangement of a hologram exposure apparatus in accordance with a sixteenth embodiment of the present invention.

A sixteenth embodiment of the present invention, as shown in FIG. 18, discloses a modified exposure apparatus 1 for Fresnel's holographic screens. The sixteenth embodiment is different from the fifteenth embodiment in that the collimator lens 16 is removed. Thus, divergent light flux 301 is directly irradiated to the photosensitive element 81.

Other arrangements are substantially the same as those disclosed in the fifteenth embodiment. Accordingly, the sixteenth embodiment of the present invention provides an exposure apparatus and a manufacturing method for Fresnel's holographic screens comparable to those explained in the tenth embodiment.

Seventeenth embodiment

Figure 19:
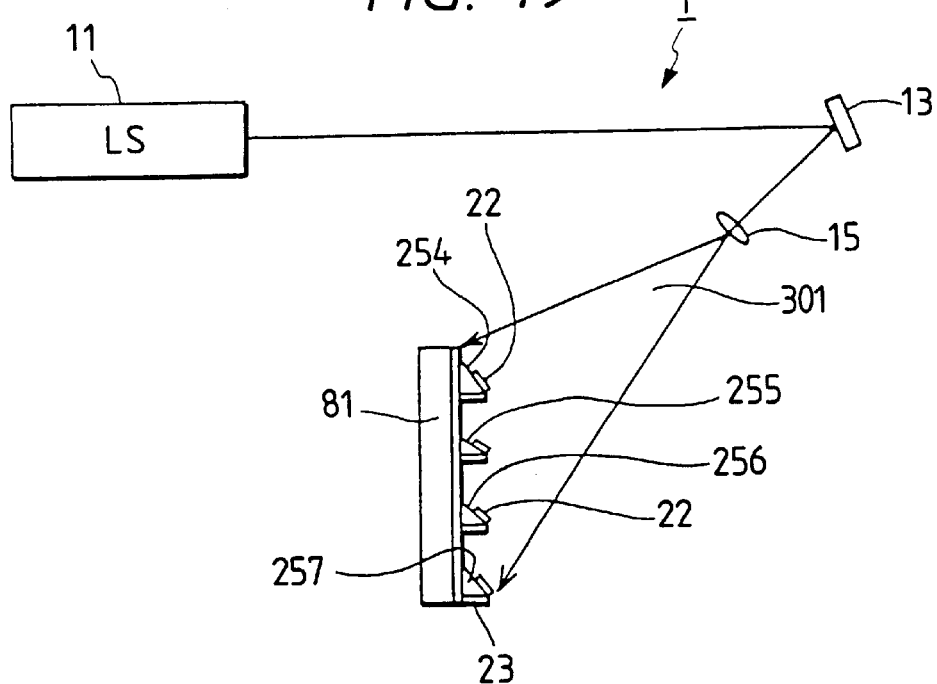
FIG. 19 is a schematic view showing an arrangement of a hologram exposure apparatus in accordance with a seventeenth embodiment of the present invention.

A seventeenth embodiment of the present invention, as shown in FIG. 19, discloses a modified exposure apparatus 1 for Fresnel's holographic screens. The seventeenth embodiment is different from the sixteenth embodiment in that the inclinations of respective prisms 254–257 are differentiated. Namely, the angle of the second surface to the third surface is differentiated in each prism.

According to the arrangement of the seventeenth embodiment, the hologram pattern formed simultaneously on the surface of photosensitive element 81 can be differentiated locally in an intended manner.

Other arrangements are substantially the same as those disclosed in the sixteenth embodiment. Accordingly, the seventeenth embodiment of the present invention provides an exposure apparatus and a manufacturing method for Fresnel's holographic screens comparable to those explained in the tenth embodiment.

Eighteenth embodiment

Figure 20:
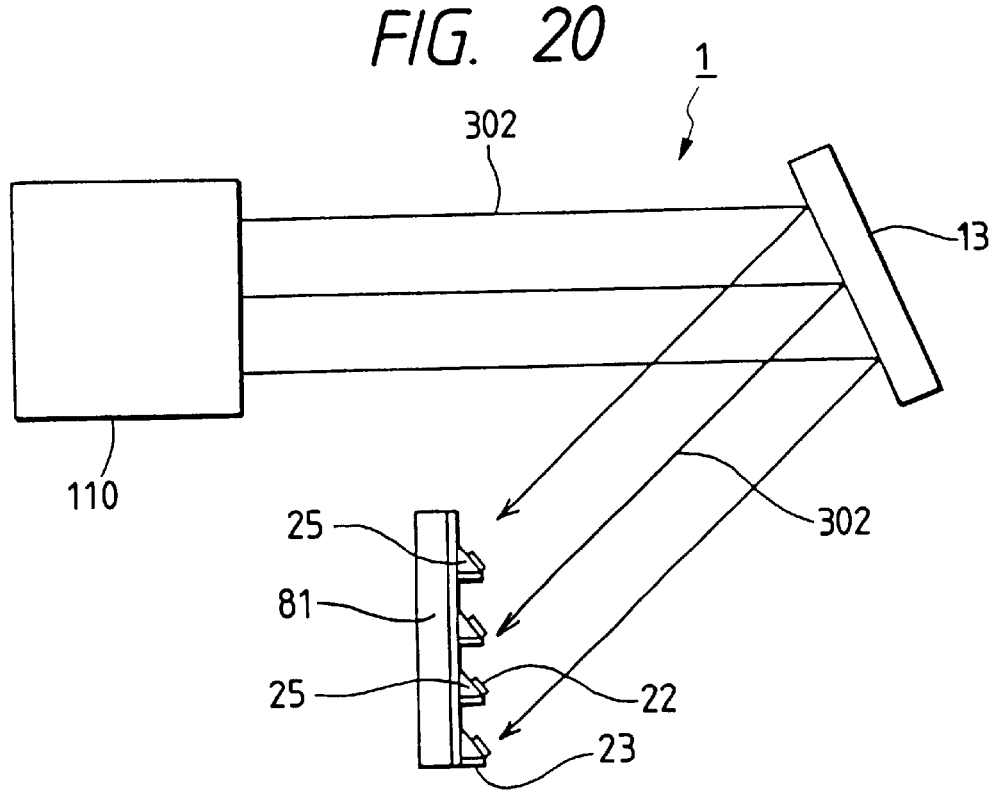
FIG. 20 is a schematic view showing an arrangement of a hologram exposure apparatus in accordance with an eighteenth embodiment of the present invention.

An eighteenth embodiment of the present invention, as shown in FIG. 20, discloses a modified exposure apparatus 1 for Fresnel's holographic screens. The eighteenth embodiment is different from the fifteenth embodiment in that the divergent lens 15 and collimator lens 16 are removed and, instead, the light source generates a coherent beam with an expanded width. More specifically, a light source 110 of the eighteenth embodiment incorporates an appropriate divergent member (not shown) therein. The light source 110 generates parallel light flux 302 having an expanded width. The parallel light flux 302 is reflected by mirror 13 toward the photosensitive member 81.

Accordingly, the eighteenth embodiment of the present invention provides an exposure apparatus and a manufacturing method for Fresnel's holographic screens comparable to those explained in the tenth embodiment.

Nineteenth embodiment

Figure 21:
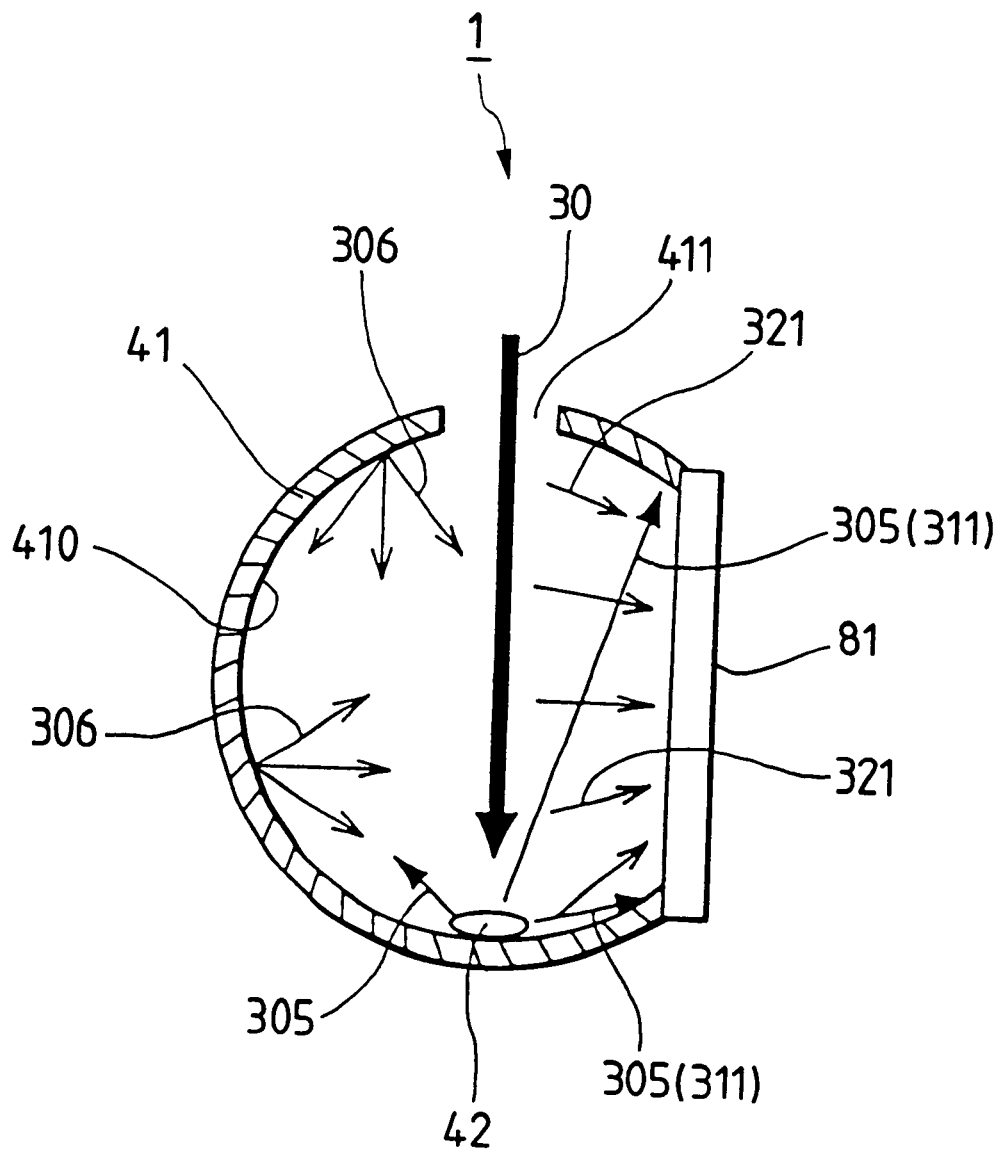
FIG. 21 is a schematic view showing an arrangement of a hologram exposure apparatus in accordance with a nineteenth embodiment of the present invention.

A nineteenth eighteenth embodiment of the present invention, as shown in FIG. 21, discloses another exposure apparatus 1 for Fresnel's holographic screens. The exposure apparatus 1 comprises a spherical housing 41 having an inner wall surface 410 having both capabilities of diffusing and reflecting light. The spherical housing 41 is truncated to have a predetermined opening. The photosensitive element 81 is attached to the truncated opening of the spherical housing 41. Furthermore, spherical housing 41 has an incident window 411. Laser beam 30, emitted from an appropriate optical system disclosed in FIG. 1, enters into the housing 41 through incident window 411. The laser beam 30, after entering the housing 41, advances to a convex reflection mirror (or a convex reflection half mirror) 42 which serves as an expanding device.

The laser beam 30, as reference beam 311, is diverged from this convex reflection mirror 42. Part of primary reflection light 305 is directly irradiated to the photosensitive element 81.

The remainder of primary reflection light 305 is diffused and reflected one time or plural times by the inner wall surface 410 of housing 41. Thus, N -order reflection light 306 (N=2, 3, - - - ), diffused or reflected in this manner in the housing 41, enters the photosensitive element 81 as object beam 321.

Accordingly, interference fringes are formed on the photosensitive element 81 by the irradiations of the reference beam 311 and the object beam 321. Thus, the resultant hologram becomes a holographic screen recording the diffusion member.

Substance having the capability of diffusing and reflecting light or white coating material is applied on the inner wall surface 410, to scatter the laser beam 30 entered. For example, white coating material chiefly contains aluminum oxide or barium oxide. The substance containing glass beads powder may be coated. The inside space of the housing 41 is filled with air or resin having excellent transparency. The light entering in the housing 41 through incident window 411 is not limited to laser beam only. Thus, parallel beam or divergent beam can be used equivalently.

Other arrangements are substantially the same as those disclosed in the first embodiment.

Twentieth embodiment

Figure 22:
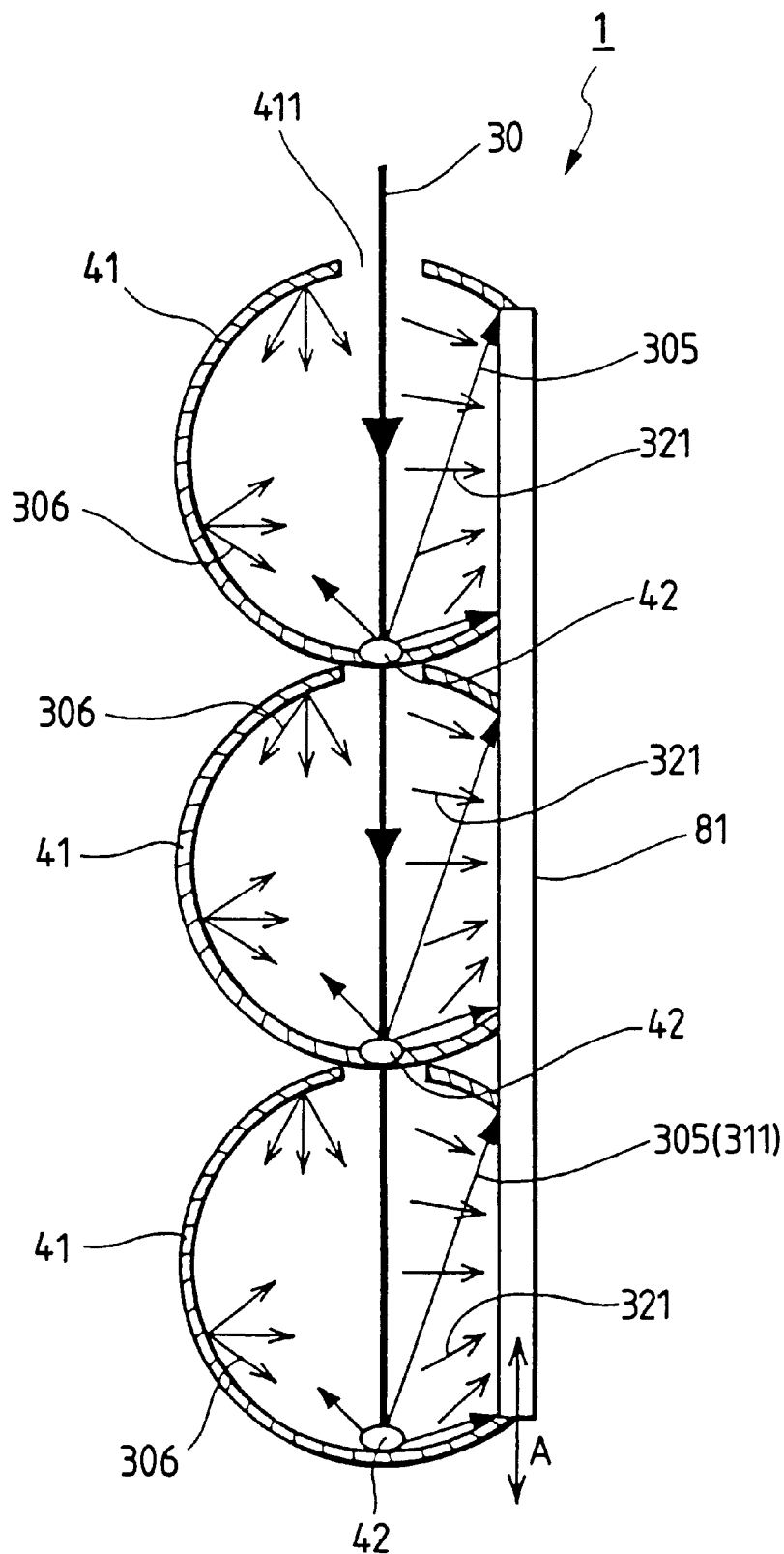
FIG. 22 is a schematic view showing an arrangement of a hologram exposure apparatus in accordance with a twentieth embodiment of the present invention.

A twentieth embodiment of the present invention, as shown in FIG. 22, discloses a modified exposure apparatus 1 for Fresnel's holographic screens. The twentieth embodiment is different from the nineteenth embodiment in that a plurality of housings 41 are connected in series. Each housing 41 comprises an associated convex reflection mirror (or convex reflection half mirror) 42.

According to the arrangement of the twentieth embodiment, the reflection mirror 42 of the uppermost housing 41 allows the laser beam 30 to penetrate straight downward into the intermediate housing 41. In the same manner, reflection mirror 42 of the intermediate housing 41 allows the laser beam 30 to penetrate straight downward into the lowermost housing 41.

Accordingly, the twentieth embodiment of the present invention makes it possible to form interference fringes simultaneously at a plurality of local spots on the photosensitive element 81.

Twenty-first embodiment

Figure 23:
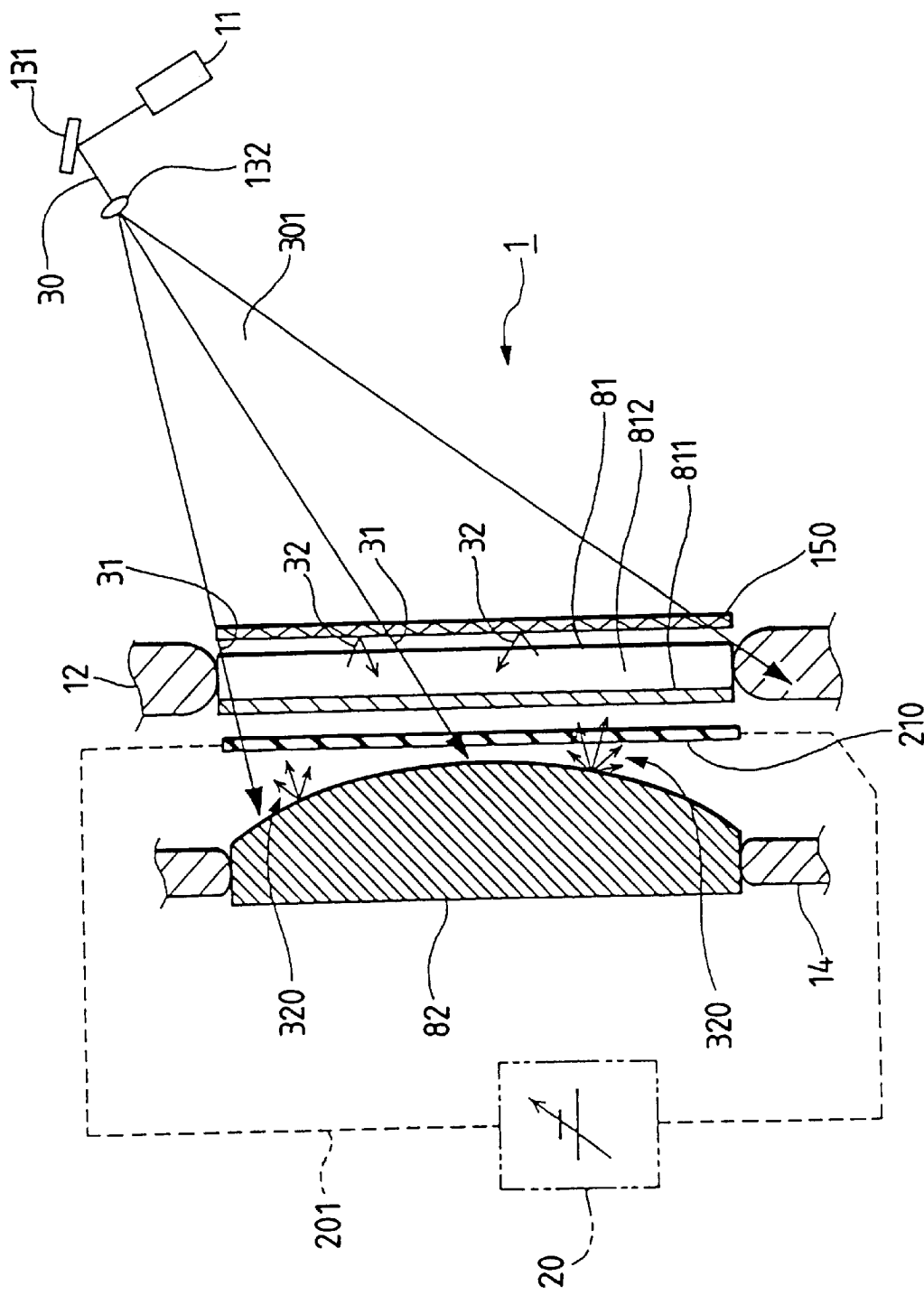
FIG. 23 is a schematic view showing an arrangement of a hologram exposure apparatus in accordance with a twenty-first embodiment of the present invention.

A twenty-first embodiment of the present invention, as shown in FIG. 23, discloses a hologram exposure apparatus 1. A light source 11 emits a coherent laser beam 30. A holder 12 supports a photosensitive element 81 on which a hologram is formed. An optical system, consisting of a reflection mirror 131 and a divergent lens 132, receives the laser beam 30 emitted from the light source 11 and irradiates this laser beam 30 to the photosensitive element 81 from one side (i.e., front side). A diffusing and reflecting member 82, serving as a recorded object, is disposed at the other side (i.e., behind side) of the photosensitive element 81. This diffusing and reflecting member 82 is supported by a holder 14. A half mirror 150 is disposed between the optical system and the photosensitive element 81. An optical length adjuster 210, which is capable of changing the optical length of transmitted light in response to an operation signal applied from outside, is disposed at the behind side of the photosensitive element 81. A controller 20 generates the operation signal sent to the optical length adjuster 210 via an electric wire 201.

According to the arrangement of the twenty-first embodiment of the present invention, some of the divergent light flux 301 passes through the half mirror 150 and enters as a reference beam 31 into the photosensitive element 81. Meanwhile, another some of the light flux 301 penetrates both of half mirror 150 and photosensitive element 81 and is then reflected by the diffusing and reflecting member 82. A light flux 302, reflected by the diffusing and reflecting member 82, returns to the half mirror 150 as a primary object beam 320 and is again reflected by the half mirror 150 as a secondary object beam 32. Thus, the light flux 302, as an object beam (i.e. secondary object beam) 32, reaches the photosensitive element 81. Accordingly, Fresnel's hologram having interference fringes, formed by the irradiations of reference beam 31 and object beam (i.e. secondary object beam) 32, is formed on the photosensitive element 81.

The controller 21 controls the optical length adjuster 210 to eliminate any Lippmann's hologram formed by the reference beam 31 and the primary object beam 320 reflected by diffusing and reflecting member 82 and entering the photosensitive element 81.

In other words, by the control of the controller 20 performed in accordance with a predetermined schedule, the optical length adjuster 210 shifts the position of the interference fringes of Lippmann's hologram formed on the photosensitive element 81 by an amount equivalent to a half of the gap of the interference fringes during an exposure operation, so as to suppress the formation of the Lippmann's hologram. Accordingly, only the Fresnel's hologram is formed on the photosensitive element 81.

Photosensitive element 81 consists of a photosensitive film 811 and a base 812 holding this photosensitive film 811. The photosensitive film 811 is, for example, made of gelatin dichromate or photo polymer. The diffusing and reflecting member 82 is a convex optical element, such as ground glass or opal glass, having a capability of diffusing and reflecting transmitted light.

The gap (i.e., the periodic interval) of the interference fringes formed on the photosensitive element 81 (i.e., photosensitive film 811) is generally expressed by the following equation.

$$d=\lambda_0/[2\{n^2 \pm n(n^2-\sin^2\theta_r)\}^{0.5}]^{0.5} \qquad (1)$$

where "n" represents a mean refractive index of the photosensitive element 81, $\lambda_0$ represents a wavelength of reference beam 31, and $\theta_r$ represents an incident angle of reference beam 31 to the photosensitive element 81. In the equation, minus (−) corresponds to a region $-90°<\theta_r<90°$ for Fresnel's (i.e., transmission type) hologram, while plus (+) corresponds to a region $90°<\theta_r<270°$ for Lippmann's (i.e., reflection type) hologram.

Shifting the interference fringes by an amount equivalent to ½ of the above-defined gap "d" during the exposure operation has an effect of flattening the interference fringes by overlapping wavy protrusions with wavy recesses on the interference fringes. Thus, no hologram is formed. However, if the shifting amount is equivalent to ¼ of the gap "d", interference fringes will be formed and a hologram will be recorded.

For example, it is assumed that the refractive index "n" is 1.56 and the wavelength $\lambda_0$ is 514.5 nm. In this case, the minimum gap "di" of a resultant Fresnel's hologram is 0.484 $\mu$m, while the maximum gap "da" of a resultant Lippmann's hologram becomes 0.175 $\mu$m.

A shifting amount of the interference fringes is set to 0.088 $\mu$m which is equivalent to ½ of the maximum gap "da" of the Lippmann's hologram. Thus, by shifting the interference fringes by 0.088 $\mu$m, it becomes possible to suppress the formation of Lippmann's hologram. On the other hand, Fresnel's hologram is formed because the shifting amount of 0.088 $\mu$m is substantially identical with ¼ of the minimum gap "di" of the Fresnel's hologram.

The optical length adjuster 210 is variable in both of film thickness and refractive index. Accordingly, by using the optical length adjuster 210 to periodically vary the optical length within the range of 0.04 to 0.121 μm, it becomes possible to selectively form only the Fresnel's hologram and suppress the formation of the Lippmann's hologram.

The optical length adjuster 210, for example, as shown in FIG. 23, is an appropriate plate, such as tungsten or certain kind of organic substance, having adequate values in its electric resistance and thermal expansion coefficient. According to this arrangement, the temperature of the optical length adjuster 210 is controlled by changing the electric current flowing across its plate body. Thus, with the current supplied, the plate (thickness "L") causes a thermal expansion or contraction of a variation ΔL. This variation ΔL causes an optical length change ΔL×n. Alternatively, it is possible to irradiate thermal ray on the plate rather than supplying the electric current. In this case, the optical length is changed in response to the temperature.

Furthermore, it is possible to control the optical length by varying the refractive index. For example, photo-acoustic optical elements are preferable because their refractive index "n" can be varied by controlling an electric voltage (i.e., electric field) applied from a variable electric power.

As explained above, the twenty-first embodiment is based on a single light flux exposure method. Hence, the optical paths of the reference beam and the object beam are not separated until they reach the proximity of the photosensitive element. This is advantageous to prevent the interference fringes from being disturbed by the fluctuation of the intervening medium (air) in the optical path. Thus, it becomes possible to clearly distinguish the object beam and the reference beam and obtain a hologram having excellent transparency.

In short, the twenty-first embodiment provides a manufacturing method for Fresnel's holographic screens based on a single light flux exposure operation, comprising the steps of: disposing a half mirror (150) at one side of a photosensitive element (81), so that part of a light flux (301) penetrating the half mirror (150), serving as a reference beam (31), is irradiated directly to the photosensitive element (81); disposing a recording object (82) at the other side of the photosensitive element (81), so that another part of the light flux (301) penetrating both of the half mirror (150) and the photosensitive element (81) and then reflected by the recording object (82) and further reflected by the half mirror (150) is converted into an object beam (32) advancing toward the photosensitive element (81); adjusting an optical length of at least one of the reference beam (31) and the object beam (32), so as to suppress a formation of Lippmann's hologram formed by the reference beam (31) and a beam (320) reflected by the recording object (82) and then directly entering the photosensitive element (81); and forming a Fresnel's hologram on the photosensitive element (81) by using the reference beam (31) and the object beam (32).

Preferably, the optical length of at least one of the reference beam (31) and the object beam (32) is adjusted during an exposure operation in such a manner that the position of interference fringes of the Lippmann's hologram formed on the photosensitive element (81) is shifted by an amount equivalent to a half of a gap of the interference fringes.

Furthermore, the twenty-first embodiment provides an exposure apparatus for Fresnel's holographic screens comprising: a light source (11) for emitting a coherent beam (30); a first holder (12) for supporting a photosensitive element (81) on which a hologram is formed; an optical system (131, 132) disposed at one side of the photosensitive element (81); a half mirror (150) disposed between the optical system (131, 132) and the photosensitive element (81), so that part of the coherent beam (30) emitted from the light source (11) and penetrating the half mirror (150) is irradiated directly on the photosensitive element (81) as a reference beam (31); a second holder (14) for supporting a recording object (82), disposed at the other side of the photosensitive element (81), so that another part of the coherent beam (30) penetrating both of the half mirror (150) and the photosensitive element (81) is reflected by the recording object (82), then the beam reflected by the recording object (82) being further reflected by the half mirror (150) as an object beam (32) advancing toward the photosensitive element (81); optical length adjusting means (210) for adjusting an optical length of at least one of the reference beam (31) and the object beam (32) in response to a control signal, so that a Fresnel's hologram is formed on the photosensitive element (81) by using the reference beam (31) and the object beam (32).

Preferably, a control means (20) controls the optical length adjusting means (210) to suppress a formation of Lippmann's hologram formed by the reference beam (31) and a beam (320) reflected by the recording object (82) and then directly entering the photosensitive element (81). More specifically, the optical length adjusting means (210) adjusts the optical length of at least one of the reference beam (31) and the object beam (32) during an exposure operation in such a manner that the position of interference fringes of the Lippmann's hologram formed on the photosensitive element (81) is shifted by an amount equivalent to a half of a gap of the interference fringes.

Twenty-second embodiment

Figure 24:
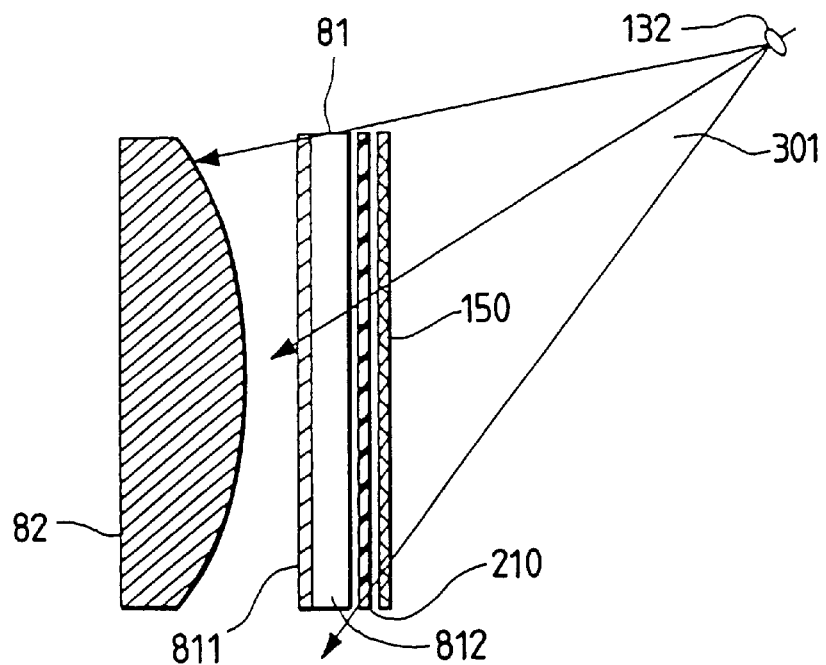
FIG. 24 is a schematic view showing an arrangement of a hologram exposure apparatus in accordance with a twenty-second embodiment of the present invention.

A twenty-second embodiment of the present invention, as shown in FIG. 24, discloses a modified hologram exposure apparatus. The twenty-second embodiment is different from the twenty-first embodiment in that the optical length adjuster 210 is disposed between the photosensitive element 81 and the half mirror 150.

According to the arrangement of the twenty-second embodiment, when the optical length of the optical length adjuster 210 is varied by an amount of ΔnL, the optical length of reference beam 31 causes a same change of ΔnL while the change of the optical length of object beam 32 is equal to a doubled amount (i.e. 2×ΔnL).

According to this arrangement, both of reference beam 31 and object beam 32 pass through the optical length adjuster 210. This is effective to suppress the unbalance in the intensities between reference beam 31 and object beam 32, even when the optical length adjuster 210 has a relatively large absorption coefficient. Other arrangements are substantially the same as those disclosed in the twenty-first embodiment.

Twenty-third embodiment

Figure 25:
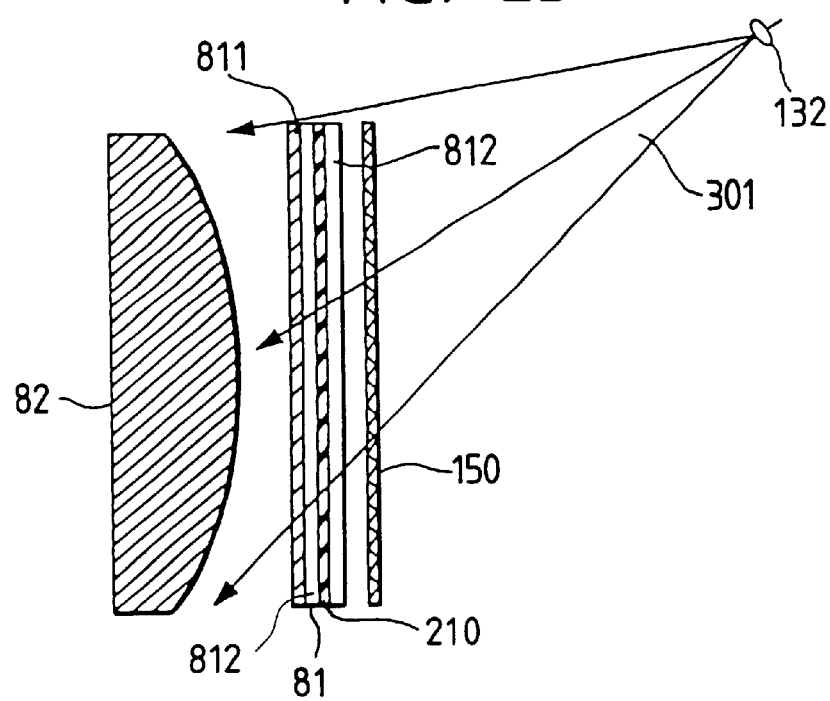
FIG. 25 is a schematic view showing an arrangement of a hologram exposure apparatus in accordance with a twenty-third embodiment of the present invention.

A twenty-third embodiment of the present invention, as shown in FIG. 25, discloses a modified hologram exposure apparatus. The twenty-third embodiment is different from the twenty-first embodiment in that the optical length adjuster 210 is integrally formed with the photosensitive element 81. In this case, the base of photosensitive element 81 is split into two sheets 812 and the optical length adjuster 210 is interposed or sandwiched hermetically between these two split bases 812 and 812.

According to the arrangement of the twenty-third embodiment, no intervening medium (i.e., air) having a different refractive index is present on the surfaces of the optical length adjuster 210. Instead, the optical length adjuster 210 is surrounded by the base 812 which has a refractive index similar to that of the optical length adjuster 210. This is advantageous to prevent adverse reflections from causing at the boundary surfaces of the optical length adjuster 210. Other arrangements are substantially the same as those disclosed in the twenty-first embodiment.

Twenty-fourth embodiment

Figure 26:
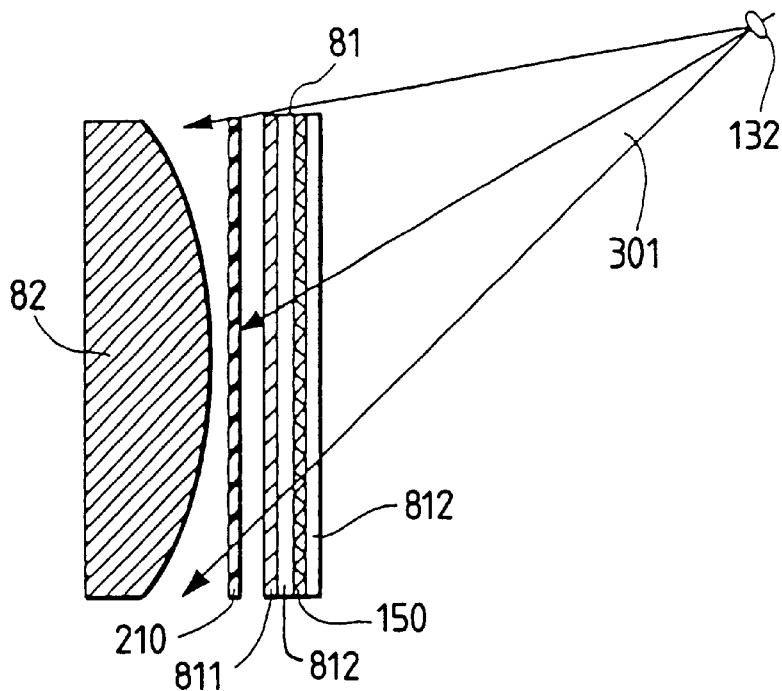
FIG. 26 is a schematic view showing an arrangement of a hologram exposure apparatus in accordance with a twenty-fourth embodiment of the present invention.

A twenty-fourth embodiment of the present invention, as shown in FIG. 26, discloses a modified hologram exposure apparatus. The twenty-fourth embodiment is different from the twenty-first embodiment in that the half mirror 150 is integrally formed with the photosensitive element 81. Namely, the half mirror 150 is interposed or sandwiched hermetically between two split bases 812 and 812. Other arrangements are substantially the same as those disclosed in the twenty-first embodiment.

Twenty-fifth embodiment

Figure 27:
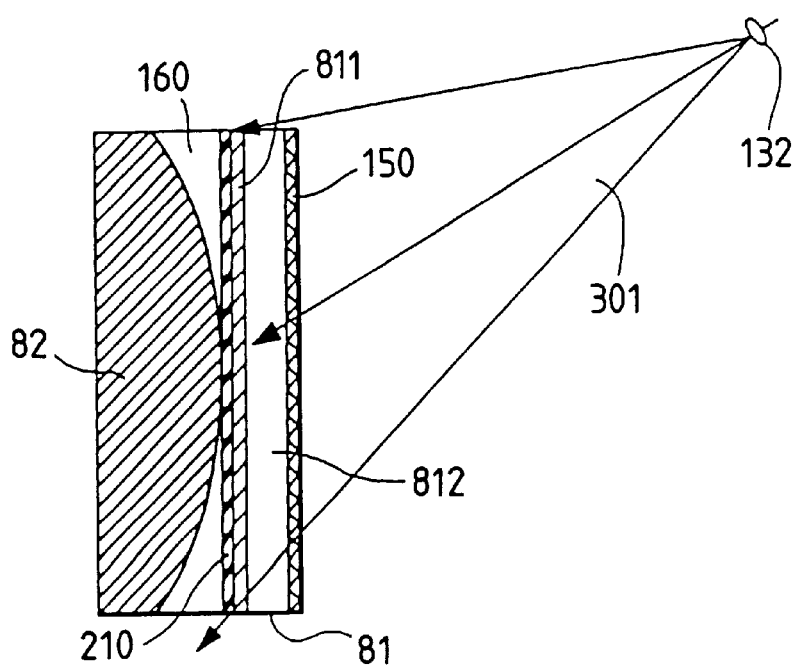
FIG. 27 is a schematic view showing an arrangement of a hologram exposure apparatus in accordance with a twenty-fifth embodiment of the present invention.

A twenty-fifth embodiment of the present invention, as shown in FIG. 27, discloses a modified hologram exposure apparatus. The twenty-fifth embodiment is different from the twenty-first embodiment in that refractive index adjusting liquid 160 is filled in the clearances among optical components 81, 82, 210 and 150, although refractive index adjusting liquid 160 is not shown between optical components 81 and 210 and between optical components 81 and 150 in the drawing.

According to the arrangement of the twenty-fifth embodiment, it becomes possible to surely prevent adverse reflections occurring at the boundary surfaces of these optical components 81, 82, 210 and 150. Other arrangements are substantially the same as those disclosed in the twenty-first embodiment.

Twenty-sixth embodiment

Figure 28:
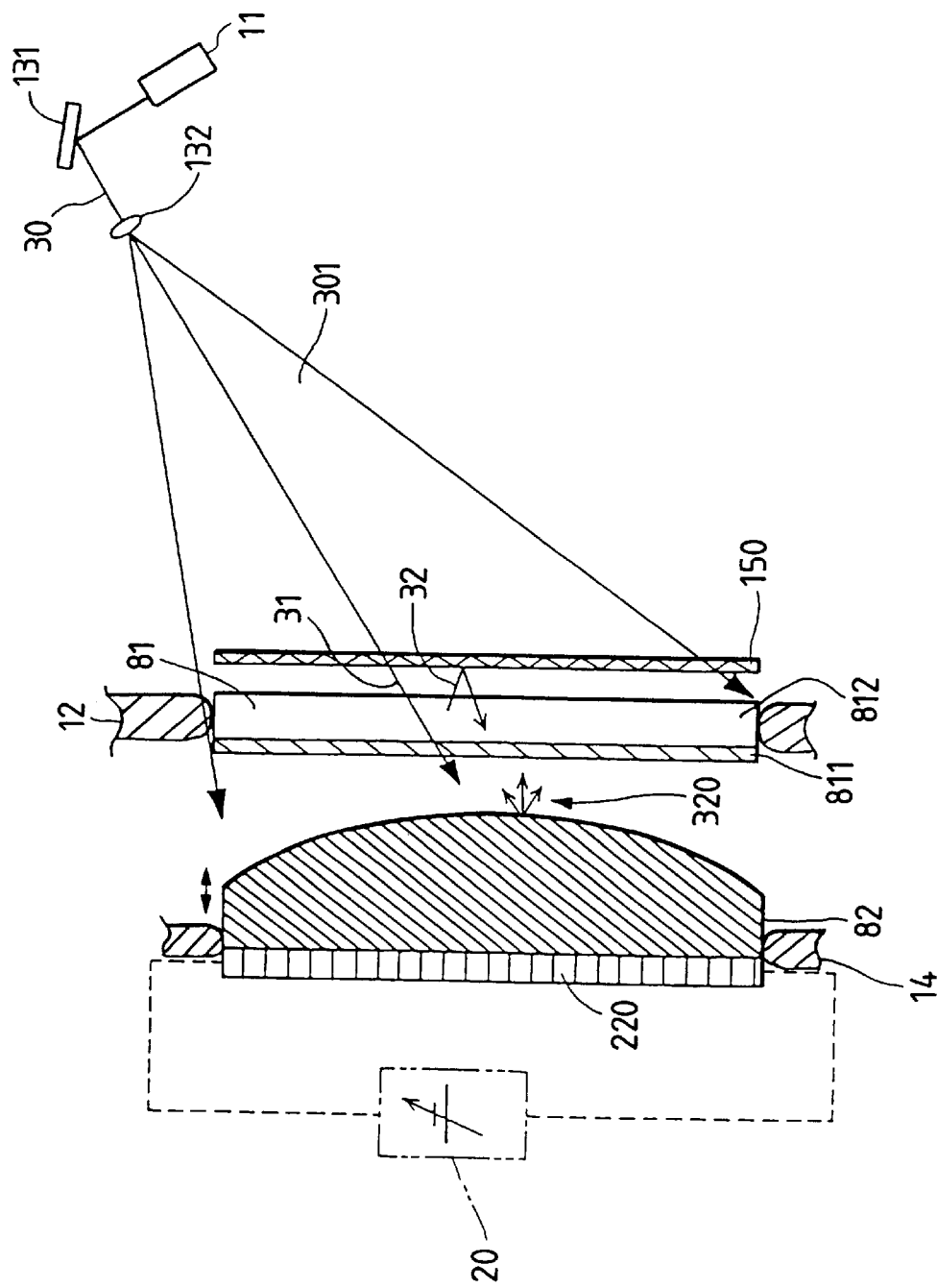
FIG. 28 is a schematic view showing an arrangement of a hologram exposure apparatus in accordance with a twenty-sixth embodiment of the present invention.

A twenty-sixth embodiment of the present invention, as shown in FIG. 28, discloses a modified hologram exposure apparatus. The twenty-sixth embodiment is different from the twenty-first embodiment in that the optical length adjuster 210 is replaced by a piezoelectric actuator 220. This piezoelectric actuator 220 has a function of shifting the diffusing and reflecting member 82 so as to change the optical lengths of object beams 32 and 320.

More specifically, the piezoelectric actuator 220 causes a self expansion or contraction in response to a voltage applied from the controller 20. Thus, the position of the diffusing and reflecting member 82 is changed with respect to the photosensitive element 81. For example, the piezoelectric actuator 220 of the twenty-sixth embodiment is a lamination-layer type piezoelectric actuator using piezoelectric ceramics. When an electric field of 1KV/mm is applied to this lamination-layer type piezoelectric actuator 220, an expansion of approximately 0.1% is caused in the direction of the applied electric field. Accordingly, for a piezoelectric ceramics having a width of 1 mm, a change of ±1 μm is realized by turning on and off the above-explained electric field. Other arrangements are substantially the same as those disclosed in the twenty-first embodiment.

In short, the twenty-sixth embodiment provides a manufacturing method for Fresnel's holographic screens based on a single light flux exposure operation, comprising the steps of: disposing a half mirror (150) at one side of a photosensitive element (81), so that part of a light flux (301) penetrating the half mirror (150), serving as a reference beam (31), is irradiated directly to the photosensitive element (81); disposing a recording object (82) at the other side of the photosensitive element (81), so that another part of the light flux (301) penetrating both of the half mirror (150) and the photosensitive element (81) and then reflected by the recording object (82) and further reflected by the half mirror (150) is converted into an object beam (32) advancing toward the photosensitive element (81); adjusting a positional relationship between the photosensitive element (81) and the recording object (82), so as to suppress a formation of Lippmann's hologram formed by the reference beam (31) and a beam (320) reflected by the recording object (82) and then directly entering the photosensitive element (81); and forming a Fresnel's hologram on the photosensitive element (81) by using the reference beam (31) and the object beam (32).

Preferably, the positional relationship between the photosensitive element (81) and the recording object (82) is adjusted during an exposure operation in such a manner that the position of interference fringes of the Lippmann's hologram formed on the photosensitive element (81) is shifted by an amount equivalent to a half of a gap of the interference fringes.

Furthermore, the twenty-sixth embodiment provides an exposure apparatus for Fresnel's holographic screens comprising: a light source (11) for emitting a coherent beam (30); a first holder (12) for supporting a photosensitive element (81) on which a hologram is formed; an optical system (131, 132) disposed at one side of the photosensitive element (81); a half mirror (150) disposed between the optical system (131, 132) and the photosensitive element (81), so that part of the coherent beam (301) emitted from the light source (11) and penetrating the half mirror (150) is irradiated directly on the photosensitive element (81) as a reference beam (31); a second holder (14) for supporting a recording object (82), disposed at the other side of the photosensitive element (81), so that another part of the coherent beam (301) penetrating both of the half mirror (150) and the photosensitive element (81) is reflected by the recording object (82), then the beam reflected by the recording object (82) being further reflected by the half mirror (150) as an object beam (32) advancing toward the photosensitive element (81); position adjusting means (220) for adjusting a positional relationship between the photosensitive element (81) and the recording object (82) in response to a control signal, so that a Fresnel's hologram is formed on the photosensitive element (81) by using the reference beam (31) and the object beam (32).

Preferably, a control means (20) controls the position adjusting means (220) to suppress a formation of Lippmann's hologram formed by the reference beam (31) and a beam (320) reflected by the recording object (82) and then directly entering the photosensitive element (81). More specifically, the position adjusting means (220) adjusts the positional relationship between the photosensitive element (81) and the recording object (82) during an exposure operation in such a manner that the position of interference fringes of the Lippmann's hologram formed on the photosensitive element (81) is shifted by an amount equivalent to a half of a gap of the interference fringes.

Twenty-seventh embodiment

Figure 29:
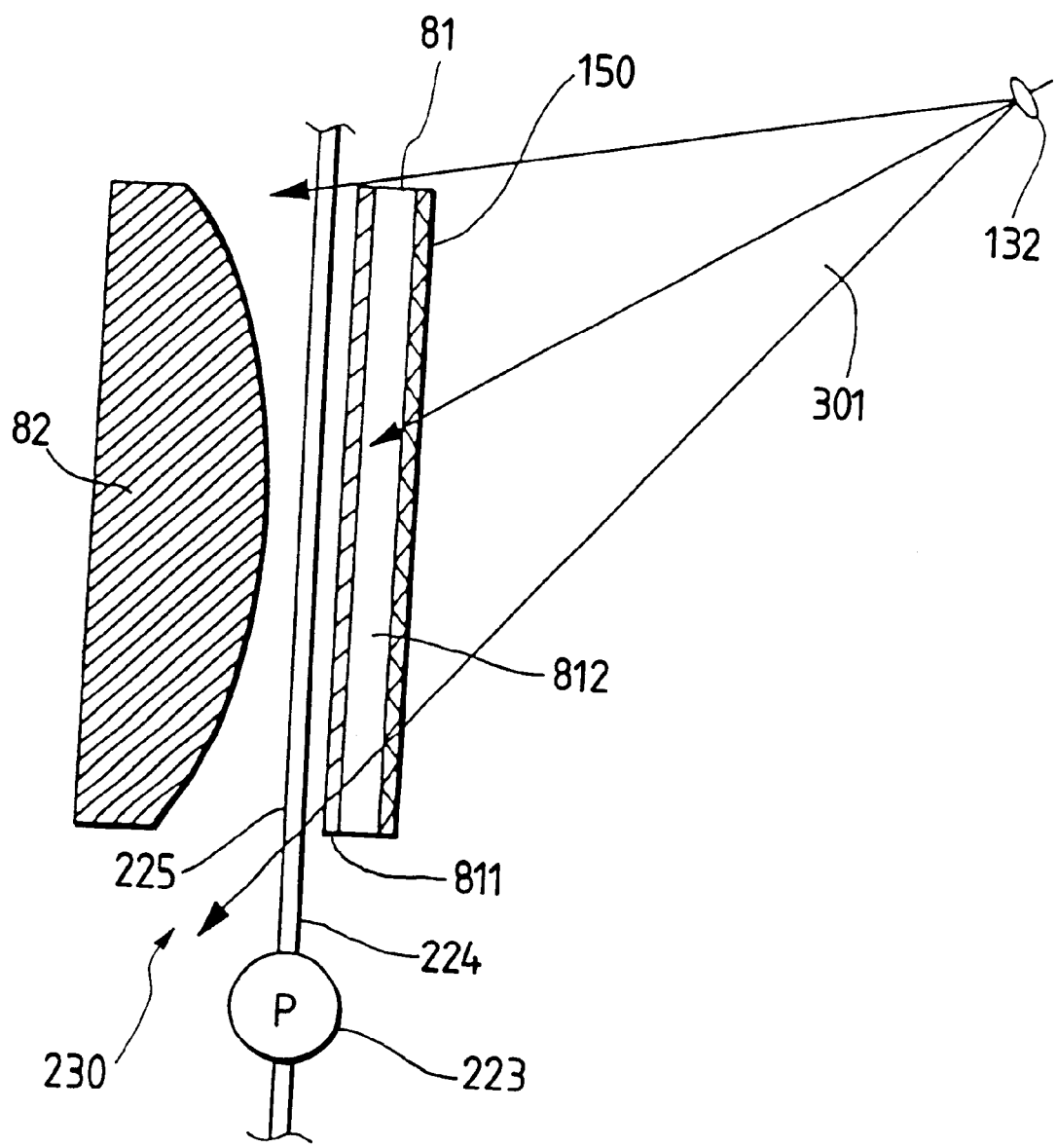
FIG. 29 is a schematic view showing an arrangement of a hologram exposure apparatus in accordance with a twenty-seventh embodiment of the present invention.

A twenty-seventh embodiment of the present invention, as shown in FIG. 29, discloses a modified hologram exposure apparatus. The twenty-seventh embodiment is different from the twenty-first embodiment in that the optical length adjuster 210 is replaced by another optical length adjuster 230. The optical length adjuster 230 of this embodiment comprises a circulating pump 223 and partition walls 224 and 225. Fluid having a predetermined refractive index is supplied to a clearance between two partition walls 224 and 225 by the circulating pump 223, so as to adjust the optical length.

When "G" represents the gap between two partition walls 224 and 225 and "n" represents a refractive index difference between air and the above fluid, the optical length can be varied by an amount ±nG.

It is also possible to insert or extract a solid plate member between two partition walls 224 and 225, instead of flowing the fluid. Other arrangements are substantially the same as those disclosed in the twenty-first embodiment.

Twenty-eighth embodiment

Figure 30:
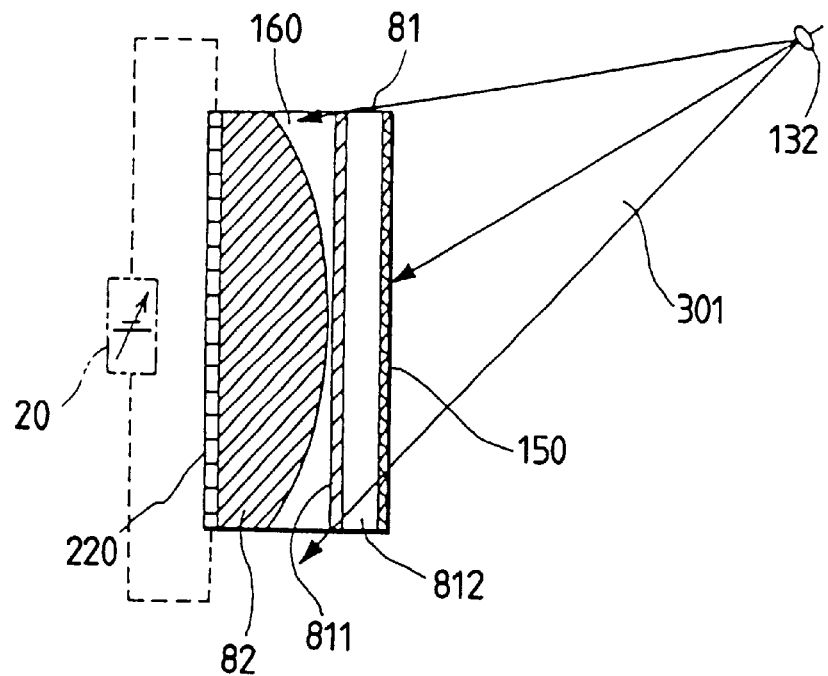
FIG. 30 is a schematic view showing an arrangement of a hologram exposure apparatus in accordance with a twenty-eighth embodiment of the present invention.

A twenty-seventh embodiment of the present invention, as shown in FIG. 30, discloses a modified hologram exposure apparatus. The twenty-eighth embodiment is different from the twenty-sixth embodiment in that refractive index adjusting liquid 160 is filled in the clearances among optical components 81, 82 and 150, although refractive index adjusting liquid 160 is not shown between optical components 81 and 150 in the drawing.

According to the arrangement of the twenty-eight embodiment, it becomes possible to surely prevent adverse reflections occurring at the boundary surfaces of these optical components 81, 82 and 150. Other arrangements are substantially the same as those disclosed in the twenty-sixth embodiment.

Twenty-ninth embodiment

Figure 31:
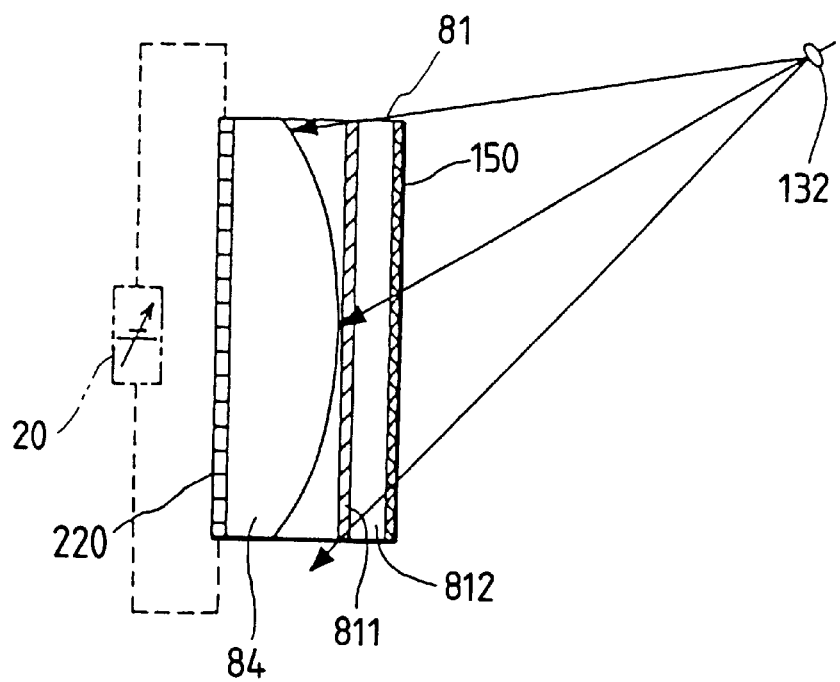
FIG. 31 is a schematic view showing an arrangement of a hologram exposure apparatus in accordance with a twenty-ninth embodiment of the present invention.

A twenty-ninth embodiment of the present invention, as shown in FIG. 31, discloses a modified hologram exposure apparatus. The twenty-ninth embodiment is different from the twenty-eighth embodiment in that the diffusing and reflecting member 82 is replaced by a reflection-type optical component 84 such as a convex mirror.

With the arrangement of the twenty-ninth embodiment, it becomes possible to fabricate a holographic optical element having recorded the optical component 84. Other arrangements are substantially the same as those disclosed in the twenty-eighth embodiment.

Thirtieth embodiment

Figure 32:
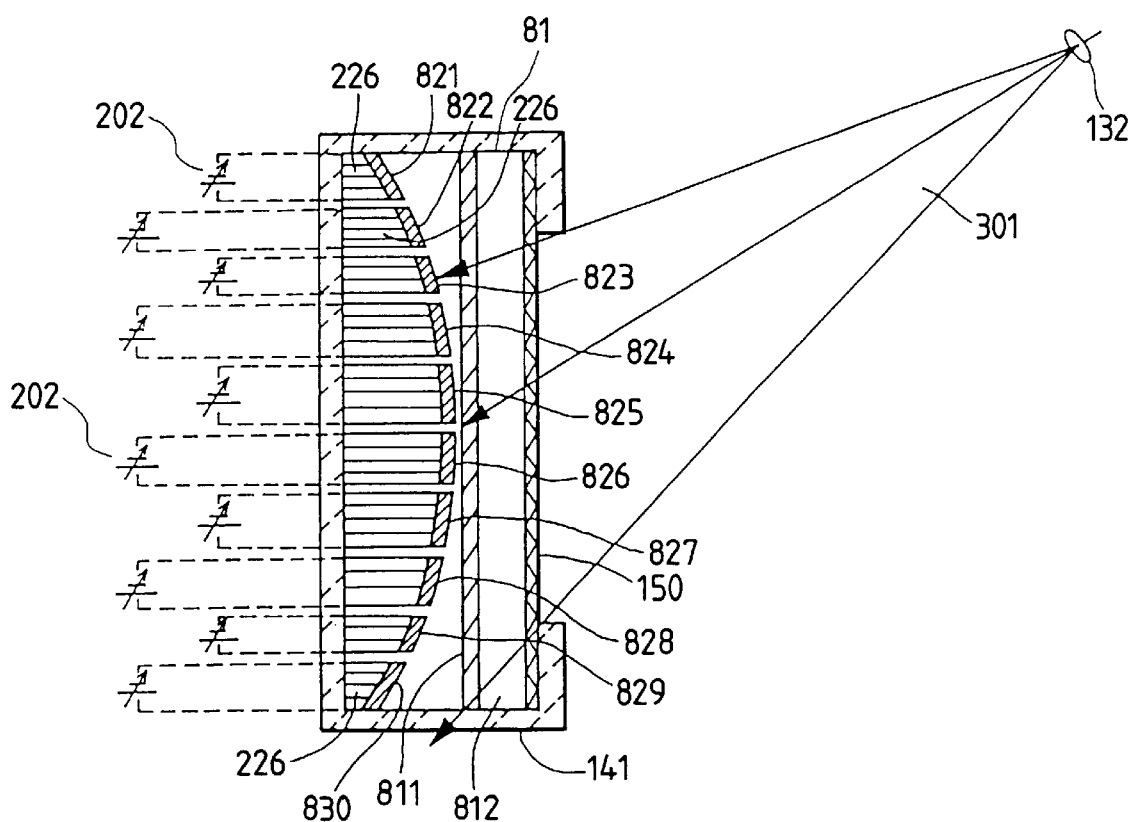
FIG. 32 is a schematic view showing an arrangement of a hologram exposure apparatus in accordance with a thirtieth embodiment of the present invention.

A thirtieth embodiment of the present invention, as shown in FIG. 32, discloses a modified hologram exposure apparatus. The thirtieth embodiment is different from the twenty-eighth embodiment in that the diffusing member 82 and the piezoelectric actuator 220 are separated into a plurality of diffusing segments 821–830 and piezoelectric actuator segments 226. These diffusing segments 821–830 are accommodated in a housing 141. Each piezoelectric actuator segment 226 is controlled by an independent power source 202. Diffusing segments 821–830 are associated with these piezoelectric actuating segment 226, respectively. As a result, interference fringes formed on the photosensitive member 81 can be controlled locally in each intended region of the photosensitive member 81. This arrangement is desirably used for manufacturing a large-scale hologram screen by a single exposure operation. Other arrangements are substantially the same as those disclosed in the twenty-eighth embodiment.

Thirty-first embodiment

Figure 33:
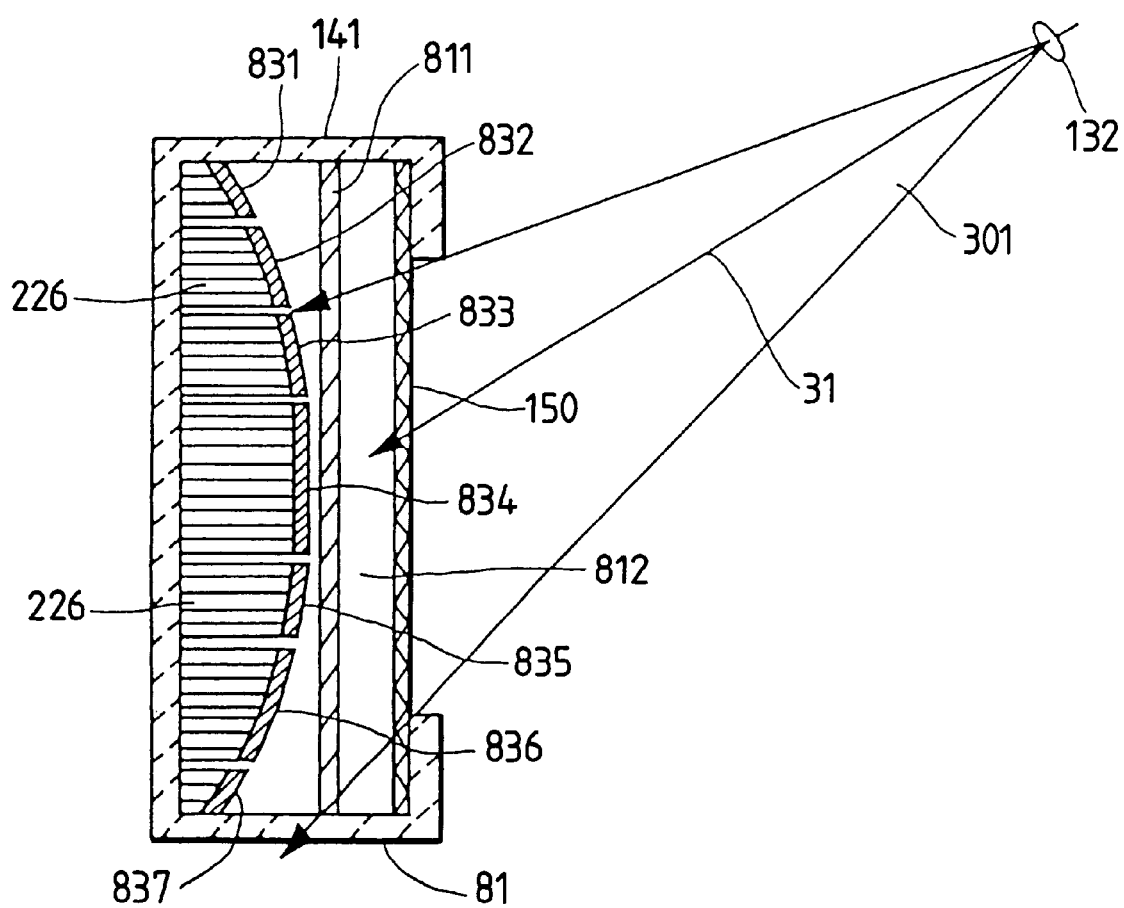
FIG. 33 is a schematic view showing an arrangement of a hologram exposure apparatus in accordance with a thirty-first embodiment of the present invention.

A thirty-first embodiment of the present invention, as shown in FIG. 33, discloses a modified hologram exposure apparatus. The thirty-first embodiment is different from the thirtieth embodiment in that the number of diffusing segments 831–837 and associated piezoelectric actuator segments 226 is reduced and the surfaces of diffusing segments 821–830 are flattened. Power sources 202 are omitted in the drawing.

According to the arrangement of the thirty-first embodiment, a continuation of flat surfaces of the diffusing segments 831–837 approximates the curved surface of diffusing member 82 to obtain the substantially the same effect. This arrangement is advantageous in that the manufacturing of diffusing segments 831–837 is simple. Other arrangements are substantially the same as those disclosed in the thirtieth embodiment.

Thirty-second embodiment

Figure 34:
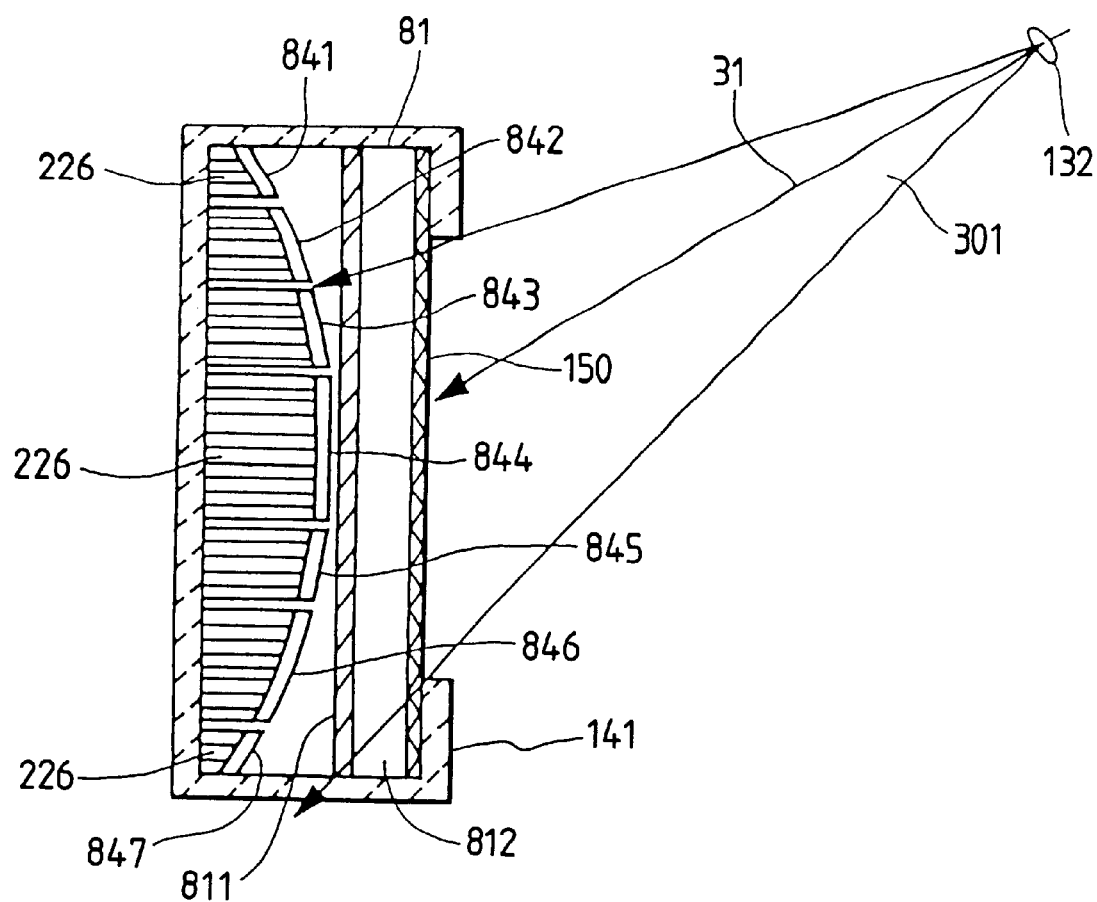
FIG. 34 is a schematic view showing an arrangement of a hologram exposure apparatus in accordance with a thirty-second embodiment of the present invention.

A thirty-second embodiment of the present invention, as shown in FIG. 34, discloses a modified hologram exposure apparatus. The thirty-second embodiment is different from the thirty-first embodiment in that the diffusing segments 831–837 are replaced by plane mirrors 841–847.

According to the arrangement of the thirty-second embodiment, a continuation of plane mirrors 841–847 approximates the convex mirror 84 shown in the twenty-ninth embodiment. This arrangement is advantageous in that the manufacturing of plane mirrors 841–847 is simple. Other arrangements are substantially the same as those disclosed in the thirty-first embodiment.

Thirty-third embodiment

Figure 35:
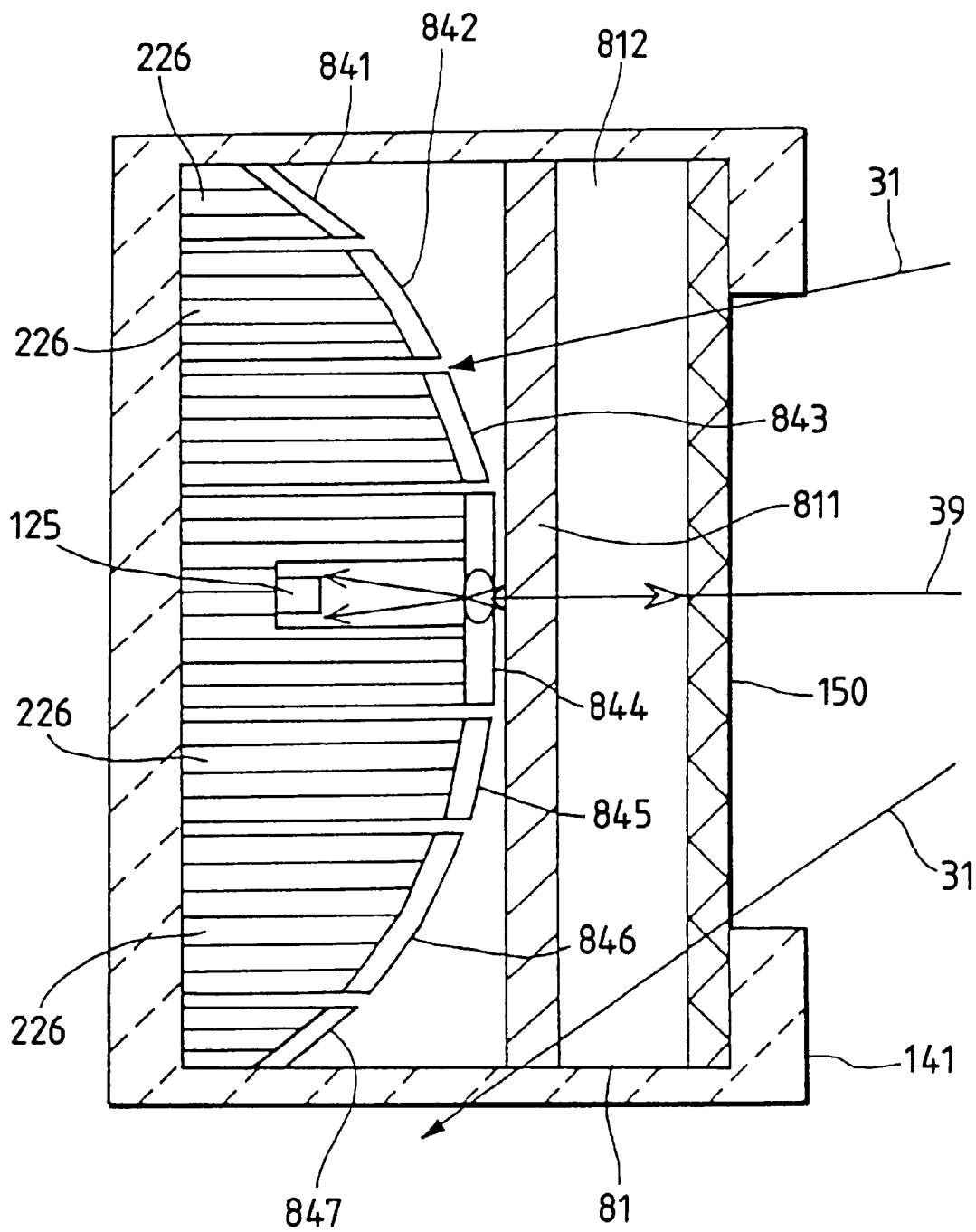
FIG. 35 is a schematic view showing an arrangement of a hologram exposure apparatus in accordance with a thirty-third embodiment of the present invention.

A thirty-third embodiment of the present invention, as shown in FIG. 35, discloses a modified hologram exposure apparatus. The thirty-third embodiment is different from the thirty-second embodiment in that a photo sensor 125 is provided for detecting the contrast of the resultant interference fringes formed on the photosensitive element 81.

According to the arrangement of the thirty-third embodiment, each piezoelectric actuator segment 226 can be feedback controlled in accordance with an output signal of the photo sensor 125.

Although FIG. 35 discloses only one photo sensor 125, it is of course possible to provide a plurality of photo sensors. The photo sensor 125 may be a type detecting the wavelength of reference beam 31 (or object beam 32) used for the exposure operation. Otherwise, the photo sensor 125 can be a type detecting another beam 39 irradiated independently of the beams 31 and 32 used for the exposure operation. Other arrangements are substantially the same as those disclosed in the thirty-second embodiment. Furthermore, the photo sensor 125 can be applied to other embodiments.

In short, the thirty-third embodiment provides a hologram manufacturing method based on a single light flux exposure operation, comprising the steps of: disposing a recording object (841–847) at one side of a photosensitive element (81); irradiating part of a light flux as a reference beam (31) to the other side of the photosensitive element (81); converting another part of the light flux penetrating the photosensitive element (81) and then reflected by the recording object (841–847) into an object beam (32) advancing toward the photosensitive element (81); adjusting a positional relationship between the photosensitive element (81) and the recording object (841–847); forming interference fringes on the photosensitive element (81) by using the reference beam (31) and the object beam (32), monitoring the interference fringes formed on the photosensitive element (81); and then feedback controlling the positional relationship between the photosensitive element (81) and the recording object (82) in response to a monitoring result.

Furthermore, the thirty-third embodiment provides a hologram exposure apparatus based on a single light flux exposure operation, comprising: a light source (11, refer to FIG. 28) for emitting a coherent beam (30); a first holder (141) for supporting a photosensitive element (81) on which a hologram is formed; an optical system (131, 132) disposed at one side of the photosensitive element (81) for irradiating part of the coherent beam emitted from the light source (11) directly on the photosensitive element (81) as a reference beam (31); a second holder (141) for supporting a recording object (841–847), disposed at the other side of the photosensitive element (81), so that another part of the coherent beam penetrating the photosensitive element (81) is reflected by the recording object (841–847) and converted into an object beam (32) advancing toward the photosensitive element (81); position adjusting means (226) for adjusting a positional relationship between the photosensitive element (81) and the recording object in response to a control signal, so that desired interference fringes are formed on the photosensitive element (81) by using the reference beam and the object beam, monitoring means (125) for detecting the interference fringes formed on the photosensitive element (81), and control means (20) for controlling the position adjusting means (226) in response to an output of the monitoring means (125).

Thirty-fourth embodiment

Figure 36:
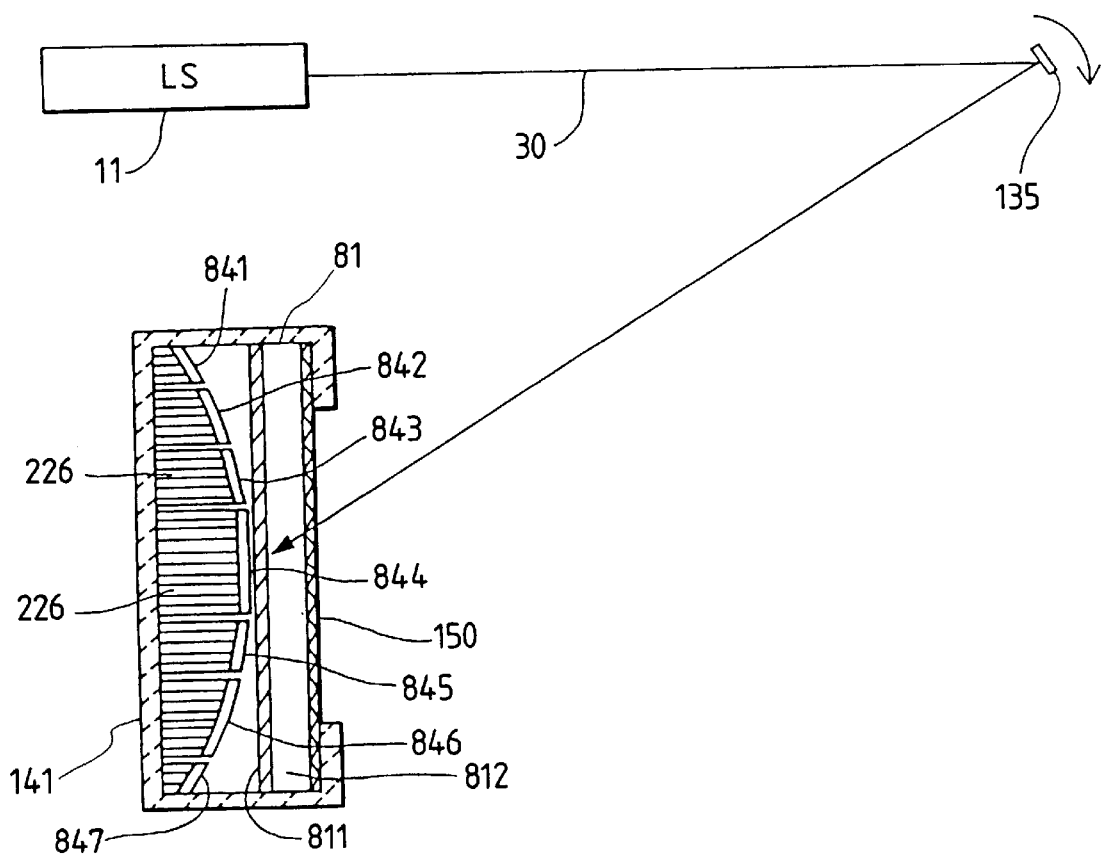
FIG. 36 is a schematic view showing an arrangement of a hologram exposure apparatus in accordance with a thirty-fourth embodiment of the present invention.

A thirty-fourth embodiment of the present invention, as shown in FIG. 36, discloses a modified hologram exposure apparatus. The thirty-fourth embodiment is different from the thirty-second embodiment in that the divergent lens 132 (refer to FIG. 23) is removed and, instead, the reflection mirror 131 is replaced by a rotary mirror 135.

According to the arrangement of the thirty-fourth embodiment, beam 30 is irradiated successively on the surface of the photosensitive element 81 in accordance with a scanning operation responsive to an angular change of the rotary mirror 135. Thus, interference fringes can be formed on the photosensitive element 81 entirely, without using the divergent or parallel light flux having an expanded width. Other arrangements are substantially the same as those disclosed in the thirty-second embodiment.

Thirty-fifth embodiment

Figure 37:
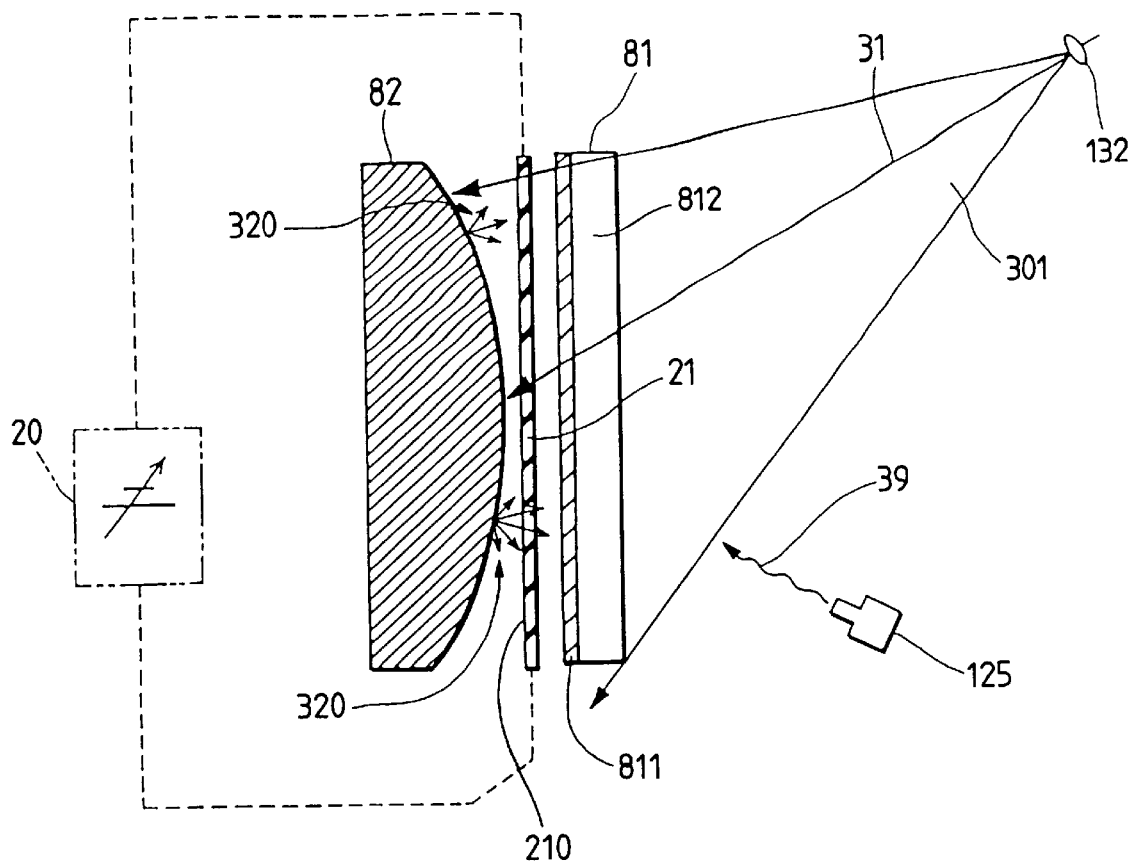
FIG. 37 is a schematic view showing an arrangement of a hologram exposure apparatus in accordance with a thirty-fifth embodiment of the present invention.

A thirty-fifth embodiment of the present invention, as shown in FIG. 37, discloses a modified hologram exposure apparatus. The thirty-fifth embodiment is different from the twenty-first embodiment in that the half mirror 150 is removed and a Lippmann's holographic screen is formed by the reference beam 31 and a primary object beam 320 reflected by the diffusing member 82. A photo sensor 125 is disposed in the vicinity of the photosensitive element 81 to detect interference fringes formed on the photosensitive element 81. An output of the photo sensor 125 is sent to the controller 20 to perform a feedback control of the optical length adjuster 210 so as to create sharp fringes. Other arrangements are substantially the same as those disclosed in the twenty-first embodiment.

In short, the thirty-fifth embodiment provides a hologram manufacturing method based on a single light flux exposure operation, comprising the steps of: disposing a recording object (82) at one side of a photosensitive element (81); irradiating part of a light flux (301) as a reference beam (31) to the other side of the photosensitive element (81); converting another part of the light flux penetrating the photosensitive element (81) and then reflected by the recording object (82) into an object beam (320) advancing toward the photosensitive element (81); adjusting an optical length of at least one of the reference beam (31) and the object beam (320); forming interference fringes on the photosensitive element (81) by using the reference beam (31) and the object beam (32); monitoring the interference fringes formed on the photosensitive element (81); and feedback controlling the optical length of at least one of the reference beam (31) and the object beam (320) in response to a monitoring result.

Furthermore, the thirty-fifth embodiment provides a hologram exposure apparatus based on a single light flux exposure operation, comprising: a light source (11) for emitting a coherent beam (30); a first holder (12) for supporting a photosensitive element (81) on which a hologram is formed; an optical system (131, 132) disposed at one side of the photosensitive element (81) for irradiating part of the coherent beam (30) emitted from the light source (11) directly on the photosensitive element (81) as a reference beam (31); a second holder (14) for supporting a recording object (82), disposed at the other side of the photosensitive element (81), so that another part of the coherent beam penetrating the photosensitive element (81) is reflected by the recording object (82) and converted into an object beam (320) advancing toward the photosensitive element (81); optical length adjusting means (210) for adjusting an optical length of at least one of the reference beam (31) and the object beam (320) in response to a control signal, so that desired interference fringes are formed on the photosensitive element (81) by using the reference beam (31) and the object beam (320), monitoring means (125) for detecting the interference fringes formed on the photosensitive element (81), and control means (20) for controlling the optical length adjusting means (2109 in response to an output of the monitoring means (125).

Thirty-sixth embodiment

Figure 38:
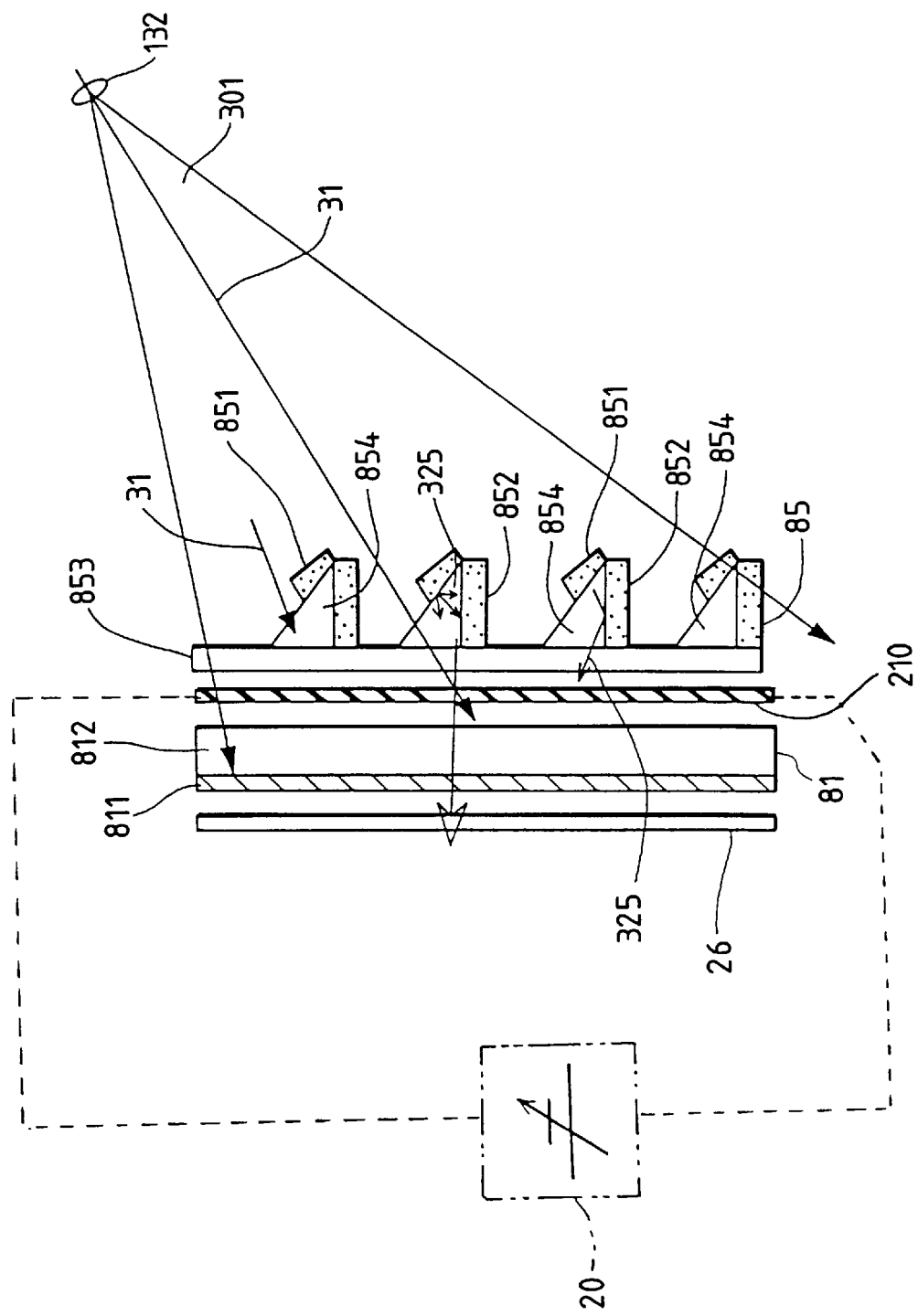
FIG. 38 is a schematic view showing an arrangement of a hologram exposure apparatus in accordance with a thirty-sixth embodiment of the present invention.

A thirty-sixth embodiment of the present invention, as shown in FIG. 38, discloses a modified hologram exposure apparatus. The thirty-sixth embodiment is different from the thirty-fifth embodiment in that a diffusing unit 85 is disposed at the front side of the photosensitive element 81 to form a Fresnel's hologram and a monitor (e.g. a pattern recognition device) 26 is provided at the behind side of the photosensitive element 81 to monitor the interference fringes formed.

The diffusing unit 85 comprises a transparent plate 853 and a plurality of prisms 854 disposed on the front surface of the transparent plate 853 at same intervals in an up-and-down direction. Each prism 853 has an inclined surface on which a diffusing plate 851 is provided and a bottom surface on which a reflecting plate 852 is attached.

According to the arrangement of the thirty-sixth embodiment, part of divergent light flux 301, as reference beam 31, is directly irradiated to the surface of the photosensitive element 81 without passing through the diffusing plate 851. Another part of the divergent light flux 301 penetrates the diffusing plate 851 and becoming a scattered beam. The scattered beam, as object beam 325, reaches the photosensitive element 81 directly or indirectly after it is once reflected by the reflecting plate 852.

The arrangement of the thirty-sixth embodiment is effective to suppress any formation of Lippmann's hologram because the recording object is located at the front side of the photosensitive element 81. Furthermore, it becomes possible to clearly separate the reference beam 31 and the object beam 325. With this arrangement, interference fringes can be formed locally at a plurality of spots by using the reference beam 31 and the object beam 325.

The interference fringes formed on the photosensitive element 81 are checked by a monitor 26 disposed at the behind side of the photosensitive element 81. An output signal of the monitor 26 is sent to the controller 20 to control the optical length adjuster 210 so as to create sharp fringes.

Furthermore, this embodiment is advantageous in that the incident angle of a beam can be adjusted by reflecting plate 852. And, by varying the angle of this reflecting plate 852, the view region during the reproduction can be enlarged.

Yet further, by shifting the photosensitive element 81 in an up-and-down direction, the hologram can be uniformly formed on an entire surface of the photosensitive element 81. Other arrangements are substantially the same as those disclosed in the twenty-fifth embodiment.

Thirty-seventh embodiment

Figure 39:
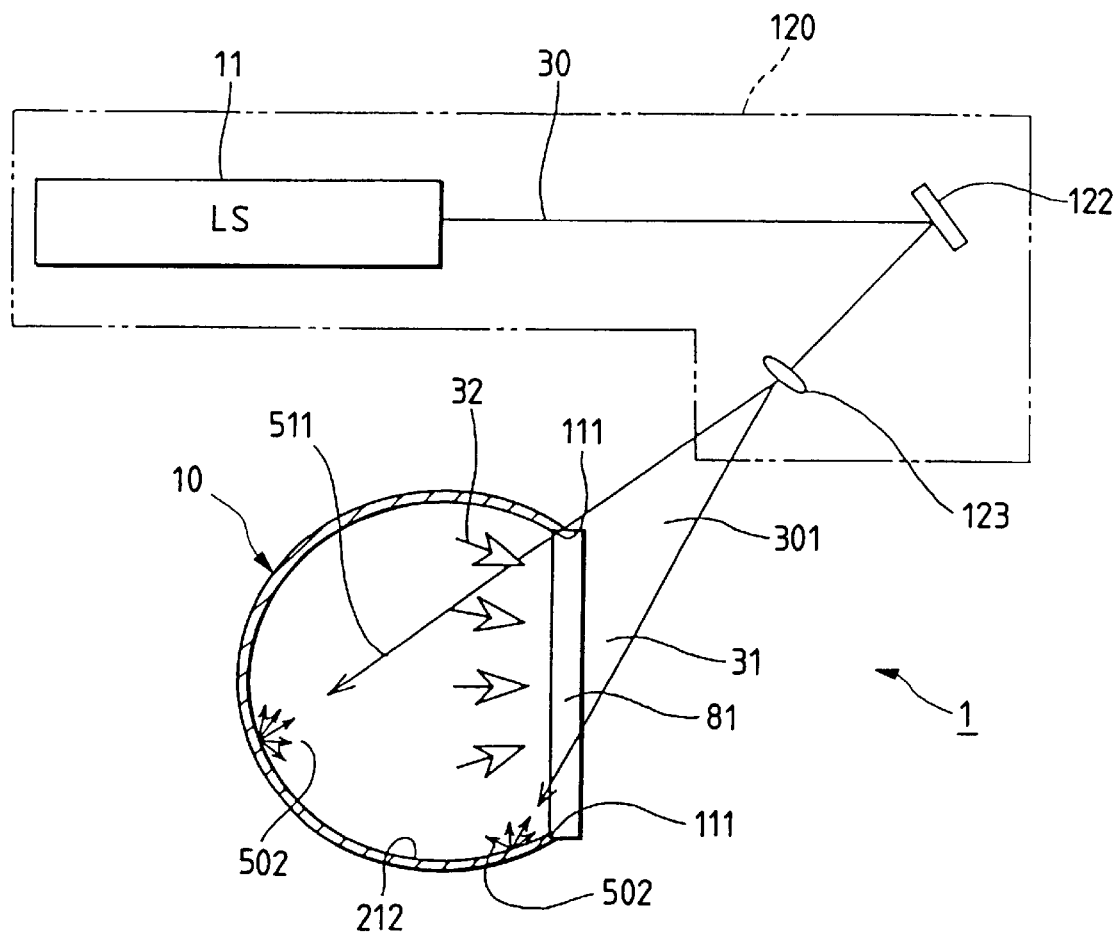
FIG. 39 is a schematic view showing an arrangement of a hologram exposure apparatus in accordance with a thirty-seventh embodiment of the present invention.

A thirty-seventh embodiment of the present invention, as shown in FIG. 39, discloses a modified hologram exposure apparatus. This hologram exposure apparatus 1 comprises a reaction container 10 and an optical system 120. The reaction container 10 is a spherical body with an opening 111 for supporting a photosensitive element 81 and an inside wall surface 212 made of diffusing and reflecting member. The optical system 120 irradiates a divergent light flux 301 so as to advance toward the opening 111.

Part of the divergent light flux 301, as a reference beam 31, reaches the photosensitive element 81 supported by photosensitive element 81. Another part of the divergent light flux 301, i.e. a reference beam 511, penetrates the photosensitive element 81 and is reflected by the inside wall surface 212 of reaction container 10 as a scattered beam 502 serving as an object beam 32. Interference fringes are formed on the photosensitive element 81 by the reference beam 31 and the object beam 32.

As a result, a hologram formed on the photosensitive element 81 records the diffusing and reflecting body of the inner wall surface 212. When the resultant hologram is irradiated by a beam similar to the reference beam 31 from the similar direction, a scattered beam similar to object beam 32 is reflected from the hologram, thus serving as a holographic screen.

More specifically, a coherent beam 30 is emitted from a light source (e.g. laser device) 11. The coherent beam 30 is reflected by a reflection mirror 122 and advances toward a divergent lens 123. The divergent lens 123 converts the coherent beam 30 into the divergent light flux 301 with an expanded width which is irradiated to the photosensitive element 81. These light source 11, reflection mirror 122 and divergent lens 123 cooperatively constitute the optical system 120.

The photosensitive element 81 is coated by gelatin dichromate, photo polymer, or silver salt. Part of incident light is absorbed by the photosensitive element 81, and another part of the incident light penetrates the photosensitive element 81.

The inner wall surface 212 is formed by white coating material chiefly containing aluminum oxide or barium oxide. Or, powder of glass beads can be applied on the inner wall surface 212.

The reference beam 511, having passing through the photosensitive element 81, is reflected as scattered beams 502 advancing at random directions. Then, scattered beams 502 reach the photosensitive element 81 directly or after causing repetitive reflections on the inside wall surface 212. In this manner, most of reference beam 511 entering in the reaction container 10 it subjected to repetitive reflections at random directions until it reaches the photosensitive element 81. In other words, the optical path of the object beam 32 is randomized so that the intensity of object beam (i.e. scattered beam) 32 reaching the photosensitive element 81 is averaged irrespective of the position on the photosensitive element 81. Furthermore, the directionality of reflections, as a screen, is extremely weak.

From the reasons above described, a Lippmann's hologram screen formed by the reference beam 31 and the object beam 32 has a uniform diffraction efficiency and weal directionality.

The reaction container 10 of the thirty-seventh embodiment has a hollow inside space. However, this hollow space can be filled with a transparent solid member, such as resin, having a low absorbing rate. Using such solid member is effective to suppress the adverse effect of disturbances, such as the fluctuation of intervening medium (i.e., air).

As apparent from the foregoing description, the thirty-seventh embodiment of the present invention provides a manufacturing method for holographic screens comprising the steps of: supporting a photosensitive element (81) at an opening (111) of a reaction container (10) which has a spherical inner wall surface (212) formed by a diffusing and reflecting member; irradiating a light flux (301) with an expanded width, as a reference beam (31) advancing from an outside to the photosensitive element (81); converting part of the reference beam (31), entering in the reaction container. (10) through the opening (111) after passing through the photosensitive element (81), by the inner wall surface (212) into a scattered beam serving as an object beam (32) returning to the photosensitive element (81); and forming interference fringes on the photosensitive element (81) by using the reference beam (31) and the object beam (31).

Furthermore, the thirty-seventh embodiment of the present invention provides an exposure apparatus (1) for holographic screens comprising: a reaction container (10) having a spherical inner wall surface (212) formed by a diffusing and reflecting member and an opening (111) for supporting a photosensitive element (81); and an optical system (120) for irradiating a light flux with (301) an expanded width, as a reference beam (31), advancing from an outside to the photosensitive element (81) supported by the opening (111) of the reaction container (10), wherein part of the reference beam (31) enters in the reaction container (10) through the opening (111) after passing through the photosensitive element (81) and is converted by the inner wall surface (212) into a scattered beam (502) serving as an object beam (32) returning to the photosensitive element (81), thereby forming interference fringes on the photosensitive element (81) by using the reference beam (31) and the object beam (32).

Preferably, the inside space of the reaction container (10) is filled with solid transparent member.

Thirty-eighth embodiment

Figure 40:
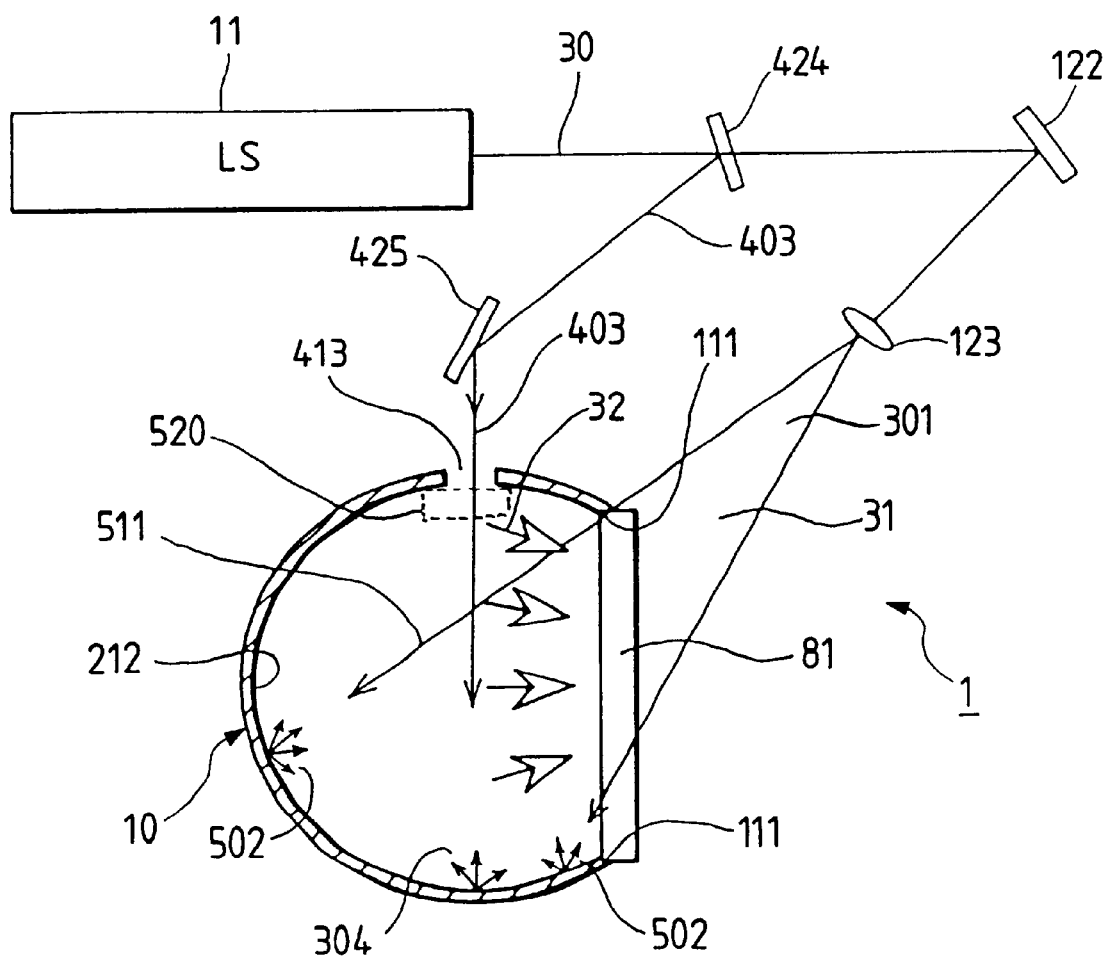
FIG. 40 is a schematic view showing an arrangement of a hologram exposure apparatus in accordance with a thirty-eighth embodiment of the present invention.

A thirty-eighth embodiment of the present invention, as shown in FIG. 40, discloses a modified hologram exposure apparatus. The thirty-eighth embodiment is different from the thirty-seventh embodiment in that an incident window 413 is provided on the reaction container 10 at a portion other than opening 111. A beam 403, entering from incident window 413, is reflected by the inner wall surface 212 as a scattered beam 304 and advances as object beam 32.

More specifically, coherent beam 30 emitted from the light source 11 is partly reflected as a beam 403 by a half mirror 424. The beam 403 is reflected by a reflection mirror 425 and advances downward and enters in the reaction container 10 through incident window 413. Then, the beam 403 is diffused and reflected by the inner wall surface 212 together with the transmissive reference beam 511, and turned into object beam 32.

To adjust the intensity of beam 403 entering through incident window 413 into the reaction container 10, an optical element 520 having an adequate permeable rate is disposed at the incident window 413 or on an optical path of the beam 403, so that the intensity rate of reference beam 31 and object beam 32 can be set flexibly.

For example, the transparency of the hologram can be set equal to or larger than 80% when the intensity ratio of reference beam 31 to object beam 32 (reference beam/object beam) is somewhere in a range of 3 through 20. Furthermore, to increase the transparency of the hologram to a value equal to or larger than 89%, the intensity ratio of reference beam 31 to object beam 32 is set somewhere in a range of 5 through 20. On the other hand, when the intensity ratio of reference beam 31 to object beam 32 is equal to or smaller than 2, there is a possibility that a strong noise hologram is generated by the interference between object beams and hence the transparency is deteriorated.

It is also possible to dispose a transparent diffusion member at the incident window 413 to introduce a scattered beam into the reaction container 10. With this arrangement, it becomes possible to assure the scattering of object beam 32 reaching the photosensitive element 81. Other arrangements are substantially the same as those disclosed in the thirty-seventh embodiment.

The beam 403 entered through the incident window 413 is not limited to a beam having a narrow width. It is possible to use a converged or parallel light flux having an expanded width converted from the coherent beam 20 by an optical element such as a lens.

As apparent from the foregoing description, the thirty-eighth embodiment of the present invention provides a manufacturing method for holographic screens comprising the steps of: supporting a photosensitive element (81) at an opening (111) of a reaction container (10) which has a spherical inner wall surface (212) formed by a diffusing and reflecting member and an incident window (413) other than the opening (111); irradiating a light flux (301) with an expanded width, as a reference beam (31) advancing from an outside to the photosensitive element (81); converting an incident beam (403) introduced from the incident window (413) and part of the reference beam (31), entering in the reaction container (10) through the opening (111) after passing through the photosensitive element (81), by the inner wall surface (212) into a scattered beam (502) serving as an object beam (32) returning to the photosensitive element (81); and forming interference fringes on the photosensitive element (81) by using the reference beam (81) and the object beam (82).

Furthermore, the thirty-eighth embodiment of the present invention provides an exposure apparatus (1) for holographic screens comprising: a reaction container (10) having a spherical inner wall surface (212) formed by a diffusing and reflecting member, an opening (111) for supporting a photosensitive element (81), and an incident window (413) other than the opening (111); and an optical system (11, 122, 123, 424, 425) for irradiating a light flux (301) with an expanded width, as a reference beam (31), advancing from an outside to the photosensitive element (81) supported by the opening (111) of the reaction container (10) and further supplying another beam (403) introduced from the incident window (413), wherein part of the reference beam (31) enters in the reaction container (10) through the opening (111) after passing through the photosensitive element (81) and is converted by the inner wall surface (212) into a scattered beam (502) serving as an object beam (32) returning to the photosensitive element (81), while the another beam (403) introduced from the incident window (413) is also converted by the inner wall surface (212) into the object beam (32) returning to the photosensitive element (81), thereby forming interference fringes on the photosensitive element (81) by using the reference beam (31) and the object beam (32).

Thirty-ninth embodiment

Figure 41:
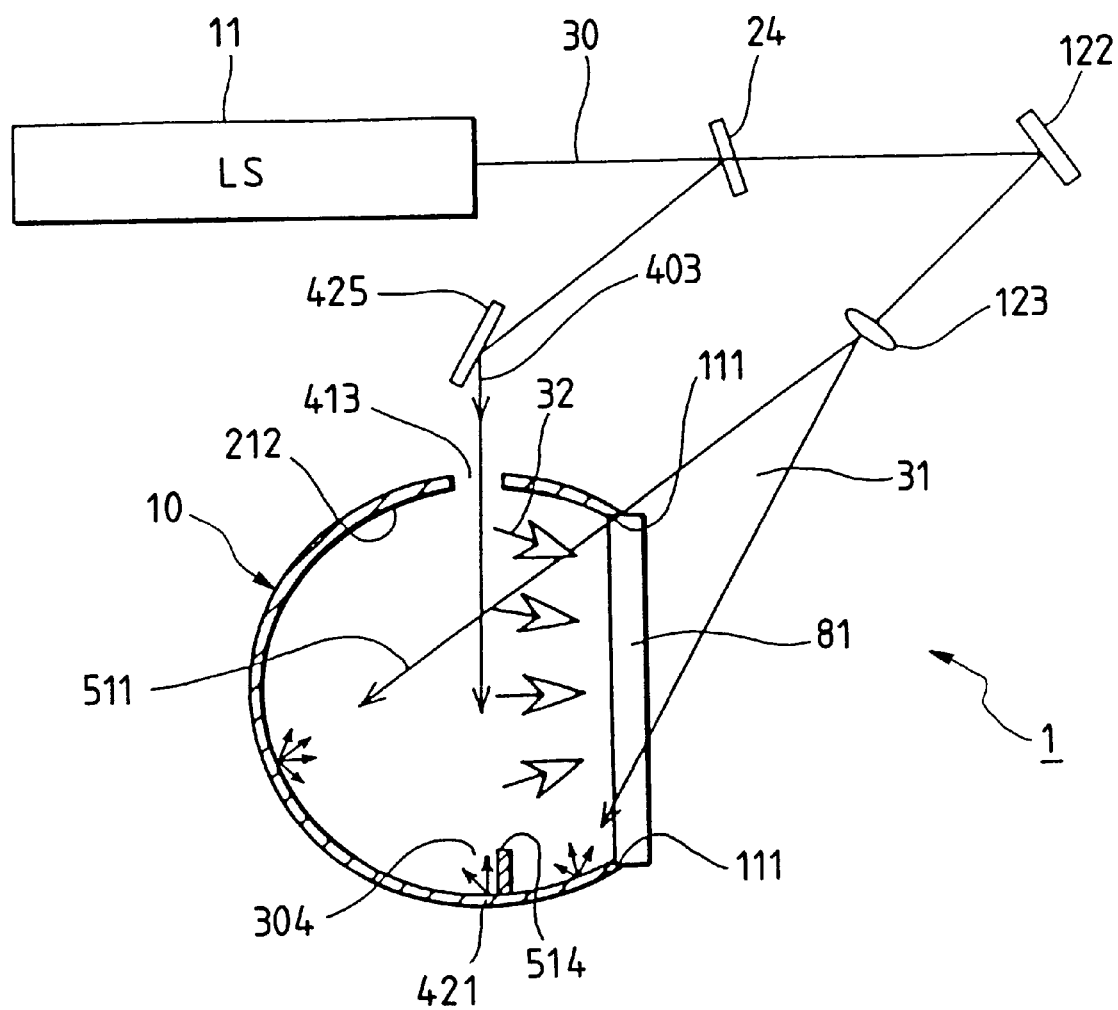
FIG. 41 is a schematic view showing an arrangement of a hologram exposure apparatus in accordance with a thirty-ninth embodiment of the present invention.

A thirty-ninth embodiment of the present invention, as shown in FIG. 41, discloses a modified hologram exposure apparatus. The thirty-ninth embodiment is different from the thirty-eighth embodiment in that a light-shielding member 514 is provided in the vicinity of a light-receiving point 421 of the inner wall surface 212 where the beam 403 entering through the incident window 413 is directly irradiated. This light-shielding member 514 has a function of preventing the beam 403 from immediately reaching the photosensitive element 81 after a single reflection at the light-receiving point 421.

In general, a primary reflection beam, directly reaching the photosensitive element 81 after being reflected from the inner wall surface 212, has an intensity larger than that of an N-order reflection beam subjected to n-time reflections at the inner wall surface 212. Accordingly, if the primary reflection beam enters the photosensitive element 81, the intensity distribution of object beam 32 will cause a undesirable deviation. However, according to the arrangement of the thirty-ninth embodiment, the light-shielding member 514 is provided between the light-receiving point 421 and the photosensitive element 81, to shield the primary reflection beam directly reaching the photosensitive element 81 without further reflections at the inner wall surface 212. With this arrangement, it becomes possible to eliminate the undesirable deviation of the intensity distribution of object beam 32.

As apparent from the foregoing description, the thirty-ninth embodiment of the present invention provides a light-shielding member (514) in the vicinity of a light-receiving point (421) of the inner wall surface (212) where the beam (403) entering through the incident window (413) is directly irradiated, so as to prevent the beam (403) from immediately reaching the photosensitive element (81) after a single reflection at the light-receiving point (421).

Fortieth embodiment

Figure 42:
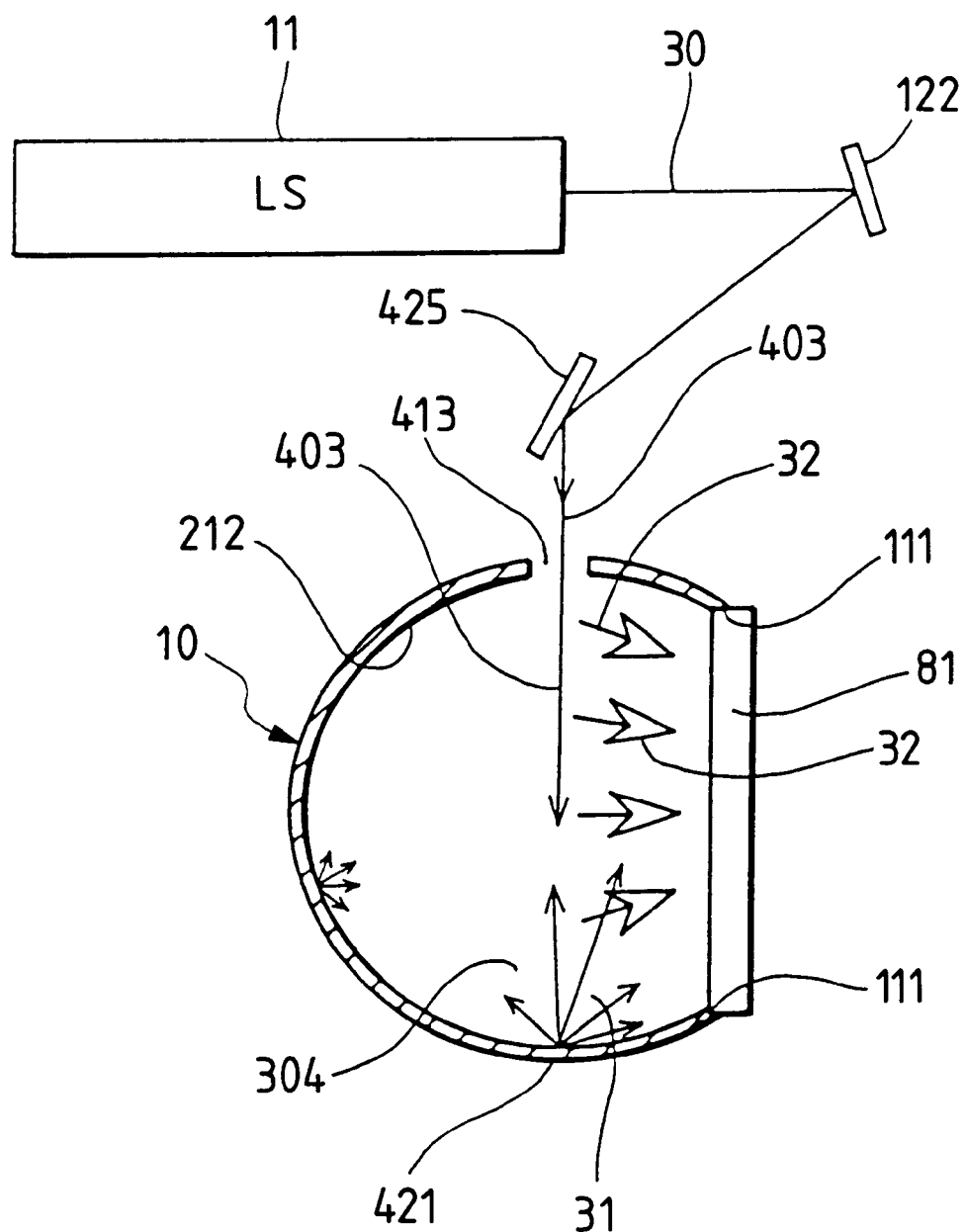
FIG. 42 is a schematic view showing an arrangement of a hologram exposure apparatus in accordance with a fortieth embodiment of the present invention.

A fortieth embodiment of the present invention, as shown in FIG. 42, discloses a modified hologram exposure apparatus. According to the fortieth embodiment, a coherent beam 30 is irradiated from light source 11. This light beam 30 is reflected by a reflection mirror 122. Then, the beam 30 reflected by the reflection mirror 122 is introduced as beam 403 through incident window 413 into reaction container 10. A primary reflection beam, reflected one time at the inner wall surface 212, advances as reference beam 31 toward the photosensitive element 81. Meanwhile, another reflection beam, reflected plural times at the inner wall surface 212, enters as object beam 32 into the photosensitive element 81. Thus, as a result of irradiations of these reference beam 31 and object beam 32, interference fringes of Fresnel's hologram are formed on the photosensitive element 81.

The object beam 32, randomly reflected at the inner wall surface 212, has a uniform intensity with respect to the photosensitive element 81. On the other hand, the reference beam 31 of this embodiment is a divergent beam which is originated from the beam 403 entering through incident window 413 and reflected only one time at the inner wall surface 212 and soon entering the photosensitive element 81. Accordingly, this embodiment provides a transmission-type holographic screen. Furthermore, this embodiment is advantageous in that the energy of coherent beam 30 emitted from light source 11 can be used with a good efficiency because there is no necessity of separating the beam 30 on its optical path before it reaches the proximity of the photosensitive element 81.

As apparent from the foregoing description, the fortieth embodiment of the present invention provides a manufacturing method for holographic screens comprising the steps of: supporting a photosensitive element (81) at an opening (111) of a reaction container (10) which has a spherical inner wall surface (212) formed by a diffusing and reflecting member and an incident window (413) other than the opening (111); introducing a beam (403) into the reaction container (10) from the incident window (413); converting part of the introduced beam (403) into a reference beam (31) directly entering the photosensitive element (81) after a single reflection at a predetermined light-receiving point (421) on the inner wall surface (212) of the reaction container (10); converting the remainder of the introduced beam (403) into an object beam (32) entering the photosensitive element (81) through a plurality of reflections at the inner wall surface (212) of the reaction container (10); and forming interference fringes on the photosensitive element (81) by using the reference beam (31) and the object beam (32).

Furthermore, the fortieth embodiment of the present invention provides an exposure apparatus for holographic screens comprising: a reaction container (10) having a spherical inner wall surface (212) formed by a diffusing and reflecting member, an opening (111) for supporting a photosensitive element (81), and an incident window (413) other than the opening (111); and an optical system (11, 122, 425) for introducing a beam (403) into the reaction container (10) from the incident window (413), wherein part of the introduced beam (403) is converted into a reference beam (31) directly entering the photosensitive element (81) after a single reflection at a predetermined light-receiving point (421) on the inner wall surface (212) of the reaction container (10), while the remainder of the introduced beam (403) is converted into an object beam (32) entering the photosensitive element (81) through a plurality of reflections at the inner wall surface (212) of the reaction container (10), thereby forming interference fringes on the photosensitive element (81) by using the reference beam (31) and the object beam (32).

Forty-first embodiment

Figure 43:
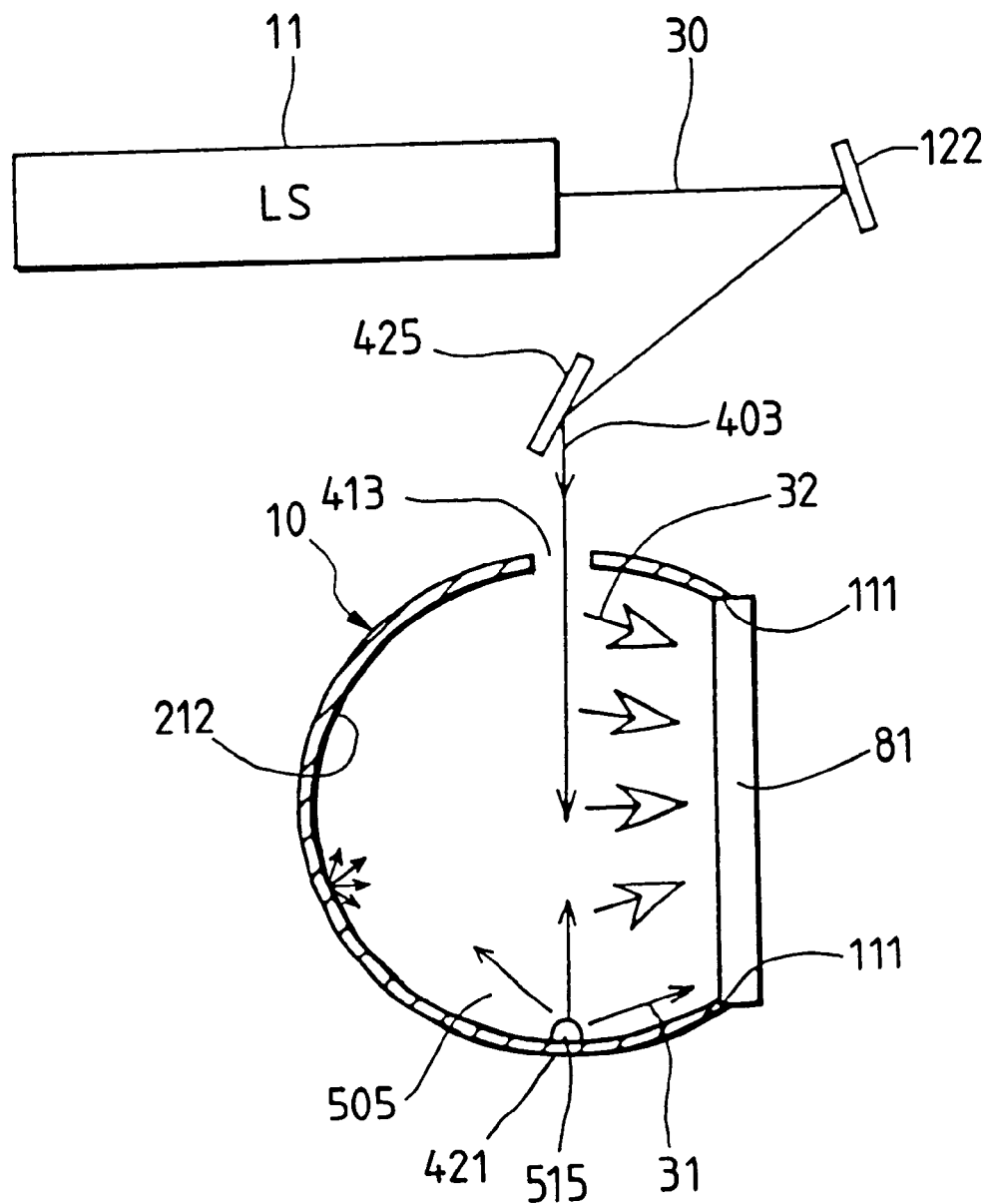
FIG. 43 is a schematic view showing an arrangement of a hologram exposure apparatus in accordance with a forty-first embodiment of the present invention.

A forty-first embodiment of the present invention, as shown in FIG. 43, discloses a modified hologram exposure apparatus. The forty-first embodiment is different from the fortieth embodiment in that a divergent and reflection member 515 is provided at the light-receiving point 421 of the inner wall surface 212. The divergent and reflection member 515 diverges and reflects some of beam 403 entering through the incident window 413 to the direction of opening 111 while diffuses and reflects the remainder of beam 403 to other directions.

The divergent and reflection member 515 may be a convex mirror having both functions of diverging and reflecting light or a member having both functions of diffusing and reflecting light. Part of a reflected beam 505, as reference beam 31, advances toward the photosensitive element 81. Another part of reference beam 505, as object beam 32, advances to other portions of inner wall surface 212.

According to this embodiment, the incident beam 403 is separated by the divergent and reflection member 515 other than the inner wall surface 212. Thus, it becomes easy to flexibly set the intensity ratio of reference beam 31 to object beam 31. Other arrangements of the forty-first embodiment are different from those disclosed in the fortieth embodiment.

As apparent from the foregoing description, the forty-first embodiment of the present invention provides a manufacturing method for holographic screens comprising the steps of: supporting a photosensitive element (81) at an opening (111) of a reaction container (10) which has a spherical inner wall surface (212) formed by a diffusing and reflecting member and an incident window (413) other than the opening (111); introducing a beam (403) into the reaction container (10) from the incident window (413); irradiating the introduced beam (403) to a beam converting member (515), so that part of the introduced beam (403) directly enters the photosensitive element (81) as a reference beam (31), while the remainder of the introduced beam (403) is converted into an object beam (32) entering the photosensitive element (81) through at least one reflection at the inner wall surface (212) of the reaction container (10); and forming interference fringes on the photosensitive element (81) by using the reference beam (31) and the object beam (32).

Furthermore, the forty-first embodiment of the present invention provides an exposure apparatus for holographic screens comprising: a reaction container (10) having a spherical inner wall surface (212) formed by a diffusing and reflecting member, an opening (111) for supporting a photosensitive element (81), and an incident window (413) other than the opening (111); an optical system (11, 122, 425) for introducing a beam (403) into the reaction container (10) from the incident window (413); and a beam converting member (515) converting part of the introduced beam (403) into a reference beam (31) directly entering the photosensitive element (81), and converting the remainder of the introduced beam (403) into an object beam (32) entering the photosensitive element (81) through at least one reflection at the inner wall surface (212) of the reaction container (10), thereby forming interference fringes on the photosensitive element (81) by using the reference beam (31) and the object beam (32).

Forty-second embodiment

Figure 44:
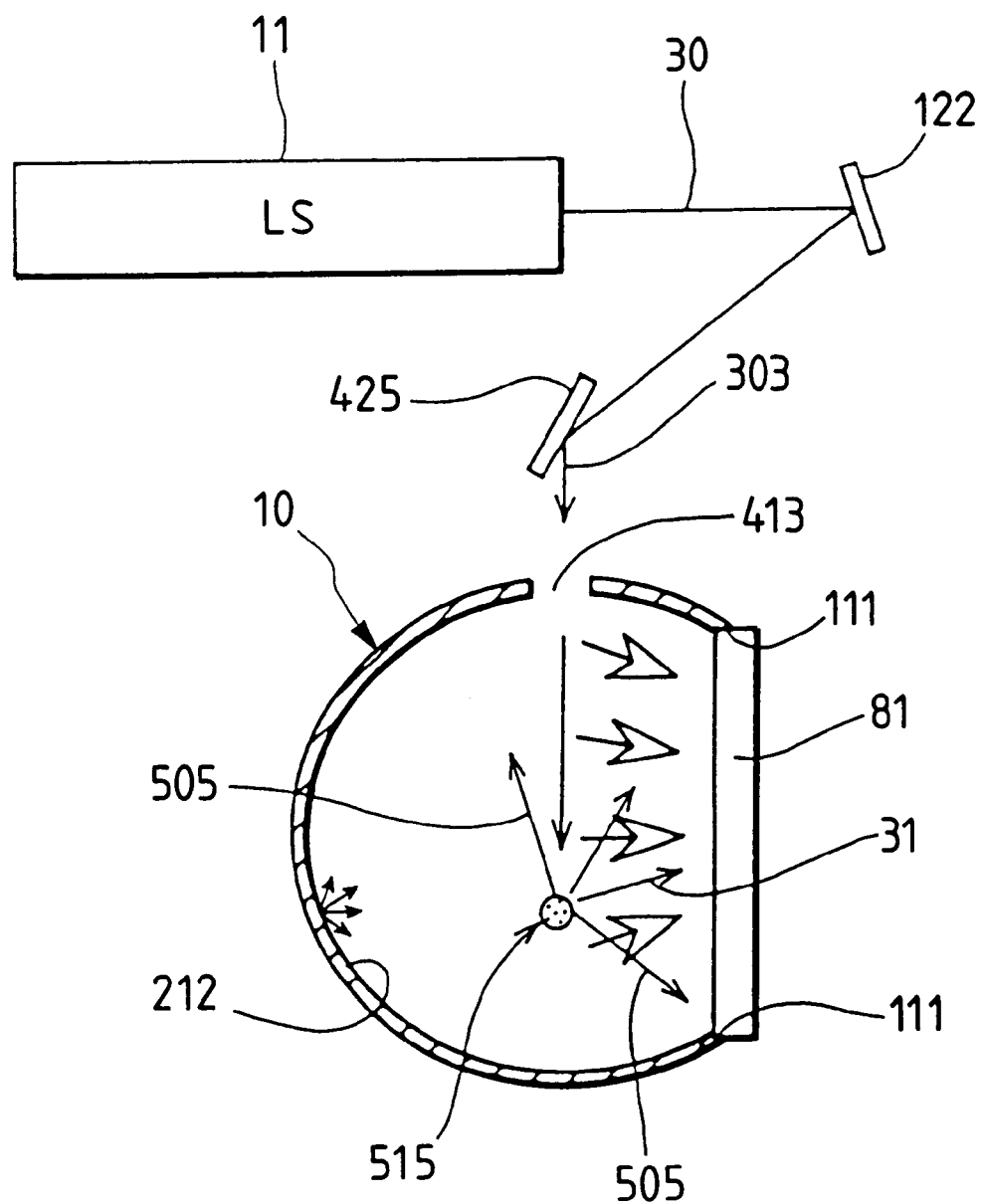
FIG. 44 is a schematic view showing an arrangement of a hologram exposure apparatus in accordance with a forty-second embodiment of the present invention.

A forty-second embodiment of the present invention, as shown in FIG. 44, discloses a modified hologram exposure apparatus. The forty-second embodiment is different from the forty-first embodiment in that the divergent and reflection member 515 is located at a more inner position spaced from the inner wall surface 212.

The arrangement of this forty-second embodiment is advantageous in that the incident direction of reference beam 31 to photosensitive element 81 can be changed flexibly by selecting the position of the divergent and reflection member 515. In other words, the forty-second embodiment makes it possible to change the direction of irradiation beam in the reproduction of a resultant holographic screen.

Forty-third embodiment

Figure 45:
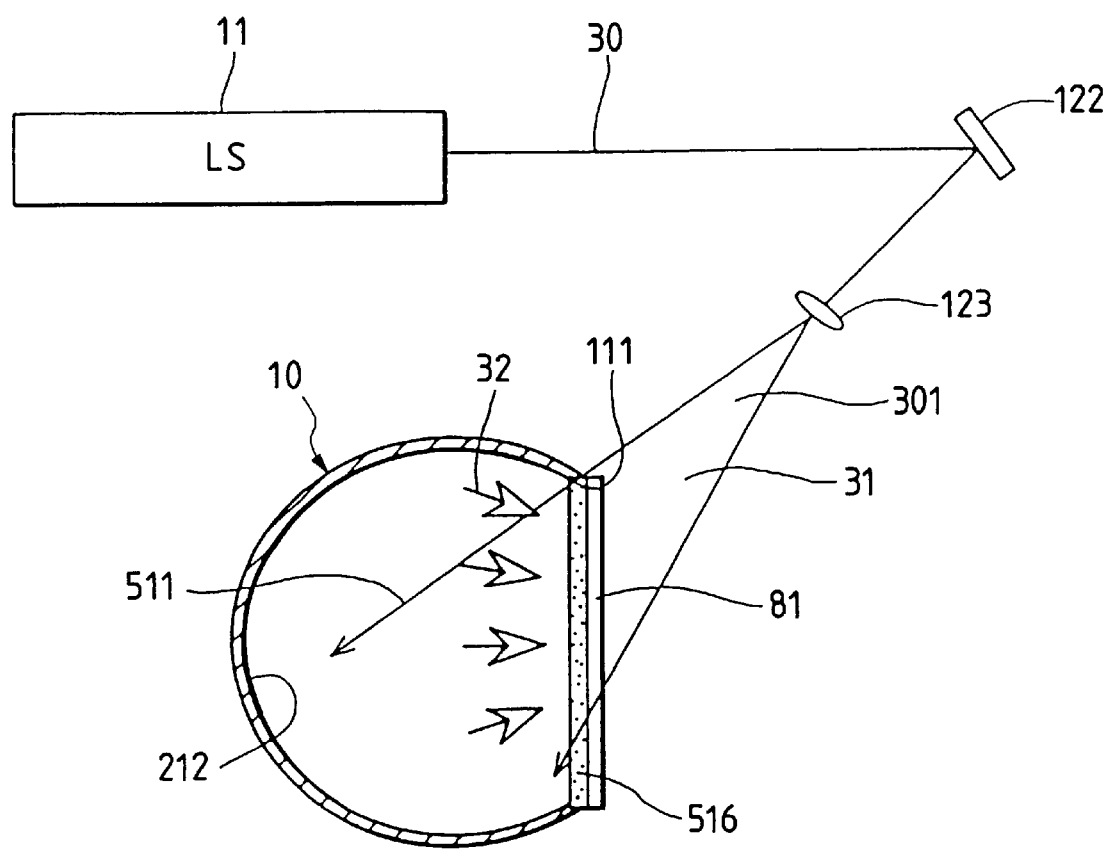
FIG. 45 is a schematic view showing an arrangement of a hologram exposure apparatus in accordance with a forty-third embodiment of the present invention.

A forty-third embodiment of the present invention, as shown in FIG. 45, discloses a modified hologram exposure apparatus. The forty-third embodiment is different from the thirty-seventh embodiment in that an intensity adjusting member 516 is disposed along the inner side of the photosensitive element 81. This intensity adjusting member 516 has a function of adjusting the intensity of object beam 32. In other words, the ratio of reference beam 31 to object beam 32 can be adjusted by this intensity adjusting member 516. This intensity adjusting member 516 is, for example, a color filter, an interference filter, or an ND filter. Other arrangements are substantially the same as those disclosed in the thirty-seventh embodiment.

Forty-fourth embodiment

Figure 46:
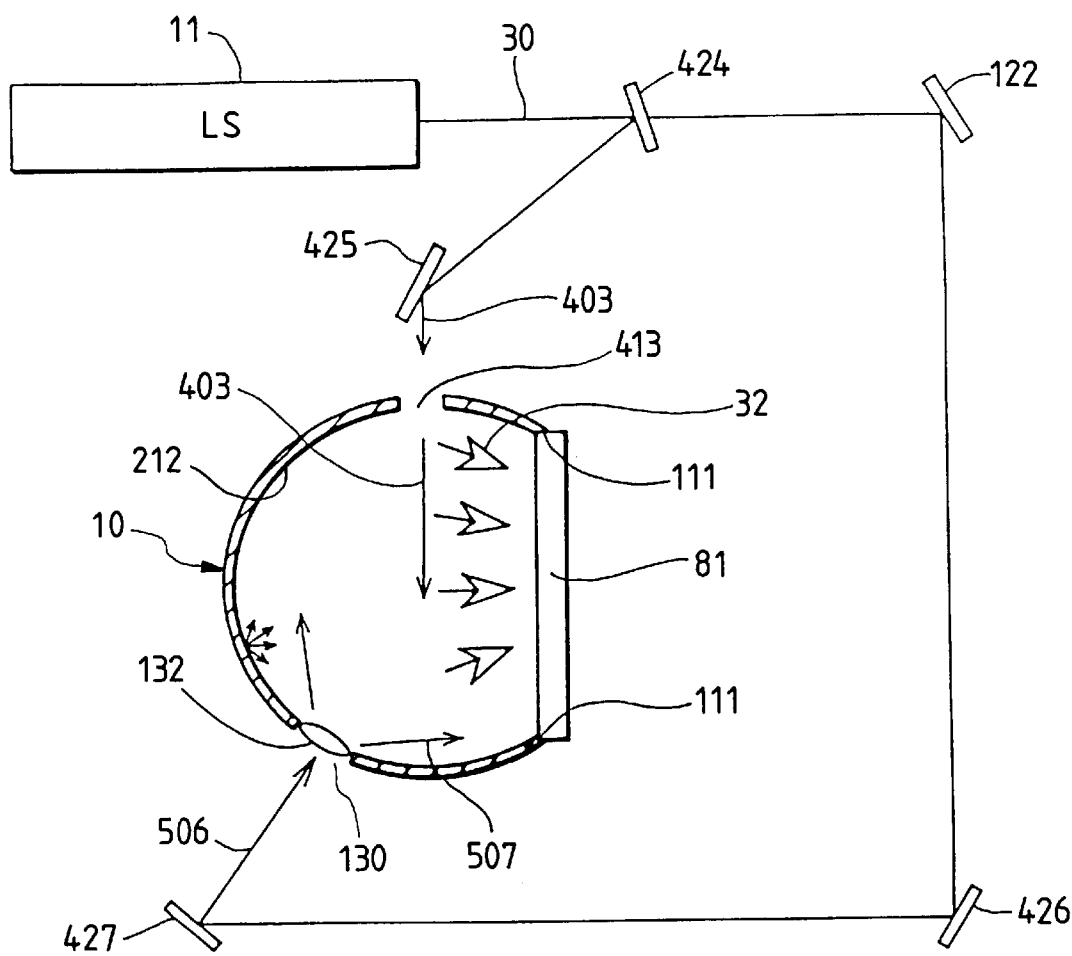
FIG. 46 is a schematic view showing an arrangement of a hologram exposure apparatus in accordance with a forty-fourth embodiment of the present invention.

A forty-fourth embodiment of the present invention, as shown in FIG. 46, discloses a modified hologram exposure apparatus. The forty-fourth embodiment is different from the fortieth embodiment in that the reaction container 10 has a total of two incident windows 413 and 130. A divergent beam 507 enters through one incident window 130 into the reaction container 10. Part of this beam 507, serving as reference beam 31, advances toward the photosensitive element 81 and is directly irradiated to the photosensitive element 81. Another beam 403 entering through the other incident window 413 is partly reflected by the inner wall surface 212 and reaches as object beam 32 to the photosensitive element 81.

A divergent lens 132 is disposed at the incident window 130. The coherent beam 30 emitted from light source 11 is partly penetrates the half mirror 424 and arrives as a parallel beam 506 to the divergent lens 132 via reflection mirrors 122, 426 and 427. The parallel beam 406, after passing through the divergent lens 132, is diverged. And, part of the diverged beam 507 is directly irradiated to the photosensitive element 81.

According to this embodiment, the intensity ratio of reference beam 31 to object beam 32 can be flexibly adjusted by adequately changing the intensities of the beams 403 and 506. Other arrangements are substantially the same as those disclosed in the forty embodiment.

As apparent from the foregoing description, the forty-forth embodiment of the present invention provides a manufacturing method for holographic screens comprising the steps of: supporting a photosensitive element (81) at an opening (111) of a reaction container (10) which has a spherical inner wall surface (212) formed by a diffusing and reflecting member and an incident window (130) other than the opening (111); introducing a light flux (507) with an expanded width into the reaction container (10) from the incident window (130); using part of the introduced beam (507) as a reference beam (31) directly entering the photosensitive element (81) without a reflection at the inner wall surface (212) of the reaction container (10); using the remainder of the introduced beam (507) as an object beam (32) entering the photosensitive element (81) through at least one reflection at the inner wall surface (212) of the reaction container (10); and forming interference fringes on the photosensitive element (81) by using the reference beam (31) and the object beam (32).

Furthermore, the forty-forth embodiment of the present invention provides an exposure apparatus for holographic screens comprising: a reaction container (10) having a spherical inner wall surface (212) formed by a diffusing and reflecting member, an opening (111) for supporting a photosensitive element (81), and an incident window (130) other than the opening (111); and an optical system (11, 122, 426–427, 132) for introducing a light flux (507) with an expanded width into the reaction container (10) from the incident window (130), wherein part of the introduced beam (507) is used as a reference beam (31) directly entering the photosensitive element (81) without a reflection at the inner wall surface (212) of the reaction container (10), while the remainder of the introduced beam (507) is used as an object beam (32) entering the photosensitive element (81) through at least one reflection at the inner wall surface (212) of the reaction container (10), thereby forming interference fringes on the photosensitive element (81) by using the reference beam (31) and the object beam (32).

Preferably, another incident window (413) is provided to introduce another beam (403) into the reaction container (10) so that all of the another beam (403) is reflected by the inner wall surface (212) and converted into the object beam (32).

Forty-fifth embodiment

Figure 47:
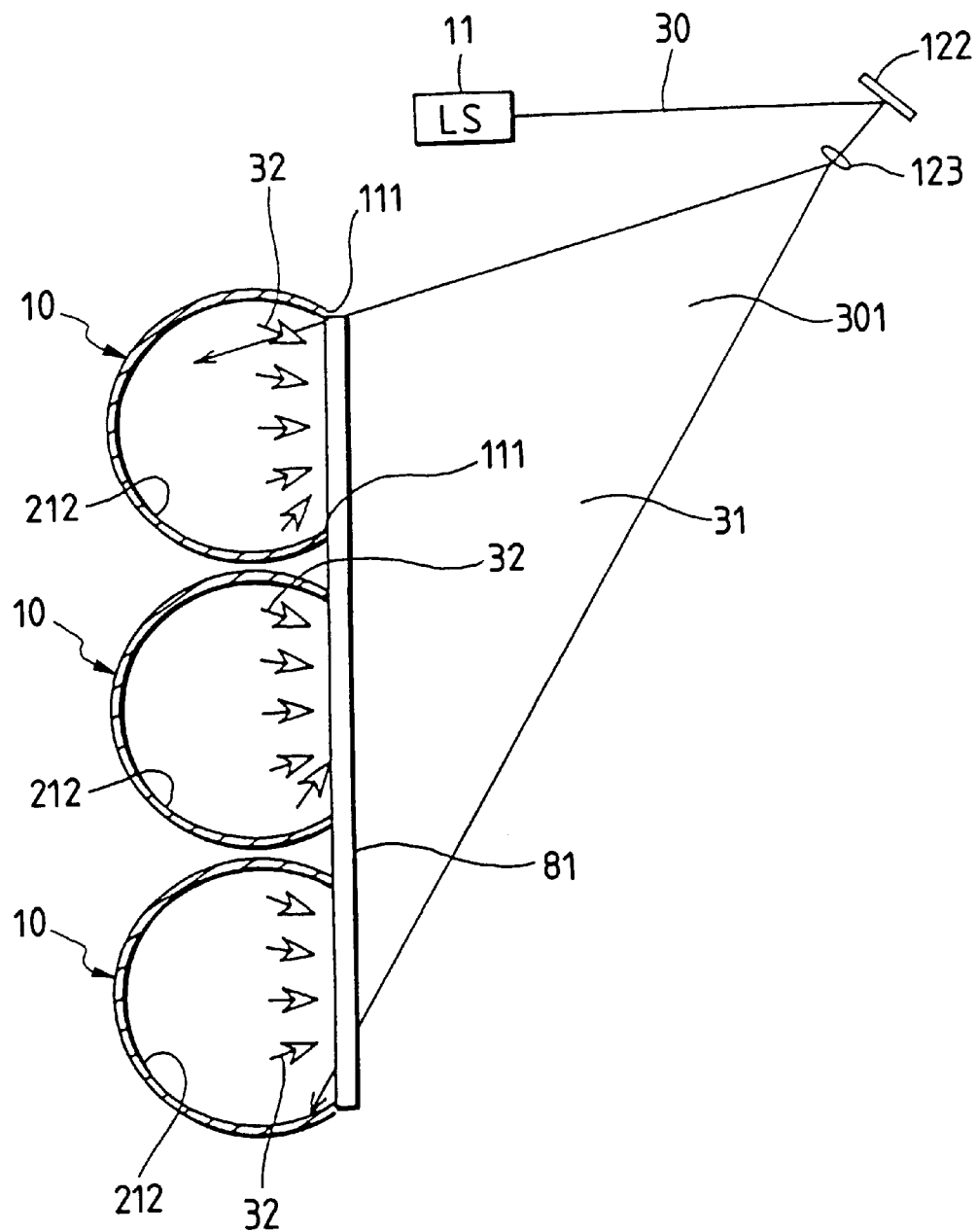
FIG. 47 is a schematic view showing an arrangement of a hologram exposure apparatus in accordance with a forty-fifth embodiment of the present invention.

A forty-fifth embodiment of the present invention, as shown in FIG. 47, discloses a modified hologram exposure apparatus. The forty-fifth embodiment is different from the thirty-seventh embodiment in that a plurality of reaction containers 10—10 are provided at different portions of a large-size photosensitive element 81. According to the arrangement of this embodiment, a plurality of holographic screens can be fabricated simultaneously on the photosensitive element 81. Furthermore, by shifting the photosensitive element 81, a plurality of exposure operations are performed to form interference fringes successively at different portions of the photosensitive element 81. Thus, this embodiment makes it possible to form a large-size holographic screen. Other arrangements are substantially the same as those disclosed in the thirty-seventh embodiment.

In short, the forty-fifth embodiment of the present invention provides a a plurality of reaction containers (10—10) at different portions on the photosensitive element (81) so that a plurality of interference fringes are formed at a single exposure operation. And, a positional relationship between the reaction containers (10—10) and the photosensitive element (81) is changeable to form interference fringes successively at different portions on the photosensitive element (81).

Forty-sixth embodiment

Figure 48:
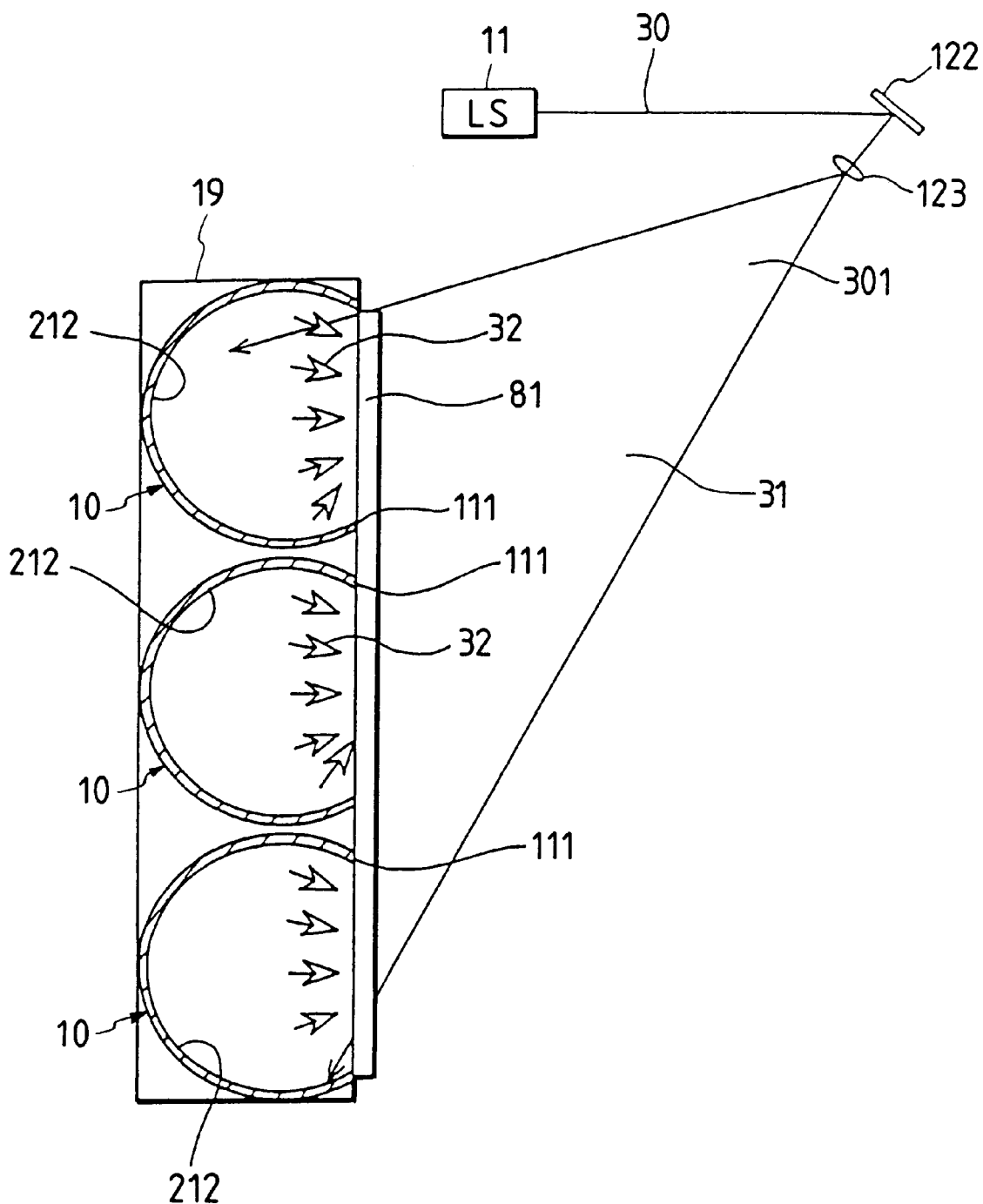
FIG. 48 is a schematic view showing an arrangement of a hologram exposure apparatus in accordance with a forty-sixth embodiment of the present invention.

A forty-sixth embodiment of the present invention, as shown in FIG. 48, discloses a modified hologram exposure apparatus. The forty-sixth embodiment is different from the forty-fifth embodiment in that the plurality of reaction containers 10—10 are accommodated in a housing 19. This housing 19 is shifted by an appropriate shifting device (not shown). Other arrangements are substantially the same as those disclosed in the forty-fifth embodiment.

Forty-seventh embodiment

Figure 49:
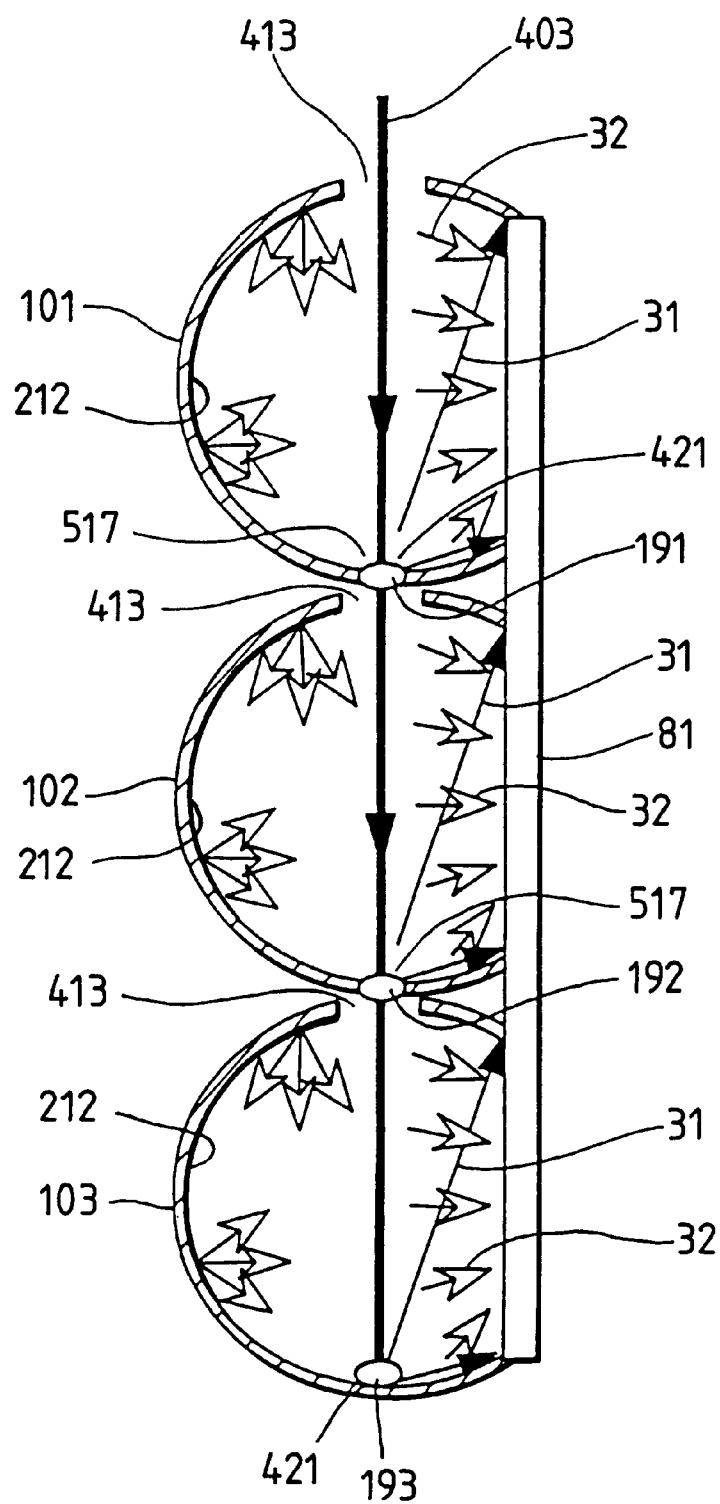
FIG. 49 is a schematic view showing an arrangement of a hologram exposure apparatus in accordance with a forty-seventh embodiment of the present invention.
Figure 50:
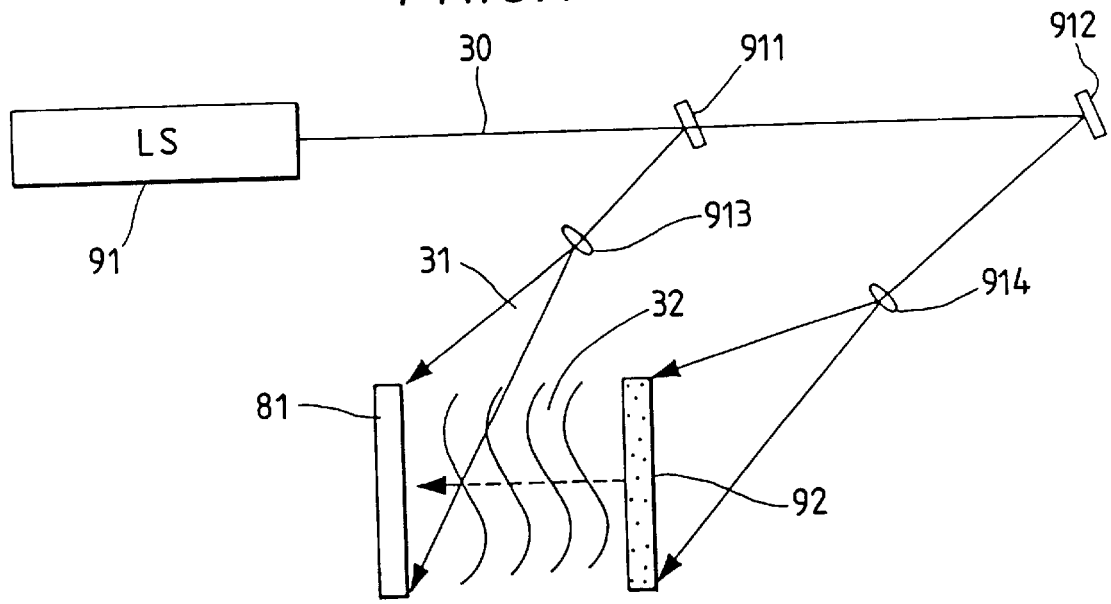
FIG. 50 is a schematic view showing an arrangement of a conventional hologram exposure apparatus.
Figure 51:
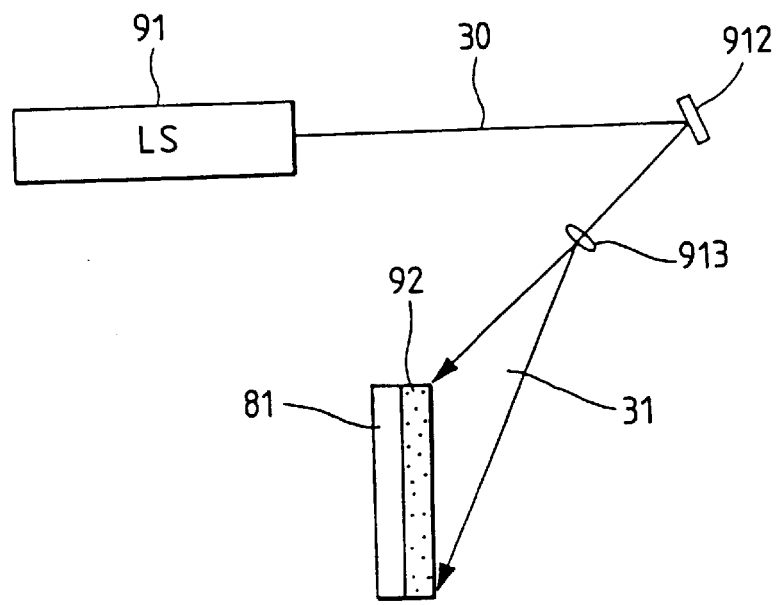
FIG. 51 is a schematic view showing an arrangement of another conventional hologram exposure apparatus.

A forty-seventh embodiment of the present invention, as shown in FIG. 49, discloses a modified hologram exposure apparatus. The forty-seventh embodiment is different from the forty-fifth embodiment in that a plurality of different type reaction containers 101, 102 and 103 are sequentially provided along the surface of the photosensitive element 81. The reaction containers 101, 102 and 103 have incident windows 413 at their upper portions for introducing beam 403 and semi-transparent diffusing/reflecting member 191–193 provided at their light-receiving portions 421.

The upper-stage reaction containers 101 and 102, other than the lowermost reaction container 103, have light-outlet windows 517 for allowing the beam 403 passing through straight downward.

According to the arrangement of this embodiment, the beam 403 emitted from light source 11 enters into the uppermost reaction container 101 through its incident window 413. Part of beam 403 is reflected by the diffusing/reflecting member 191 and irradiated directly as reference beam 31 to the photosensitive element 81 or subjected to reflections at the inner wall surface 212 and then enters as object beam 32 to the photosensitive element 81.

The remainder of the beam 403 penetrates the diffusing/reflecting member 191 provided at the light-outlet window 517 of the uppermost reaction container 101, and then enters into the intermediate reaction container 102 through the incident window 413 of the intermediate reaction container 102.

In the same manner, the beam 403 having entered the intermediate reaction container 102 is partly reflected by the diffusing/reflecting member 192 and irradiated directly as reference beam 31 to the photosensitive element 81 or subjected to reflections at the inner wall surface 212 and then enters as object beam 32 to the photosensitive element 81.

The remainder of the beam 403 further penetrates the diffusing/reflecting member 192 provided at the light-outlet window 517 of the intermediate reaction container 102, and then enters into the lowermost reaction container 103 through the incident window 413 of the lowermost reaction container 103.

Finally, the beam 403 having entered the lowermost reaction container 103 is reflected by the diffusing/reflecting member 193 and irradiated directly as reference beam 31 to the photosensitive element 81 or subjected to reflections at the inner wall surface 212 and then enters as object beam 32 to the photosensitive element 81.

Furthermore, to eliminate any differences in light intensities among reaction containers 101, 102 and 103, the reflection rate of diffusing/reflecting member 192 is set larger than that of diffusing/reflecting member 191, while the reflection rate of diffusing/reflecting member 193 is set larger than that of diffusing/reflecting member 192. By such settings of reflection rates of diffusing/reflecting members 191–193, the intensities of reference beams 31 and object beams 32 reflected by diffusing/reflecting members 191–193 can be constant irrespective of the position of reaction containers.

According to the arrangement of this embodiment, a plurality of holographic screens can be fabricated simultaneously on the photosensitive element 81. Furthermore, by shifting the photosensitive element 81, a plurality of exposure operations are performed to form interference fringes successively at different portions of the photosensitive element 81. Thus, this embodiment makes it possible to form a large-size holographic screen. Still further, by equalizing the properties of the diffusing/reflecting members 191–193, it becomes possible to fabricate a holographic screen having different diffraction characteristics. Other arrangements are substantially the same as those disclosed in the forty-fifth embodiment.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A manufacturing method for Fresnel's holographic screens, comprising:

converting a coherent beam into a light flux having an expanded width at a predetermined position to a photosensitive element;

irradiating part of the expanded light flux directly on said photosensitive element as a reference beam;

diffusing the remainder of said expanded light flux by using a diffusing member and changing an optical direction thereof by using a reflective member, said diffusing member being disposed at a predetermined position outside an optical path of said reference beam, thereby converting the remainder of said expanded light flux not irradiated directly to said photosensitive element into a scattered beam advancing as an object beam toward said photosensitive element; and forming interference fringes on said photosensitive element by using said reference beam and said object beam.

2. The manufacturing method for Fresnel's holographic screens in accordance with claim 1, wherein the step of forming interference fringes comprises forming the interference fringes at local spots on said photosensitive element by using a plurality of optical sets provided independently from each other, each of said plurality of optical sets consisting of a diffusing member and a reflective member, wherein a distribution of said object beam, on said photosensitive element, formed by each of said plurality of optical sets is substantially identical to each other.

3. The manufacturing method for Fresnel's holographic screens in accordance with claim 1, wherein the step of forming interference fringes comprises forming the interference fringes at the local spots on said photosensitive element by successively shifting said photosensitive element with respect to said reference beam and said object beam upon each completion of exposure by said reference beam and said object beam.

4. The manufacturing method for Fresnel's holographic screens in accordance with claim 1, wherein said diffusing member and said reflective member are integrally formed.

5. The manufacturing method for Fresnel's holographic screens in accordance with claim 1, wherein said part of the expanded light flux directly irradiated on said photosensitive element as a reference beam does not substantially change an optical direction thereof.

6. The manufacturing method for Fresnel's holographic screens in accordance with claim 1, wherein the act of diffusing and changing comprises disposing a solid transparent member, having no capability of diffusing transmitted light, on an optical path of said object beam diffused by said diffusing member and reflected by said reflective member and also on an optical path of said reference beam not diffused by said diffusing member and advancing directly toward said photosensitive element, so that said solid transparent member is interposed between said diffusing member and said photosensitive member, thereby diffusing and directionally changing the object beam advancing toward said photosensitive element.

7. The manufacturing method for Fresnel's holographic screens, comprising:

converting a coherent beam into a light flux having an expanded width at a predetermined position to a photosensitive element;

irradiating part of the expanded light flux directly, without substantially changing an optical direction thereof, on said photosensitive element as a reference beam;

diffusing the remainder of said expanded light flux by using a diffusing member and changing an optical direction thereof by using a reflective member, thereby converting the remainder of said expanded light flux not irradiated directly to said photosensitive element into a scattered beam advancing as an object beam toward said photosensitive element; and forming interference fringes on said photosensitive element by using said reference beam and said object beam, wherein diffusing and changing comprises disposing a solid transparent member, having no capability of diffusing transmitted light, on an optical path of said object beam diffused by said diffusing member and reflected by said reflective member and also on an optical path of said reference beam not diffused by said diffusing member and advancing directly toward said photosensitive element, so that said solid transparent member is interposed between said diffusing member and said photosensitive member, thereby diffusing and directionally changing the object beam advancing toward said photosensitive element.

8. The manufacturing method for Fresnel's holographic screens in accordance with claim 7, wherein the act of forming interference fringes comprises forming the interference fringes at local spots on said photosensitive element by using a plurality of optical sets provided independently from each other, each of said plurality of optical sets including a diffusing member and a reflective member, wherein a distribution of said object beam, on said photosensitive element, formed by each of said plurality of optical sets is substantially identical to each other.

9. The manufacturing method for Fresnel's holographic screens in accordance with claim 7, wherein the act of forming interference fringes comprises forming the interference fringes at the local spots on said photosensitive element by successively shifting said photosensitive element with respect to said reference beam and said object beam upon each completion of exposure by said reference beam and said object beam.

10. An exposure apparatus for Fresnel's holographic screens, comprising:
- a light source for emitting a coherent beam;
- a holder for supporting a photosensitive element on which a hologram is formed;
- expand and irradiating means for converting said coherent beam emitted from said light source into a light flux having an expanded width and for irradiating part of the expanded light flux directly on said photosensitive element as a reference beam; and
- directional-change and diffusing means including a diffusing member for diffusing the remainder of said expanded light flux and also including a reflective member for changing an optical direction thereof, said diffusing member being disposed at a predetermined position outside an optical path of said reference beam, thereby converting the remainder of said expanded light flux not irradiated directly to said photosensitive element into a scattered beam advancing as an object beam toward said photosensitive element, so that interference fringes of the hologram are formed on said photosensitive element by using said reference beam and said object beam.

11. An exposure apparatus for Fresnel's holographic screens in accordance with claim 10, wherein
- a plurality of optical sets, each consisting of said diffusing member and said reflective member, are provided independently from each other to form interference fringes at local spots on said photosensitive element, and
- a distribution of said object beam, on said photosensitive element, formed by each of said plurality of optical sets is substantially identical to each other.

12. The exposure apparatus for Fresnel's holographic screens in accordance with claim 10, wherein said photosensitive element is successively shifted with respect to said reference beam and said object beam upon each completion of exposure by said reference beam and said object beam to form the interference fringes at the local spots on said photosensitive element.

13. The exposure apparatus for Fresnel's holographic screens in accordance with claim 10, wherein said diffusing member and said reflective member are integrally formed.

14. The exposure apparatus for Fresnel's holographic screens in accordance with claim 10, wherein said part of the expanded light flux directly irradiated on said photosensitive element as a reference beam does not substantially change an optical direction thereof.

15. The exposure apparatus for Fresnel's holographic screens in accordance with claim 10, wherein said directional-change and diffusing means includes a solid transparent member, having no capability of diffusing transmitted light, disposed on an optical path of said reference beam and also on an optical path of said object beam so that said solid transparent member is interposed between said diffusing member and said photosensitive member.

16. The exposure apparatus for Fresnel's holographic screens, comprising:
- a light source for emitting a coherent beam;
- a holder for supporting a photosensitive element on which a hologram is formed;
- expand and irradiating means for converting said coherent beam emitted from said light source into a light flux having an expanded width and for irradiating part of the expanded light flux directly, without substantially changing an optical direction thereof, on said photosensitive element as a reference beam; and
- directional-change and diffusing means including a diffusing member for diffusing the remainder of said expanded light flux and also including a reflective member for changing an optical direction thereof, thereby converting the remainder of said expanded light flux not irradiated directly to said photosensitive element into a scattered beam advancing as an object beam toward said photosensitive element, so that interference fringes of the hologram are formed on said photosensitive element by using said reference beam and said object beam,
- wherein said directional-change and diffusing means includes a solid transparent member, having no capability of diffusing transmitted light, disposed on an optical path of said reference beam and also on an optical path of said object beam so that said solid transparent member is interposed between said diffusing member and said photosensitive member.

17. The exposure apparatus for Fresnel's holographic screens in accordance with claim 16, further comprising:
- a plurality of optical sets, each consisting of said diffusing member and said reflective member, are provided independently from each other to form interference fringes at local spots on said photosensitive element;
- wherein a distribution of said object beam, on said photosensitive element, formed by each of said plurality of optical sets is substantially identical to each other.

18. The exposure apparatus for Fresnel's holographic screens in accordance with claim 16, wherein said photosensitive element is successively shifted with respect to said reference beam and said object beam upon each completion of exposure by said reference beam and said object beam to form the interference fringes at the local spots on said photosensitive element.

19. Manufacturing method for Fresnel's holographic screens comprising:
- converting a coherent beam into a light flux having an expanded width at a predetermined position to a photosensitive element;
- irradiating part of the expanded light flux directly, without substantially changing an optical direction thereof, on said photosensitive element as a reference beam;
- diffusing the remainder of said expanded light flux by using a diffusing member and changing an optical direction thereof by using a reflective member, thereby converting the remainder of said expanded light flux not irradiated directly to said photosensitive element into a scattered beam advancing as an object beam toward said photosensitive element, wherein diffusing and changing comprises disposing a solid transparent member, having no capability of diffusing transmitted light, on an optical path of said object beam diffused by said diffusing member and reflected by said reflective member and also on an optical path of said reference beam not diffused by said diffusing member and advancing directly toward said photosensitive element, so that said solid transparent member is interposed between said diffusing member and said photosensitive element, thereby diffusing and directionally changing the object beam advancing toward said photosensitive element wherein a clearance defined between said diffusing member and said photosensitive member is fully filled with said solid transparent member; and forming interference fringes on said photosensitive element by using said reference beam and said object beam.

20. Manufacturing method for Fresnel's holographic screens comprising:

converting a coherent beam into a light flux having an expanded width at a predetermined position to a photosensitive element;

irradiating part of the expanded light flux directly, without substantially changing an optical direction thereof, on said photosensitive element as a reference beam;

diffusing the remainder of said expanded light flux by using a diffusing member and changing an optical direction thereof by using a reflective member, thereby converting the remainder of said expanded light flux not irradiated directly to said photosensitive element into a scattered beam advancing as an object beam toward said photosensitive element, wherein diffusing and changing comprises disposing a solid transparent member, having no capability of diffusing transmitted light, on an optical path of said object beam diffused by said diffusing member and reflected by said reflective member and also on an optical path of said reference beam not diffused by said diffusing member and advancing directly toward said photosensitive element, so that said solid transparent member is interposed between said diffusing member and said photosensitive element, thereby diffusing and directionally changing the object beam advancing toward said photosensitive element wherein said reference beam enters obliquely into said solid transparent member; and forming interference fringes on said photosensitive element by using said reference beam and said object beam.

* * * * *

UNITED STATES PATENT AND TRADEMARK OFFICE
Certificate

Patent No. 6,198,555 B1                                                              Patented: March 6, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kazumasa Kruokawa, Kariya, Japan; Tomoyuki Kanda, Mie-Ken, Japan; and Atsuo Ishizuka, Nagoya, Japan.

Signed and Sealed this Twenty-seventh Day of May 2003.

CASSANDRA C. SPYROU
*Supervisory Patent Examiner*
Art Unit 2872

UNITED STATES PATENT AND TRADEMARK OFFICE
Certificate

Patent No. 6,198,555 B1                                                  Patented: March 6, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kazumasa Kurokawa, Kariya, Japan; Tomoyuki Kanda, Mie-Ken, Japan; and Atsuo Ishizuka, Nagoya, Japan.

Signed and Sealed this Twenty-Ninth Day of July 2003.

CASSANDRA C. SPYROU
*Supervisory Patent Examiner*
Art Unit 2872